US012230931B2

(12) United States Patent
Davidsz et al.

(10) Patent No.: US 12,230,931 B2
(45) Date of Patent: Feb. 18, 2025

(54) SYSTEMS AND METHODS FOR A CABLE CONNECTOR

(71) Applicant: ROCKWELL AUTOMATION TECHNOLOGIES, INC., Mayfield Heights, OH (US)

(72) Inventors: Mark E. Davidsz, Oak Creek, WI (US); Scott H. Micoley, Plymouth, WI (US); Douglas J. Carpiaux, Milwaukee, WI (US); Robert S. Carlson, Weatogue, CT (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 493 days.

(21) Appl. No.: 17/728,843

(22) Filed: Apr. 25, 2022

(65) Prior Publication Data

US 2022/0255244 A1 Aug. 11, 2022

Related U.S. Application Data

(63) Continuation-in-part of application No. 17/114,203, filed on Dec. 7, 2020, now Pat. No. 11,322,867, and (Continued)

(51) Int. Cl.
*H01R 4/00* (2006.01)
*H01R 4/2425* (2018.01)

(Continued)

(52) U.S. Cl.
CPC ............. *H01R 4/2425* (2013.01); *H01R 4/30* (2013.01); *H01R 12/592* (2013.01); *H01R 13/506* (2013.01)

(58) Field of Classification Search
CPC ...... H01R 4/2425; H01R 4/30; H01R 12/592; H01R 13/506
See application file for complete search history.

(56) References Cited

U.S. PATENT DOCUMENTS

| | | | |
|---|---|---|---|
| 598,172 | A | 2/1898 | Barron et al. |
| 4,020,540 | A | 5/1977 | Casciotti et al. |

(Continued)

FOREIGN PATENT DOCUMENTS

| | | | |
|---|---|---|---|
| CN | 103140707 | A | 6/2013 |
| DE | 3314071 | A1 | 10/1984 |

(Continued)

OTHER PUBLICATIONS

European Patent Office, Extended Search Report, Application No. 22152227.9, Jun. 27, 2022, 9 pages.

(Continued)

*Primary Examiner* — Phuong Chi Thi Nguyen
(74) *Attorney, Agent, or Firm* — Quarles & Brady LLP

(57) ABSTRACT

A connector for receiving a ribbon cable, to be assembled via a clamping tool, is provided. The connector includes a housing, a cover, and a protection cap. The housing includes an open top and a bottom. The cover is configured to selectively cover the open top of the housing to enclose the ribbon cable within an interior of the housing. The protection cap is configured to cover the bottom of the housing. The protection cap includes a nonplanar surface with a bump, where the clamping tool contacts the cover and the bump to force the cover toward the housing when the connector is assembled.

20 Claims, 28 Drawing Sheets

Related U.S. Application Data a continuation-in-part of application No. 17/171,892, filed on Feb. 9, 2021, now Pat. No. 11,862,889.

(51) Int. Cl.

| | |
|---|---|
| ***H01R 4/30*** | (2006.01) |
| ***H01R 12/59*** | (2011.01) |
| ***H01R 13/506*** | (2006.01) |

(56) References Cited

U.S. PATENT DOCUMENTS

| | | | | |
|---|---|---|---|---|
| 4,209,219 | A | 6/1980 | Proietto | |
| 4,228,709 | A * | 10/1980 | Guzay, Jr. | H02G 1/005 29/564.6 |
| 4,252,396 | A | 2/1981 | Wilson | |
| 4,255,009 | A | 3/1981 | Clark | |
| 4,460,228 | A | 7/1984 | Lane et al. | |
| 4,538,873 | A | 9/1985 | Worth | |
| 4,655,528 | A * | 4/1987 | Groft | H01R 12/675 439/404 |
| 4,668,039 | A | 5/1987 | Marzili | |
| 4,824,384 | A | 4/1989 | Nicholas et al. | |
| 4,891,019 | A | 1/1990 | Olsson | |
| 4,911,210 | A | 3/1990 | Hillegonds | |
| 4,940,430 | A | 7/1990 | Fujitani et al. | |
| 5,059,137 | A | 10/1991 | Dale et al. | |
| 5,456,617 | A | 10/1995 | Chishima et al. | |
| 5,465,479 | A | 11/1995 | Bowen et al. | |
| 5,934,930 | A | 8/1999 | Camps et al. | |
| 6,035,531 | A | 3/2000 | Besse et al. | |
| 6,108,904 | A | 8/2000 | Brekosky et al. | |
| 6,232,557 | B1 | 5/2001 | Lounsbury et al. | |
| 7,007,346 | B2 | 3/2006 | Hoffman | |
| 7,070,443 | B2 * | 7/2006 | Tashiro | F21V 21/002 439/404 |
| 7,156,686 | B1 * | 1/2007 | Sekela | H01R 12/675 439/417 |
| 7,354,310 | B1 | 4/2008 | Brown | |
| 8,723,044 | B2 | 5/2014 | Onodi | |
| 9,698,498 | B1 | 7/2017 | Wang et al. | |
| 9,728,864 | B2 | 8/2017 | Mathews et al. | |
| 9,954,296 | B2 * | 4/2018 | Haensgen | H01R 4/2433 |
| 10,476,179 | B2 | 11/2019 | Hayashi et al. | |
| 11,189,954 | B2 | 11/2021 | Kwon et al. | |
| 11,251,550 | B1 | 2/2022 | Davidsz et al. | |
| 11,322,867 | B1 * | 5/2022 | Davidsz | H01R 13/516 |
| 11,545,801 | B2 | 1/2023 | Davidsz et al. | |
| 11,862,889 | B2 * | 1/2024 | Davidsz | H01R 13/506 |
| 2002/0016104 | A1 | 2/2002 | Maegawa | |
| 2004/0235335 | A1 | 11/2004 | Schoeffel et al. | |
| 2005/0070147 | A1 | 3/2005 | Hung | |
| 2006/0183360 | A1 | 8/2006 | Nave et al. | |
| 2008/0076295 | A1 | 3/2008 | Lappoehn | |
| 2008/0153346 | A1 | 6/2008 | Oesterhaus et al. | |
| 2018/0013220 | A1 | 1/2018 | Haensgen et al. | |

FOREIGN PATENT DOCUMENTS

| | | | |
|---|---|---|---|
| EP | 0602539 | A2 | 6/1994 |
| EP | 2600470 | A1 | 6/2013 |
| EP | 1983616 | B1 | 10/2015 |
| JP | S5798695 | U | 6/1982 |
| JP | H0474889 | U | 6/1992 |
| JP | 2938780 | B2 | 8/1999 |

OTHER PUBLICATIONS

European Patent Office, Extended Search Report, Application No. 22152017.4, Jul. 8, 2022, 13 pages.

European Patent Office, Extended Search Report, Application No. 22188073.5, May 26, 2023, 13 pages.

* cited by examiner

SYSTEMS AND METHODS FOR A CABLE CONNECTOR

CROSS-REFERENCES TO RELATED APPLICATIONS

This application is a continuation-in-part of U.S. patent application Ser. No. 17/171,892, filed Feb. 9, 2021, and entitled “Systems and Methods for a Cable Connector,” and a continuation-in-part of U.S. patent application Ser. No. 17/114,203, filed Dec. 7, 2020, and entitled “Systems and Methods for a Cable Connector,” the entire contents of each is incorporated herein by reference.

STATEMENT REGARDING FEDERALLY SPONSORED RESEARCH

Not applicable.

BACKGROUND INFORMATION

The subject matter disclosed within relates generally to connectors. In particular, the subject matter relates to connectors for ribbon cables such as, but not limited to, those used in conjunction with network transmission media of the type used in industrial control, monitoring, and similar power and data network systems.

BRIEF DESCRIPTION

In one embodiment, a connector for receiving a ribbon cable, to be assembled via a clamping tool, is provided. The connector includes a housing, a cover, and a protection cap. The housing includes an open top and a bottom. The cover is configured to selectively cover the open top of the housing to enclose the ribbon cable within an interior of the housing. The protection cap is configured to cover the bottom of the housing. The protection cap includes a nonplanar surface with a bump, where the clamping tool contacts the cover and the bump to force the cover toward the housing when the connector is assembled.

The foregoing and other aspects and advantages of the present disclosure will appear from the following description. In the description, reference is made to the accompanying drawings which form a part hereof, and in which there is shown by way of illustrations one or more embodiments of the present disclosure. Such embodiments do not necessarily represent the full scope of the present disclosure, however, and reference is made therefore to the claims and herein for interpreting the scope of the present disclosure.

BRIEF DESCRIPTION OF DRAWINGS

The present disclosure will be better understood and features, aspects and advantages other than those set forth above will become apparent when consideration is given to the following detailed description thereof. Such detailed description makes reference to the following drawings.

DETAILED DESCRIPTION

Figure 1:
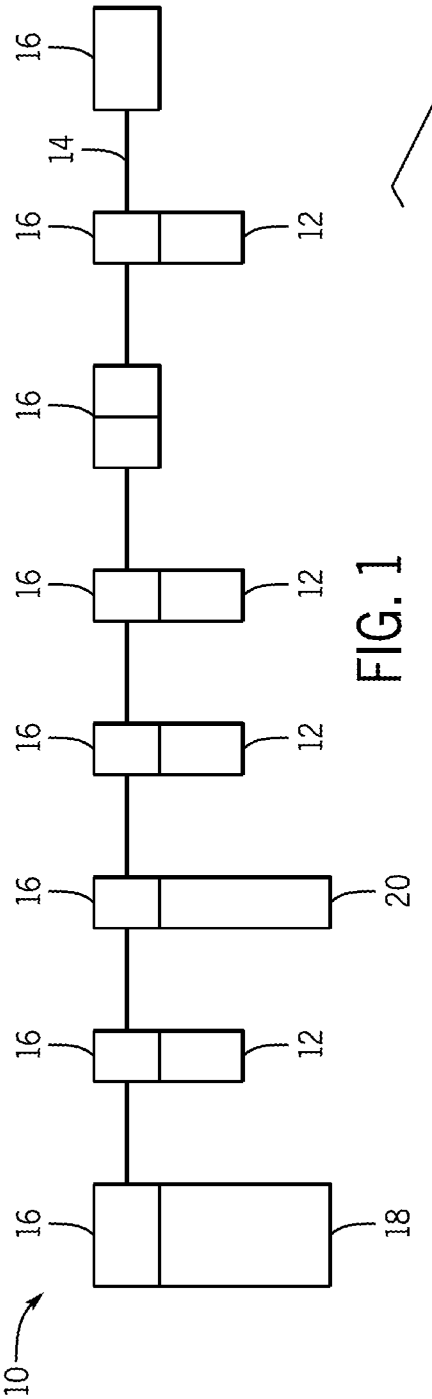
FIG. 1 is a schematic view of a data and power network.

Before any embodiments of the invention are explained in detail, it is to be understood that the embodiments are not limited in its application to the details of construction and the arrangement of components set forth in the following description or illustrated in the following drawings. Aspects of the present disclosure are capable of other embodiments and of being practiced or of being carried out in various ways. Also, it is to be understood that the use the phraseology and terminology used herein is for the purpose of description and should not be regarded as limiting. Furthermore, the use of "right", "left", "front", "back", "upper", "lower", "above", "below", "top", or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the present disclosure. Various modifications to the illustrated embodiments will be readily apparent to those skilled in the art, and the generic principles herein can be applied to other embodiments and applications without departing from embodiments of the present disclosure. Thus, embodiments of the present disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the present disclosure. Skilled artisans will recognize the examples provided herein have many useful alternatives and fall within the scope of embodiments of the present disclosure.

Disclosed herein is a connector for positioning and locating a flat, ribbon-style cable. The connector may be used in conjunction with such a ribbon cable for use in industrial control, monitoring, and similar power and data network systems, for example, as a node or power connection for a device within the system, passing data and/or power between the ribbon cable and the device, or a termination or splicer for cables within the system. The connectors for various purposes (e.g., power connection, node connection, termination, splicing) can incorporate one or more universal parts, enabling easy assembly of the network with common tooling for all connectors and re-use of certain components for different purposes. Some embodiments of a connector incorporate one or more nonplanar surfaces, including one or more contact points for tooling used to assemble the connector. Additionally, in some embodiments, the connector can include mechanical indicators that signal to a user that the connector is properly assembled.

By way of example, FIG. 1 schematically illustrates a data and power network 10. The network 10 includes a plurality of device nodes 12 coupled to one another via a network ribbon cable 14. Each device node 12 can receive power and/or data signals from the ribbon cable 14 via a connector 16. More specifically, once coupled to the ribbon cable 14 via a respective connector 16, each device node 12 can transmit and receive control and data signals via the ribbon cable 14 in accordance with various standard protocols in addition to receiving various forms of electrical power. Various examples of device nodes 12 may include, but are not limited to, devices such as push-button switches, motor starters, proximity sensors, flow sensors, speed sensors, actuating solenoids, electrical relays, and electrical contactors.

Additionally, electrical power can be provided to the network 10 via one or more intelligent power taps 18. For example, intelligent power taps 18 can be intelligent devices having the ability to interact with the control and data signals of the network 10, in addition to providing various forms of power. The intelligent power taps 18 can provide power (e.g., in the form of 24 volts DC) to the network 10 by connecting to the ribbon cable 14 via a connector 16. In addition to, or as an alternative to, one or more of the intelligent power taps 18, the network 10 can include one or more non-intelligent power taps 20 connected to the ribbon cable 14 via a connector 16. For example, a non-intelligent power tap 20 may only provide power to the network 10, without interacting with control and data signals. At one or both ends of ribbon cable 14, a connector 16 can further be provided in the form of a terminator for capping the ribbon cable ends and terminating the signal conductors of the ribbon cable 14. Furthermore, within the network 10, one or more connectors 16 can be provided in the form of splicers to electrically connect and cap respective ends of two ribbon cables 14.

Figure 1A:
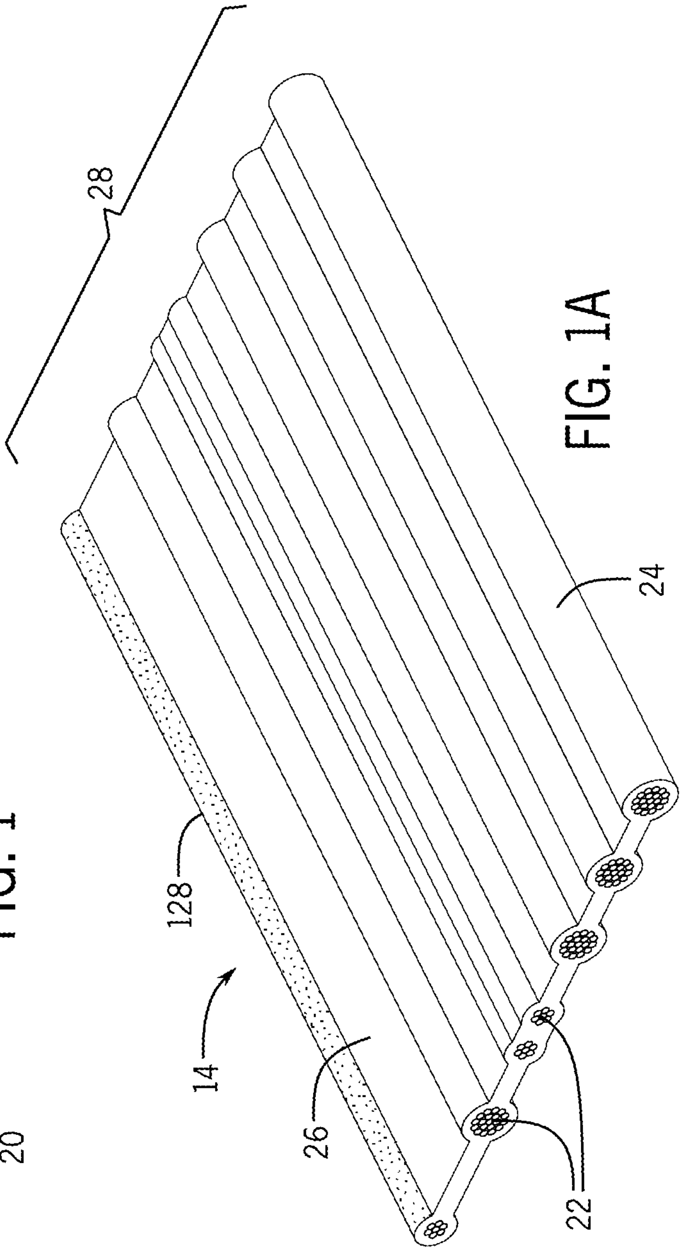
FIG. 1A is a perspective view of a multi-conductor ribbon cable.

As shown in FIG. 1A, a ribbon cable 14 for use in such a network 10 can include a plurality of parallel conductors 22 enclosed in a common insulation jacket 24. The conductors 22 can comprise a conductive material such as, but not limited to, copper or another conductive metal. The insulation jacket 24 can comprise an electrical insulating material such as, but not limited to, a plastic material. The insulation jacket 24 can sit on the conductors 22, e.g., as an extruded integral insulation, so that a cylindrical outer contour on the top and bottom of the ribbon cable 14 emerges, separated by flat insulation webbing 26 between conductors. In this manner, the ribbon cable 14 can define a ribbon profile 28 of curved, longitudinal tracks on top and bottom surfaces thereof. In some applications, all conductors 22 may be identical in size and equally spaced apart, forming a symmetrical ribbon profile 28; however, in other applications, the conductors 22 may differ in size and/or spacing, creating a varied or asymmetrical ribbon profile 28. According to the non-limiting example of FIG. 1A, the ribbon cable 14 includes seven extruded conductors 22 of various sizes, including four conductors 22 dedicated to power and three conductors 22 dedicated to data transfer, forming an asymmetrical ribbon profile 28.

In some embodiments, each connector 16 can be configured to be coupled to and guide the ribbon cable 14 to maintain power and data connections within the network 10. As such, all connectors 16 within the network 10 can include generally similar components, with some components and features being universal across all connectors 16, and other components and features being specific to a connector 16 to achieve particular physical and/or electrical connections within the network 10. For example, FIGS. 2-37 illustrate various connectors 30-38, according to some embodiments, for use in a network, such as the network 10 of FIG. 1 (e.g., where FIGS. 2-11 illustrate connectors 30-38 according to a first closure-type configuration, FIGS. 12-28 illustrate connectors 30-38 according a second closure-type configuration, and FIGS. 29-37 illustrate connectors 30-38 according to a third closure-type configuration).

Figure 10:
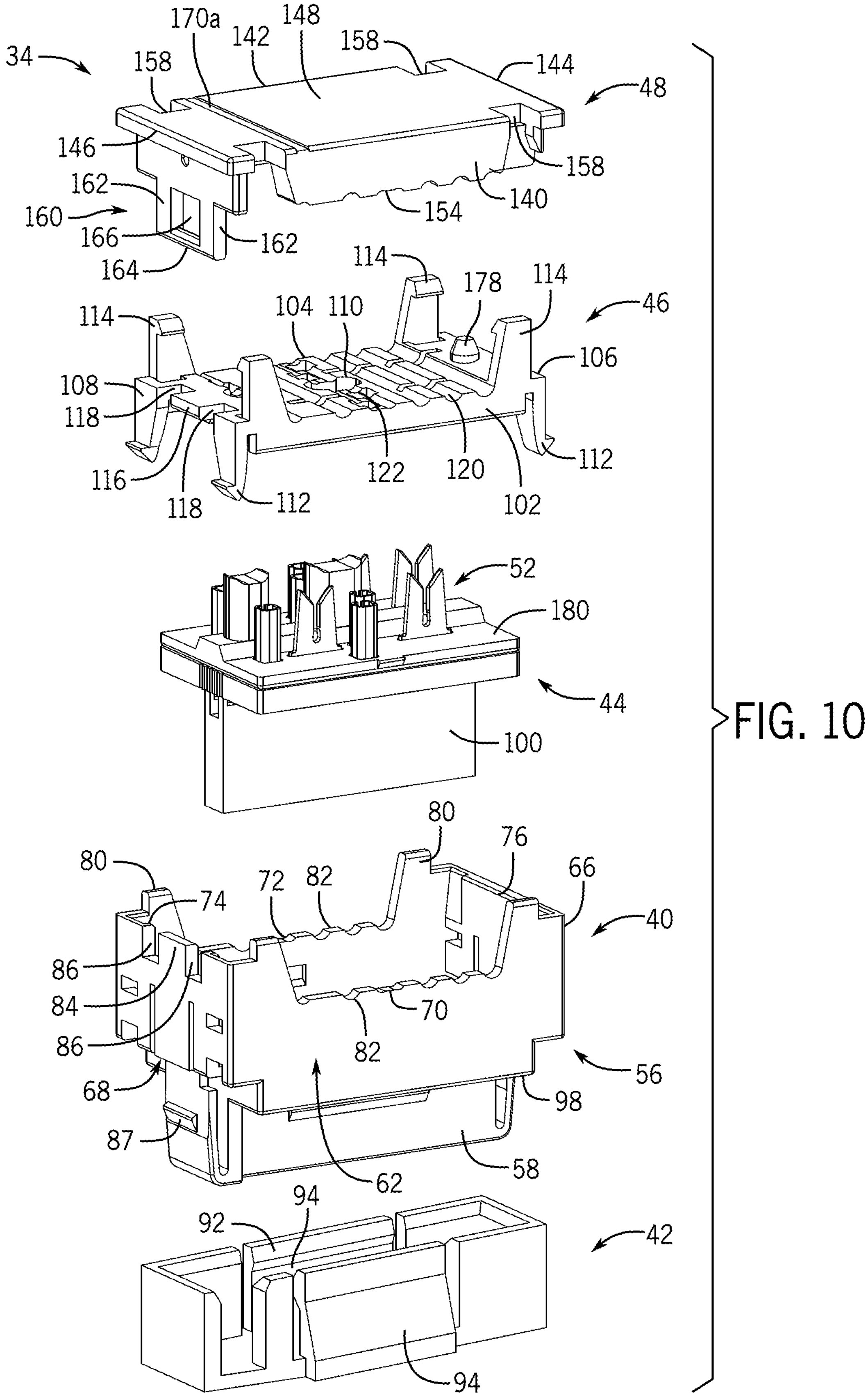
FIG. 10 is a perspective exploded view of the node connector of FIG. 9.
Figure 12:
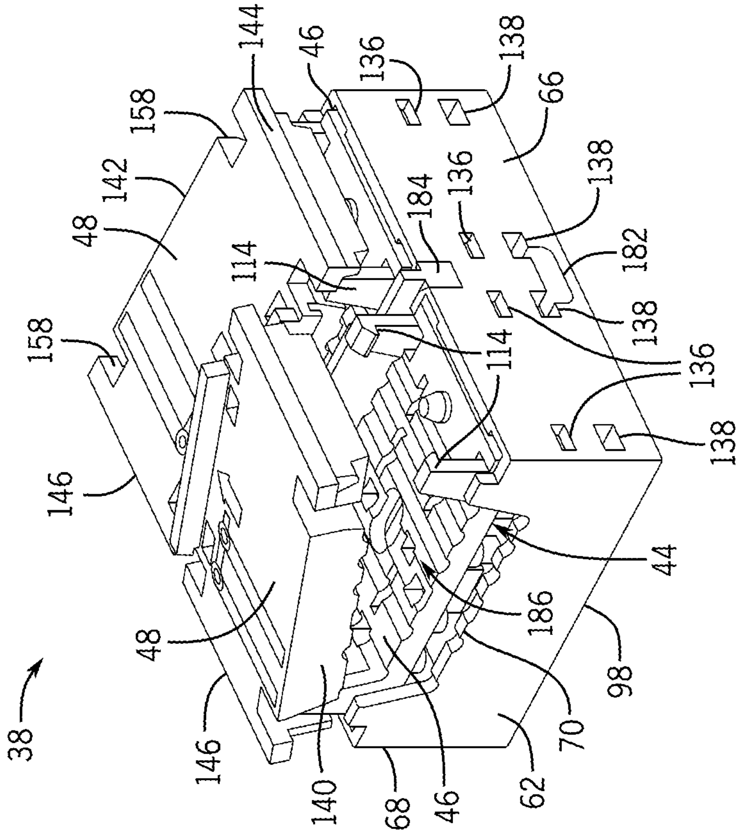
FIG. 12 is a perspective view of a splicer according to some embodiments.
Figure 11:
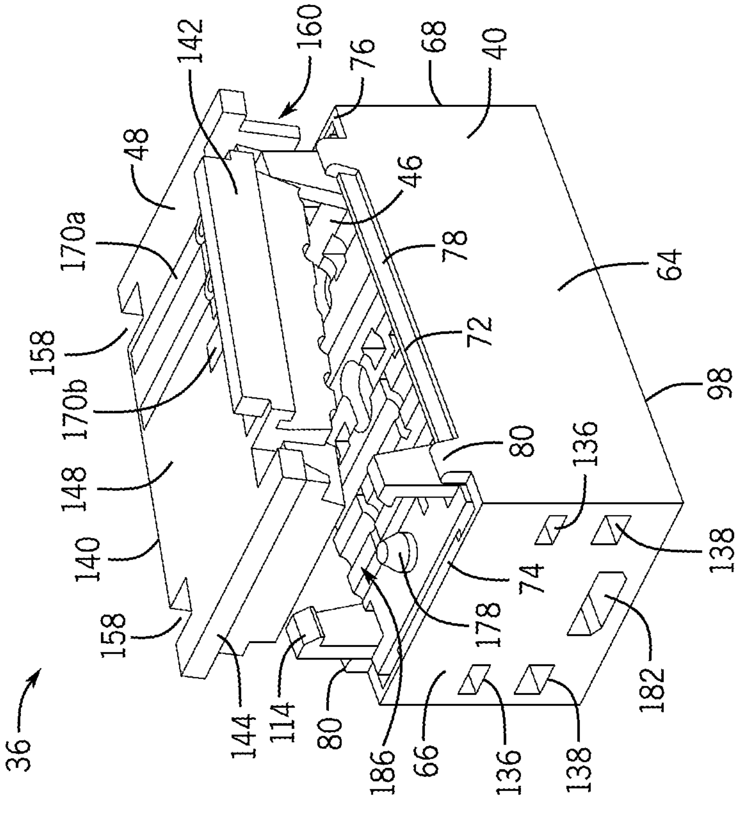
FIG. 11 is a perspective view of a terminator according to some embodiments.
Figure 27:
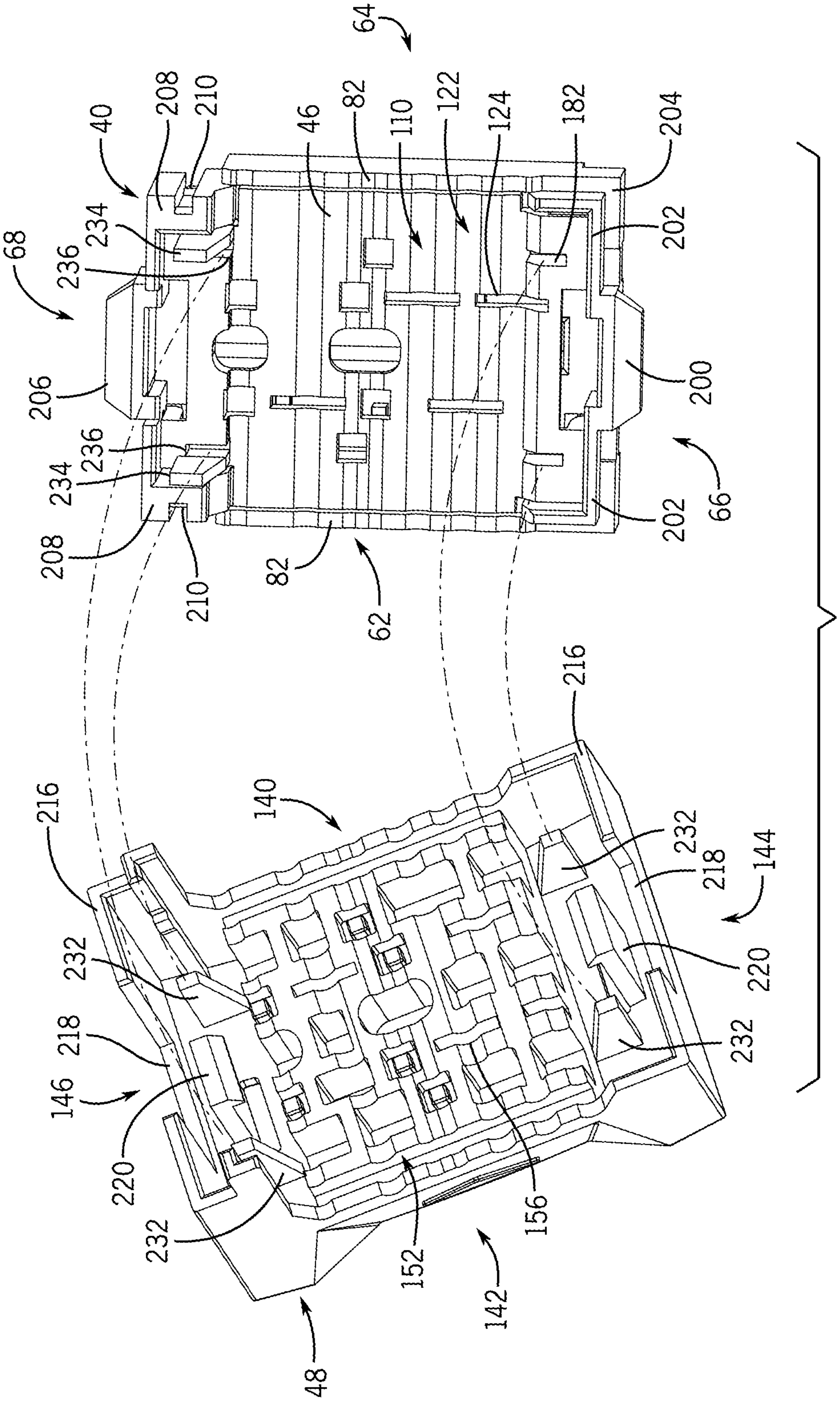
FIG. 27 is an isometric open view of a node connector, according to some embodiments.
Figure 28A:
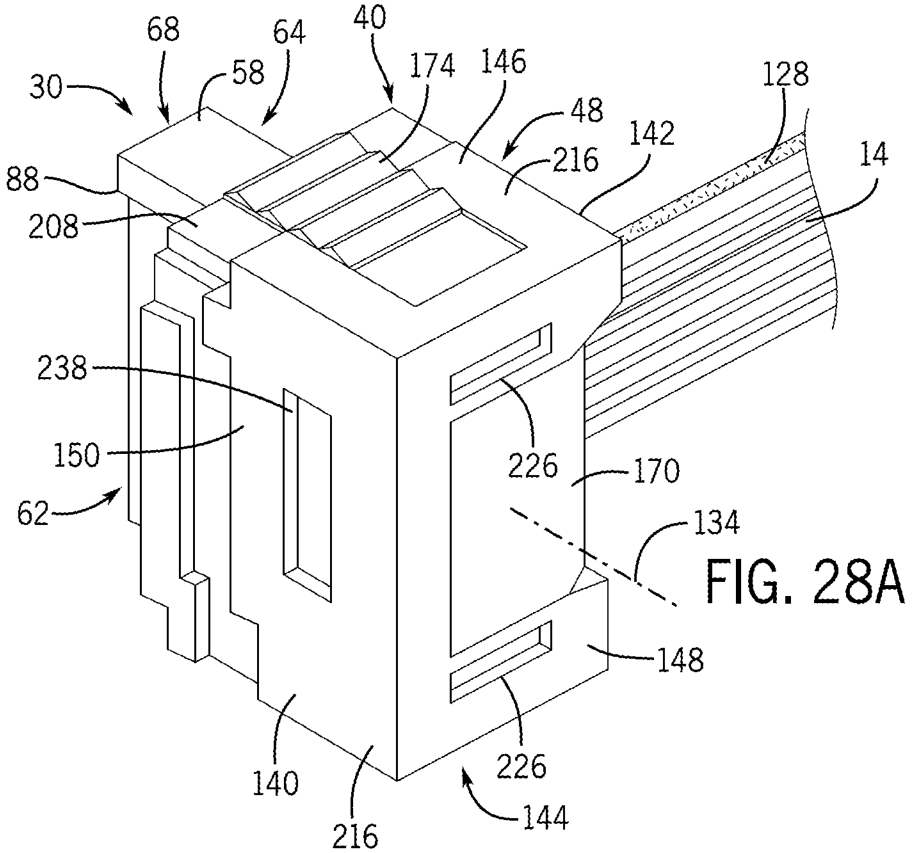
FIG. 28A is a perspective view of a power tap left connector, according to some embodiments, in a preassembled state.
Figure 28B:
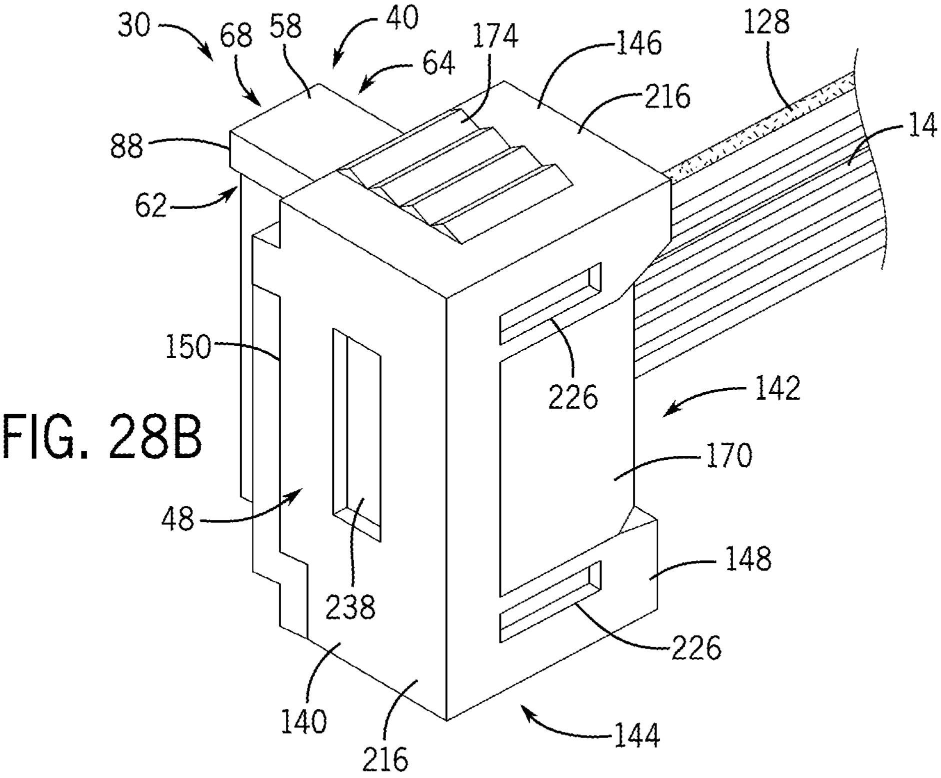
FIG. 28B is a perspective view of the power tap left connector of FIG. 28A in an assembled state.
Figure 29:
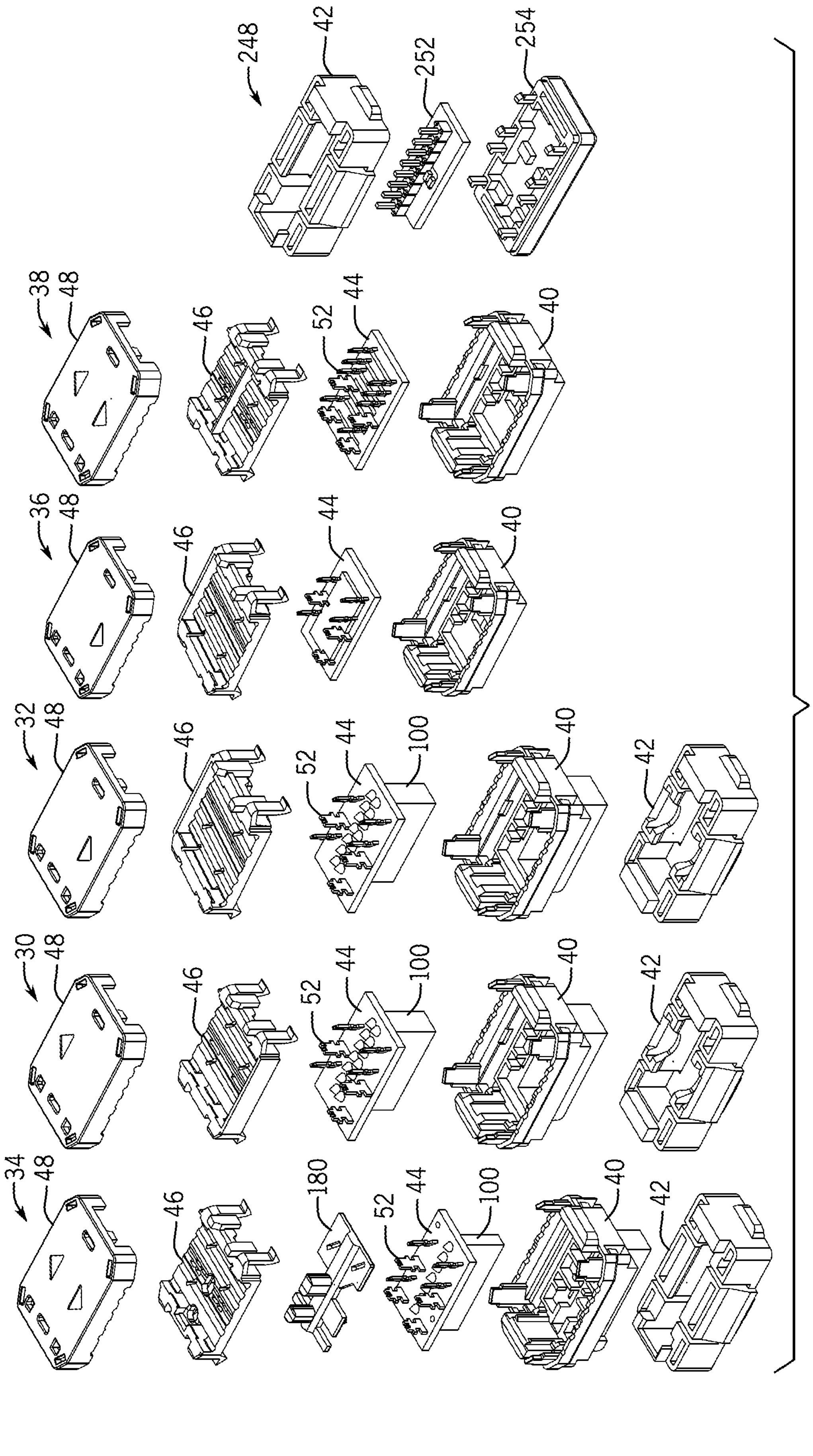
FIG. 29 is an array of exploded perspective views of connectors, according to some embodiments.

More specifically, FIGS. 2-6, 19, 28A, 28B, 29, 34, and 35 illustrate a first connector 30 (e.g., a "power tap left connector") configured to couple a ribbon cable 14 to a power tap to direct power in a first direction; FIGS. 6-8 and 29 illustrate a second connector 32 (e.g., a "power tap right connector") configured to couple a ribbon cable 14 to a power tap to direct power in a second direction; FIGS. 6, 9, 10, 14-18, 20-23, 25, 26, and 29-32 illustrate a third connector 34 (e.g., a "node connector") configured to couple a ribbon cable 14 to a device node; FIGS. 11, 29, and 36 illustrate a fourth connector 36 (e.g., a "terminator") configured to terminate a ribbon cable 14; and FIGS. 12 and 29 illustrate a fifth connector 38 (e.g., a "splicer") configured to splice together two ribbon cables 14. Generally, each connector 30-38 can include a housing 40, a cable organizer 46, and a cover 48, as further described below. Furthermore, each of the power tap left connector 30, the power tap right connector 32, and the node connector 34 can include a protection cap 42, and each of the power tap left connector 30, the power tap right connector 32, the node connector 34, and the splicer 38 can include a printed circuit board 44, as further described below. Additionally, in some embodiments, the housing 40, the cable organizer 46, and/or the cover 48 can be adapted to provide a hinged closure-type connector, as shown in FIGS. 2-11 and 29-37, or a linear closure-type connector, as shown in FIGS. 12-28.

Figure 2:
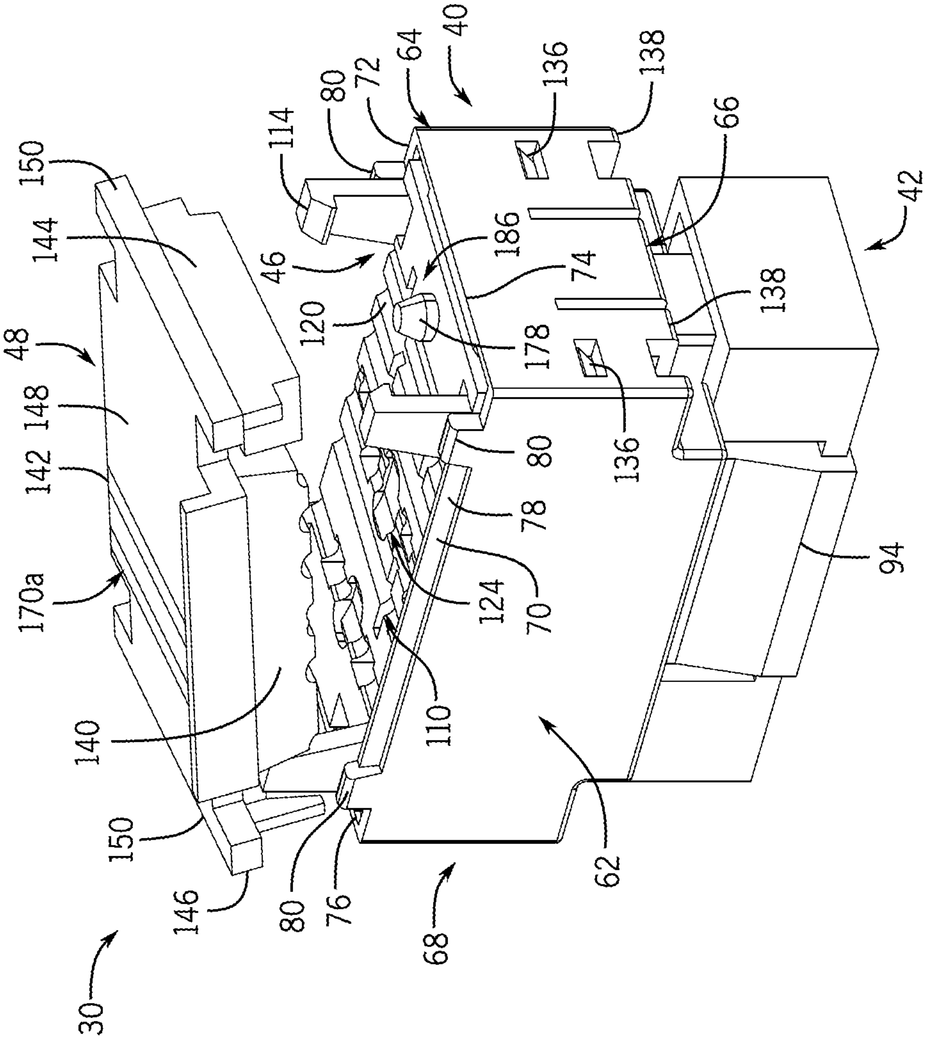
FIG. 2 is a perspective view of a power tap left connector, according to some embodiments, in a preassembled state.
Figure 3:
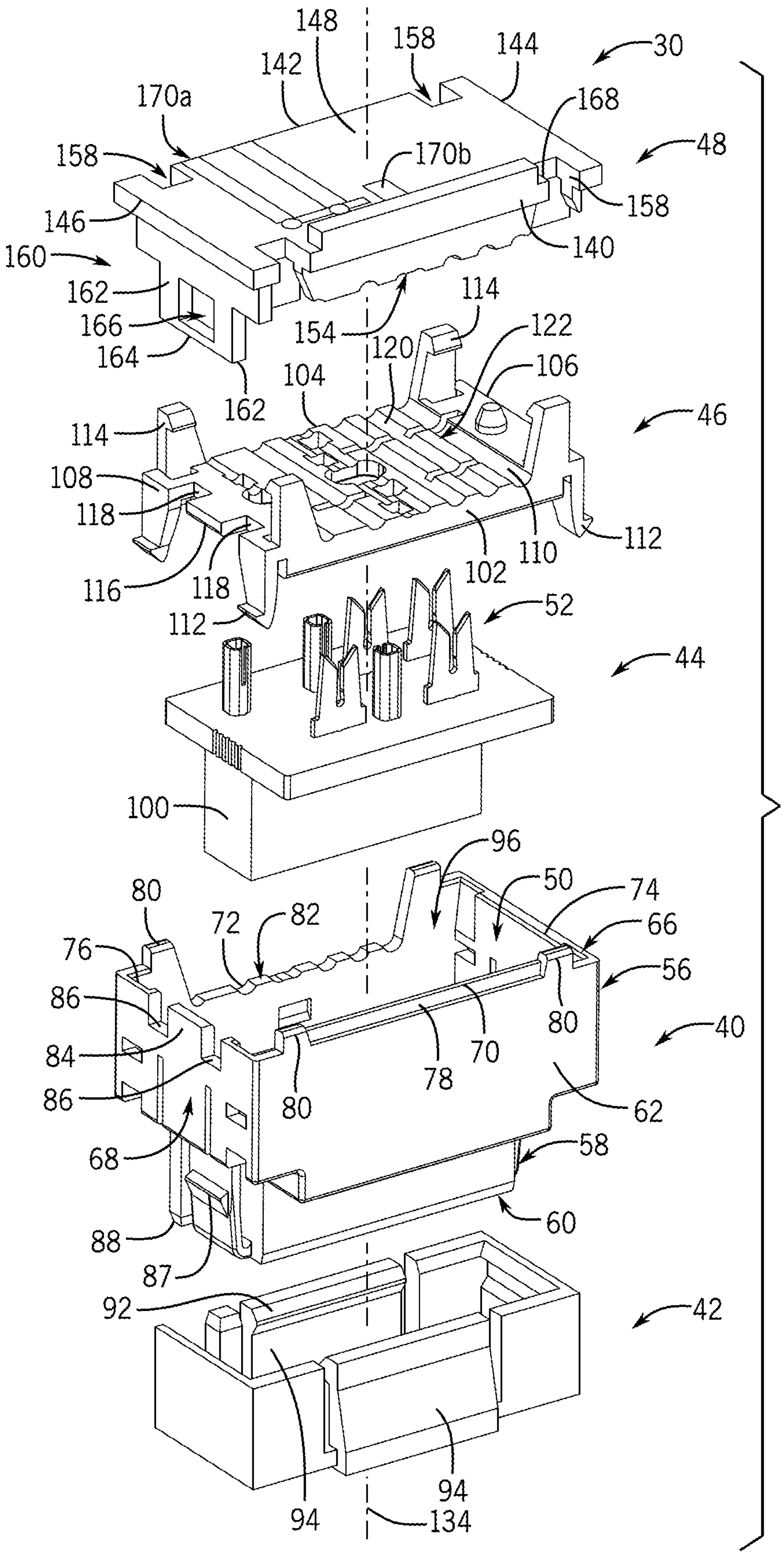
FIG. 3 is a perspective exploded view of the power tap left connector of FIG. 2.
Figure 4:
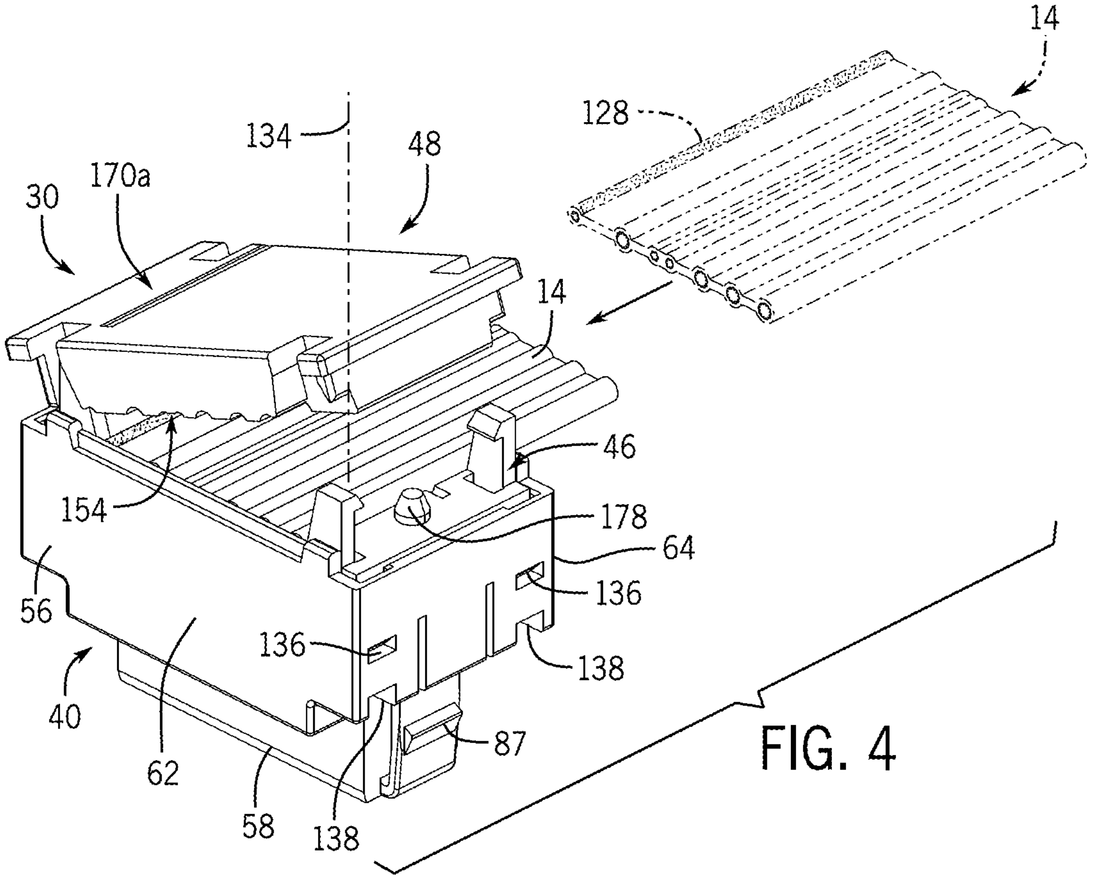
FIG. 4 is another perspective view of the power tap left connector of FIG. 2, including a ribbon cable therein.
Figure 5:
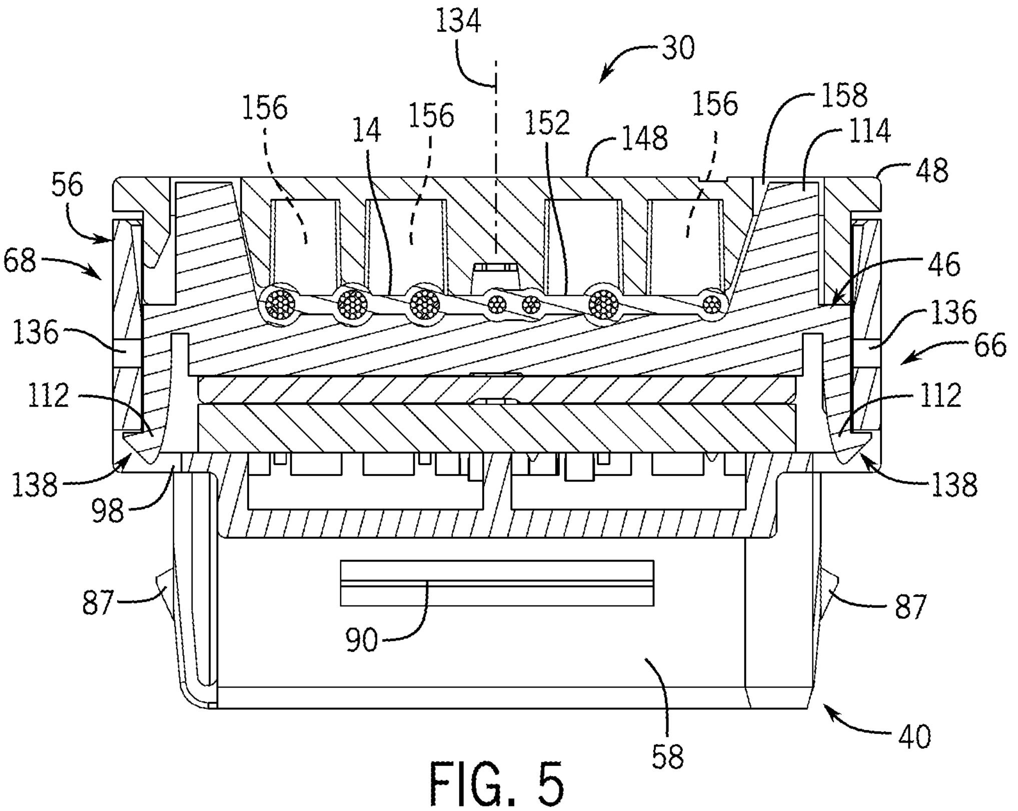
FIG. 5 is a cross-sectional view of the power tap left connector of FIG. 2 in an assembled state.
Figure 6:
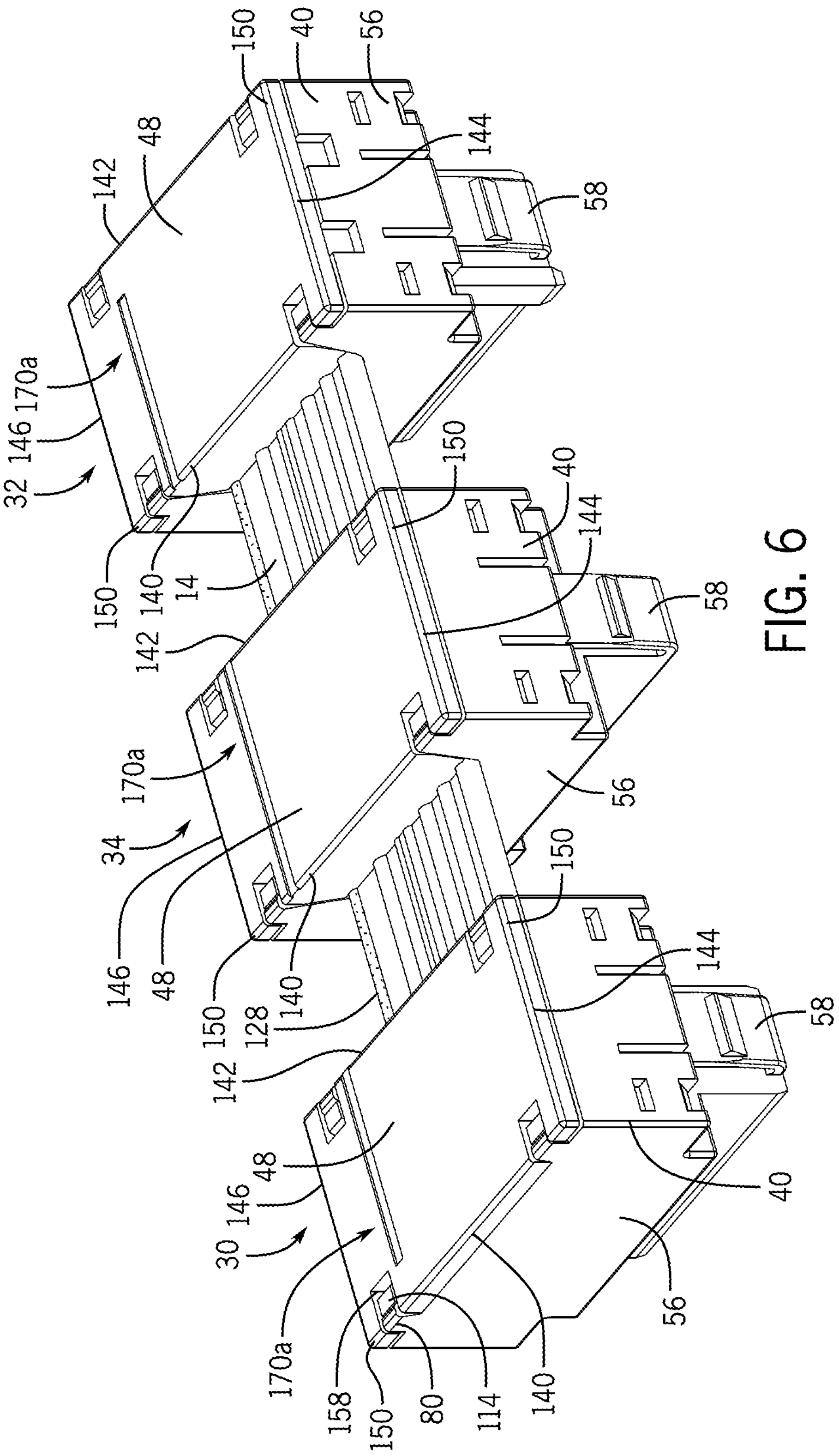
FIG. 6 is a perspective view of a power tap left connector, a node connector, and a power tap right connector, according to some embodiments, installed on a ribbon cable.

More specifically, referring to FIGS. 2-12, the power tap left connector 30 can include a housing 40, a protection cap 42, a printed circuit board 44, a cable organizer 46, and a cover 48. Generally, a ribbon cable 14 can be positioned within (e.g., extend across) an open top 50 of the housing 40 and be supported by the cable organizer 46, as shown in FIG. 4. The ribbon cable 14 can be enclosed within the housing 40 by the cover 48 when the power tap left connector 30 is in an assembled state, as shown in FIGS. 5 and 6. When enclosed within the housing 40, individual conductors 22 of the ribbon cable 14 can engage one or more conductor contacts 52 (such as insulation-displacement contacts (IDCs) and/or insulation-piercing contacts (IPCs)) extending from the printed circuit board 44. The housing 40 can be further adapted to plug into a corresponding jack on a power tap to electrically and physically connect the ribbon cable 14 to the power tap.

More specifically, with respect to the housing 40, in some embodiments, the housing 40 can support and enclose the printed circuit board 44 and the cable organizer 46 therein, and can be coupled to the cover 48 in a manner so that an open top 50 of the housing 40 can be selectively covered by the cover 48, as further described below. The housing 40 can be generally rectangular in shape and can include an upper section 56 and a lower section 58, the open top 50 (e.g., at the upper section 56) and an open bottom 60 (e.g., at the lower section 58), a first side 62, a second side 64, a first end 66, and a second end 68. As shown in FIG. 4, when a ribbon cable 14 is positioned in the housing 40, the ribbon cable 14 terminates along the first side 62 within the upper section 56, and extends out of the housing 40 from the second side 64.

As shown in FIGS. 2 and 3, the upper section 56 of the housing 40 can include a first side edge 70, a second side edge 72, a first end edge 74, and a second end edge 76 that define the open top 50. In some embodiments, the first side edge 70 can be a raised edge with a substantially straight profile, including an indented cover track 78 and one or more cover projections 80 that extend upward away from the housing 40. The first side edge 70 can be raised in order to cover a cut edge of a ribbon cable 14 when the ribbon cable 14 is coupled to the power tap left connector 30, that is, so that the cut edge of the ribbon cable 14 remains enclosed within the housing 40 when the ribbon cable 14 is coupled to the power tap left connector 30.

As shown in FIG. 3, the second side edge 72 can be a lowered edge with a profile 82 configured to permit a ribbon cable 14 to extend out from the second side 64 of the housing 40 when the ribbon cable 14 is coupled to the power tap left connector 30. For example, as described above with respect to FIG. 1A, a ribbon cable 14 can include a ribbon profile 28 defined by outer contours of the insulated conductors 22 of the ribbon cable 14. The second side edge 72 can therefore include an inverse ribbon profile 82 between two cover projections 80 that substantially corresponds to the ribbon profile 28 of a ribbon cable 14, allowing the ribbon cable 14 to sit within the profile 82. As a result, the housing 40 can facilitate and maintain proper alignment of the ribbon cable 14 within the housing 40 when the ribbon cable 14 is coupled to the power tap left connector 30.

Furthermore, as shown in FIGS. 2 and 3, the first end edge 74 of the upper section 56 of the housing 40 can include a straight profile. The second end edge 76 of the upper section 56 of the housing 40 can include a first latch extension 84. For example, the second end edge 76 can include spaced apart notches 86 that define the first latch extension 84, extending vertically upward, therebetween. As further described below, the first latch extension 84 and the notches 86 can support rotation and translation of the cover 48 relative to the housing 40.

In some embodiments, as shown in FIGS. 3-5, the lower section 58 of the housing 40 can be integral with the upper section 56, though smaller than the upper section 56. The lower section 58 can be dimensioned to define the open bottom 60 and also to plug into a power tap jack of a power tap (such as the intelligent power tap 18 or the non-intelligent power tap 20 of FIG. 1). For example, the lower section 58 can include spring-like protrusions 87 (e.g., on first and second ends 66, 68) that facilitate coupling the connector 30 to a power tap jack when the housing 40 is plugged into the power tap jack. For example, the protrusions 87 can engage mating seats within the power tap jack (not shown) when the lower section 58 is plugged into the power tap jack. Furthermore, as shown in FIG. 3, to facilitate proper directional (e.g., right-left) alignment of the connector 30 with a power tap jack, the lower section 58 can be longer on the second end 68 than the first end 66 to define a corner extension 88. As a result, the lower section 58 can include a generally rectangular profile with the corner extension 88, which matches a corresponding rectangular opening and corner extension of the power tap jack (not shown). With this configuration, the connector 30 may only be coupled to the power tap in one orientation, when the corner extensions 88 align.

Furthermore, as shown in FIGS. 2 and 3, the lower section 58 of the housing 40 can be selectively covered by the protection cap 42 in order to cover the open bottom 60. As a result, the protection cap 42 can protect an interior of the housing 40 from outside elements when the connector 30 is not connected to a power tap and can protect components within the interior of the housing 40 (such as the printed circuit board 44) from tooling when the connector 30 is placed in its assembled state, as further described below. In some embodiments, the lower section 58 can include grooves 90 (e.g., along first and second sides 62, 64), as shown in FIG. 5, configured to receive detents 92 of the protection cap 42, as shown in FIGS. 2 and 3, to couple the components together. More specifically, as shown in FIGS. 2 and 3, the protection cap 42 can include pivotable latches 94 with the detents 92 adjacent inner, top ends thereof. At rest, the latches 94 can urge inward; however, the latches 94 can be rotated outward when bottom ends of the latches 94 are pressed. As a result, a user can squeeze the bottom ends of the latches 94 to place the protection cap 42 over the lower section 58 of the housing 40 until the top ends of the latches 94 are adjacent the upper section 56, and then release the bottom ends so that the detents 92 urge inward to engage the grooves 90 and fix the protection cap 42 to the lower section 58. To disengage the protection cap 42 from the housing 40, the user can again squeeze the latches 94 to release the detents 92 from the grooves 90 and freely slide the protection cap 42 off the lower section 58. In some embodiments, the protection cap 42 can be in the form of a protection cap jack, containing circuitry and incorporating electrical contact pins which mate to a connector socket receptacle 100 (shown in FIG. 3) in a fashion similar to how a device (in this example, a power tap) would mate with the connector socket receptacle 100. Accordingly, should the connector 30 be removed from the device, for example in the event of device repair or replacement, the protection cap jack could replace the device either temporarily or permanently, thereby maintaining the data transmission and signal integrity along the ribbon cable data conductors 22.

Referring again to FIG. 3, the upper and lower sections 56, 58 of the housing 40 can define an interior space 96 that houses the printed circuit board 44. More specifically, in some embodiments, the printed circuit board 44, such as a printed circuit board assembly, can sit within the housing 40 and can include, extending from an upper end thereof, one or more individual and distinct conductor contacts 52, each of which are separately soldered or pressed-in to the printed circuit board 44 with a mechanical and electrical connection, sufficient to connect the printed board circuits to the various individual conductors 22 of the ribbon cable 14. For example, in some embodiments, the conductor contacts 52 can include one or more insulation-displacement contacts (IDCs) and/or one or more insulation-piercing contacts (IPCs).

In some embodiments, the printed circuit board 44 and the conductor contacts 52 are positioned within the upper section 56 of the housing 40. For example, as shown in FIG. 5, the upper section 56 can include a bottom seat 98 defined by an inward-stepped portion that connects the upper section 56 to the lower section 58, and the bottom seat 98 can support the printed circuit board 44 within the upper section 56. In some embodiments, the printed circuit board 44 can extend within the interior space 96 across the upper section 56 to define open areas between respective ends of the printed circuit board 44 and the first and second ends 66, 68 of the housing 40. As further described below, lower detents 112 of the cable organizer 46 and/or portions of the cover 48 can extend into the open areas.

The conductor contacts 52 can be located along the printed circuit board 44 so that they can be configured to electrically contact individual conductors 22 of a ribbon cable 14 when the connector 30 is in its assembled state, as further described below. For example, in some embodiments, the printed circuit board 44 of the power tap left connector 30 is configured only to electrically engage power conductors 22 of a ribbon cable 14. In other embodiments, however, the printed circuit board 44 of the power tap left connector 30 can be configured to engage power and data conductors 22 of the ribbon cable 14.

The printed circuit board 44 further includes, extending from a lower end thereof into the lower section 58 of the housing 40, a connector socket receptacle 100 electrically coupled to the conductor contacts 52 and accessible via the open bottom 60 of the housing 40. For example, the connector socket receptacle 100 can be adapted to plug into a corresponding power tap jack on a power tap to electrically and physically connect the ribbon cable to the power tap when the lower section 58 of the housing 40 is plugged into the power tap jack.

As noted above, the conductor contacts 52 can be positioned to individually contact conductors 22 of a ribbon cable 14, and the cable organizer 46 can be configured to maintain a position of the ribbon cable 14 to enable such connections. More specifically, still referring to FIGS. 2-6, the cable organizer 46 can sit within and be supported by the housing 40, positioned over top of the printed circuit board 44 so that it accessible via the open top 50 of the housing 40.

As shown in FIG. 3, the cable organizer 46 can include a first side 102, a second side 104, a first end 106, and a second end 108 that generally align with the first side 62, the second side 64, the first end 66, and the second end 68, respectively, of the housing 40. The cable organizer 46 can also include a generally flat surface 110 with one or more lower detents 112 that extend generally downward from the flat surface 110 (e.g., along corners of the cable organizer 46 or at other positions along the sides 102, 104 or ends 106, 108) and one or more upper detents 114 that extend generally upward from the flat surface 110 (e.g., along corners of the cable organizer 46 or at other positions along the sides 102, 104 or ends 106, 108). Furthermore, referring still to FIG. 3, the cable organizer 46 can include a second latch extension 116 that extends from the second end 108. For example, the second end 108 can include spaced apart notches 118 that define the second latch extension 116, extending horizontally outward, therebetween. As such, the second latch extension 116 can extend generally perpendicular relative to the first latch extension 84 of the housing 40.

In some embodiments, the cable organizer 46 can include a plurality of longitudinal grooves or guideways 120 in the flat surface 110 extending from the first side 102 to the second side 104 thereof and configured to receive insulated conductors 22 of a ribbon cable 14. For example, as described above, a ribbon cable 14 includes a ribbon profile 28 defined by outer contours of the insulated conductors 22. The longitudinal guideways 120 of the cable organizer 46 can define an inverse ribbon profile 122 that substantially corresponds to the ribbon profile 28 of the ribbon cable 14 (e.g., matching the inverse ribbon profile 82 of the second side edge 72 of the housing 40), thus permitting proper alignment of individual conductors 22 of the ribbon cable 14 within the connector 30 when the ribbon cable 14 is placed on the cable organizer 46.

The cable organizer 46 further includes a plurality of apertures 124 extending through one or more of the longitudinal grooves 120 and configured to axially align with the conductor contacts 52, as further described below. In some embodiments, to facilitate proper alignment of the ribbon cable 14 within the cable organizer 46 so that respective conductor contacts 52 engage desired conductors 22, especially for ribbon cables 14 with asymmetric profiles 28, one or more guideways 120 of the cable organizer 46 can include an orientation indicator, such as a colored strip 126, shown in FIGS. 15 and 17. The colored strip 126 can be aligned with a mating colored strip 128 on a ribbon cable 14 when the ribbon cable 14 is placed on the cable organizer 46, as shown in FIG. 4. In some embodiments, the cable organizer 46 and/or the ribbon cable 14 can include other types of orientation indicators.

In some embodiments, as shown in FIGS. 14-17, the cable organizer 46 can further include cable grab hooks 130 at one or both outermost guideways 120 that can help position and retain the ribbon cable 14 until the connector 30 is placed in the assembled state. That is, the cable organizer 46 can include the flat surface 110, with inner guideways 120 each extending downward a depth to create the inverse ribbon profile 122 matching a lower half of the ribbon cable 14. However, the cable grab hooks 130 can include upward extensions 132 that extend upward from the flat surface 110 (e.g., upward from an outermost guideway 120), above the inner guideways 120, and curve inward toward each other to match and engage at least a portion of an upper half of the ribbon cable 14.

Figure 15:
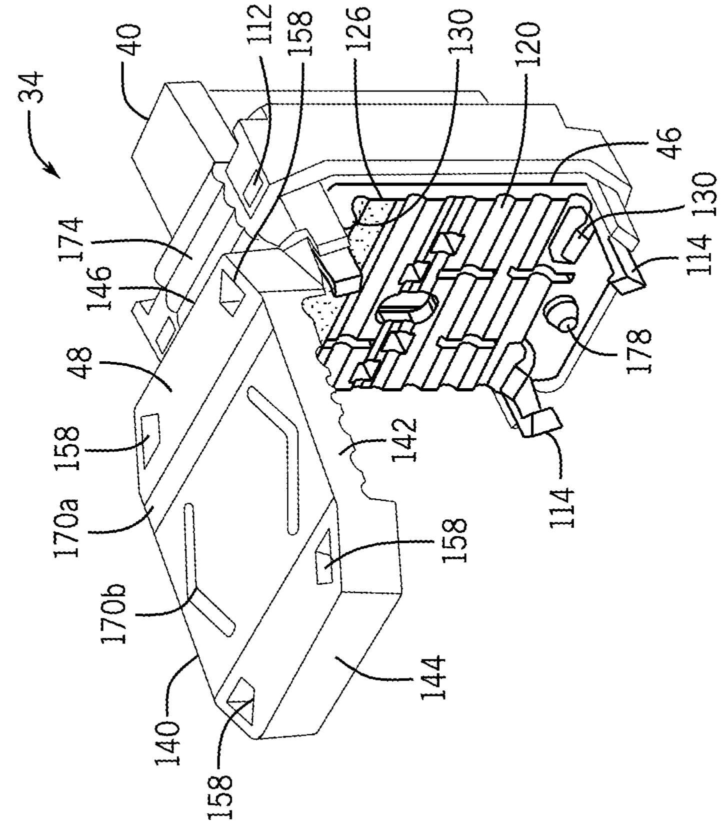
FIG. 15 is a perspective side view of a node connector, according to some embodiments, in a preassembled state.
Figure 17:
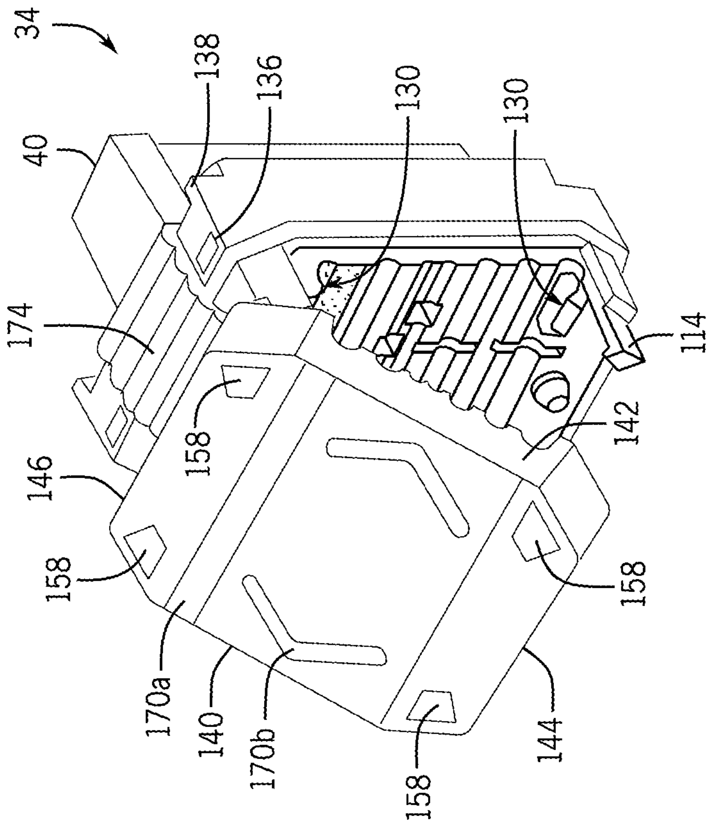
FIG. 17 is another perspective side view of a node connector, according to some embodiments, in a preassembled state.

In other words, a first cable grab hook 130 can be positioned adjacent a first end 144 of the cable organizer 46, and can include an upward extension 132 that extends upward from the flat surface 110 and curves toward a second end 146 of the cable organizer 46. In this manner, the first cable grab hook 130 can engage an outermost conductor 22 of the ribbon cable 14 by a snap-fit engagement. Furthermore, a second cable grab hook 130 can be positioned adjacent the second end 146 of the cable organizer 46, and can include an upward extension 132 that extends upward from the flat surface 110 and curves toward the first end 144 of the cable organizer 46. In this manner, the second cable grab hook 130 can engage an outermost conductor 22 of the ribbon cable 14 by a snap-fit engagement. Additionally, in some embodiments, the cable grab hooks 130 can extend an entire length of the cable organizer 46 from the first side to the second side. In other embodiments, as shown in FIGS. 15 and 17, the cable grab hooks 130 can extend a portion of the entire length of the cable organizer 46.

The ribbon cable 14 can, therefore, snap into the cable grab hooks 130, enabling proper alignment of the ribbon cable 14 within the connector 30 as well as improved security of the ribbon cable 14 within the connector 30 in both the preassembled and assembled states. More specifically, the cable grab hooks 130 can enable proper alignment of the ribbon cable 14 by substantially preventing the ribbon cable 14 from shifting or yawing within the cable organizer 46 (e.g., between the first end 106 and the second end 108) due to the higher curved extensions 132 of the cable grab hooks 130 preventing such movement. By restricting shifting and/or lateral movement, the cable grab hooks 130 can also enable proper alignment by maintaining the ribbon cable 14 parallel with the longitudinal grooves 120 so that the conductor contacts 52 only contact desired conductors 22, thus preventing inadvertent connections to additional conductors 22.

Additionally, in some embodiments, a curvature of the cable grab hooks 130 can be equal to or slightly smaller than a curvature of the outermost conductors 22 of the ribbon cable 14. As a result, the cable grab hooks 130 can enable proper securement of the ribbon cable 14 by substantially preventing the ribbon cable 14 from shifting or yawing within the cable organizer 46 (e.g., between the first side 102 and the second side 104) when installed on the cable organizer 46 due to the substantially tight fit. Thus, in some embodiments, the cable grab hooks 130 can prevent the ribbon cable 14 from shifting in any direction along a plane parallel to the flat surface 110 of the cable organizer 46, and can further prevent the ribbon cable 14 from moving out of the cable organizer 46 (that is, perpendicular to the flat surface 110).

Figure 14:
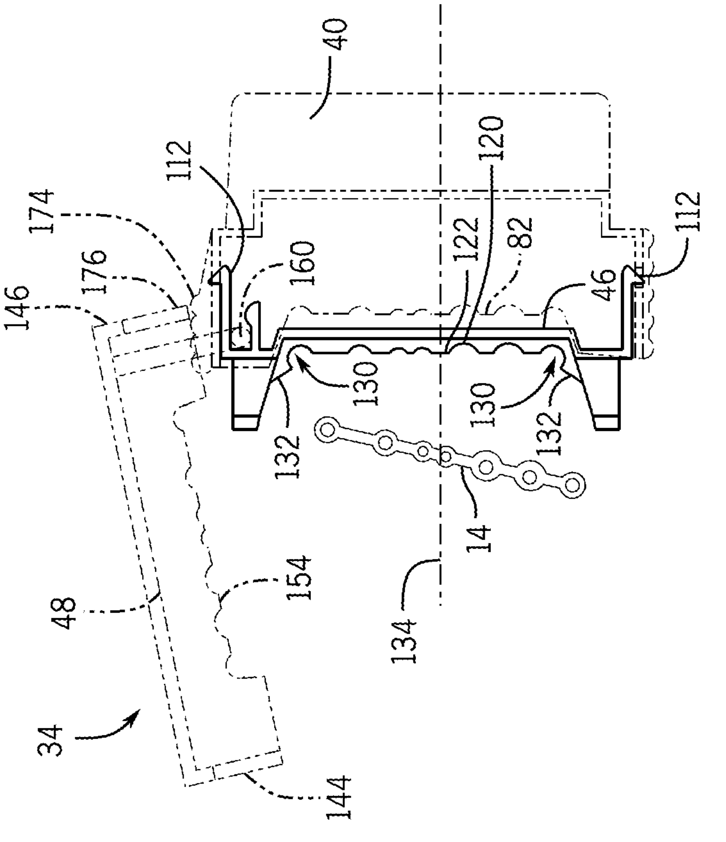
FIG. 14 is a side view of a node connector, according to some embodiments, in a preassembled state.
Figure 16:
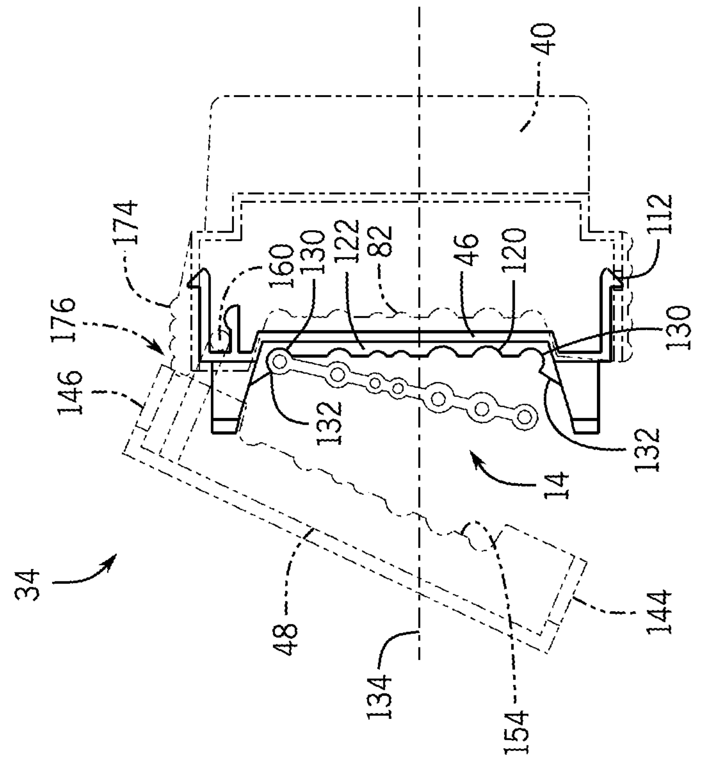
FIG. 16 is another side view of a node connector, according to some embodiments, in a preassembled state.

The snap-in feature created by the cable grab hooks 130 can also provide feedback to a user that the ribbon cable 14 is properly installed on the cable organizer 46. For example, in some embodiments, the ribbon cable 14 can be moved directly downward along an axis 134 (e.g., perpendicular to the flat surface 110, as shown in FIGS. 14 and 16) so that outermost conductors 22 of the ribbon cable 14 rest upon the upward extensions 132 of the cable grab hooks 130. A user can then press against each outermost conductor 22, causing the ribbon cable 14 to slightly deform until it snaps into the respective cable grab hook 130. Alternatively, in some embodiments, as shown in FIGS. 14 and 16, the ribbon cable 14 can be moved at an angle relative to the axis 134, so that a first outermost conductor 22 is slid into a first cable grab hook 130 and a second outermost conductor 22 rests upon the upward extension 132 of the second cable grab hook 130. The user can then press against the second outermost conductor 22, causing the ribbon cable 14 to slightly deform until the second outermost conductor 22 snaps into the second cable grab hook 130. The snapping engagement can provide tactile feedback to the user that the ribbon cable 14 is properly aligned and secured within the cable organizer 46.

To further facilitate ribbon cable installation, the cable organizer 46 can be moveable in an axial direction within the housing 40, for example, along the axis 134. In some embodiments, the cable organizer 46 can be moved between a first position when the connector 30 is in a preassembled state (as shown in FIGS. 2 and 4) and a second, lower position when the connector 30 is in an assembled state (as shown in FIGS. 5 and 6). For example, in some embodiments, the housing 40 can include one or more upper slots 136 extending through the first and second ends 66, 68, and one or more lower slots 138 extending through the first and second ends 66, 68 and positioned a distance below the upper slots 136. In some embodiments, the upper slots 136 and the lower slots 138 can extend entirely through the first and second ends 66, 68, while in other embodiments, the slots 136, 138 may be blind holes that extend only partially through the first and second ends 66, 68 from the interior 96 of the housing 40. The lower detents 112 of the cable organizer 46 can be configured to engage or snap into the slots 136, 138 of the housing 40 when the cable organizer 46 is in the first position and the second position, respectively.

More specifically, in the preassembled state, the lower detents 112 can each engage a respective upper slot 136 of the housing 40. In this position, as shown in FIGS. 2 and 4, the flat surface 110 of the cable organizer 46 can generally align with the flat, first end edge 74 of the housing 40 (thus placing the cable organizer 46 within, or extending across, the open top 50) and the inverse ribbon profile 122 of the cable organizer 46 can be positioned above the inverse ribbon profile 82 of the second side edge 72 of the housing 40. Furthermore, in the preassembled state, an outer edge of the second latch extension 116 can generally align with and be adjacent to an outer edge the first latch extension 84 at the second end edge 76 of the housing 40 so that the respective notches 118, 86 are aligned. Additionally, in the preassembled state, the cable organizer 46 is spaced a first distance above the printed circuit board 44 so that the conductor contacts 52 do not extend through the apertures 124 of the cable organizer 46.

In the assembled state, the cable organizer 46 can be pressed axially downward along the axis 134 into the housing 40 so that the lower detents 112 disengage the upper slots 136 and slide down the interior 96 of the housing 40 until they each engage (e.g., snap into) a respective lower slot 138, as shown in FIG. 5. In this position, the inverse ribbon profile 122 of the cable organizer 46 can be aligned with the inverse ribbon profile 82 of the second side edge 72 of the housing 40. Furthermore, in the assembled state, the upper detents 114 of the cable organizer 46 can align with and be adjacent to the projections 80 on the first and second side edges 70, 72 of the housing 40, as shown in FIG. 6, and the second latch extension 116 can be positioned below the first latch extension 84. Additionally, in the assembled state, the cable organizer 46 is spaced a second distance above the printed circuit board 44 so that the conductor contacts 52 extend through the apertures 124 and, as a result, can engage the individual conductors 22 of the ribbon cable 14 received within the longitudinal grooves 120.

In the assembled state, the cable organizer 46 can be enclosed within the housing 40 by the cover 48. In some embodiments, as shown in FIGS. 2-6, the cover 48 can be generally rectangular in shape and include a first side 140, a second side 142, a first end 144, and a second end 146. The cover 48 can also include an upper surface 148 with extended edges 150 along the first end 144, the second end 146, and the first side 140. As shown in FIGS. 4 and 5, a bottom surface 152 of the cover 48 can include an inverse cable profile 154 extending from the first side 140 to the second side 142 (e.g., corresponding to the cable profile 28 of a ribbon cable 14) and one or more apertures or indentations 156 (as shown in FIG. 5). The cover 48 can include one or more notches 158 at or adjacent the first side 140 and the second side 142, extending partially or completely through the upper and bottom surfaces 148, 152. Furthermore, the cover 48 can include a latch 160 extending downward from the second end 146. For example, the latch 160 can be substantially U-shaped with two extensions 162 extending downward from the second end 146 and a horizontal bar 164 connecting lower ends of the extensions 162 to define an open slot 166 between the second end 146, the extensions 162, and the bar 164. In some embodiments, the open slot 166 can be sized to receive the first latch extension 84 (of the housing 40) or the second latch extension 116 (of the cable organizer 46), and the extensions 162 can be sized to permit their free movements within the notches 86, 118, as further described below.

When in the assembled state, as shown in FIGS. 5 and 6, the cover 48 can cover the open top 50 of the housing 40 to capture and entrap the ribbon cable 14 within the housing 40 between the cover 48 and the cable organizer 46. That is, the ribbon cable 14 can be held between the lower inverse ribbon profile 122 of the cable profile and the inverse cable profile 154 of the bottom surface 152 of the cover 48, thereby preventing vertical and/or horizontal movement of the ribbon cable 14 within the connector 30 to facilitate secured connections between the cable conductors 22 and the conductor contacts 52. For example, as shown in FIG. 6, the first side 140, the second side 142, the first end 144, and the second end 146 of the cover 48 can generally align with the first side edge 70, the second side edge 72, the first end edge 74, and the second end edge 76, respectively, of the housing 40. The extended edges 150 of the first and second ends 144, 146 and the first side 140 can also rest upon the first and second end edges 74, 76 and the first side edge 70 of the housing 40, respectively. Furthermore, as shown in FIG. 6, the notches 158 of the cover 48 can align with and receive the projections 80 and upper detents 114 of the housing 40 and the cable organizer 46, respectively. More specifically, as shown in FIG. 3, each notch 158 can include a shoulder 168 onto which a respective upper detent 114 can engage when the cover 48 is pressed onto the housing 40, thus locking together the connector 30 in the assembled state, coupling the cover 48 to the cable organizer 46.

Figure 19:
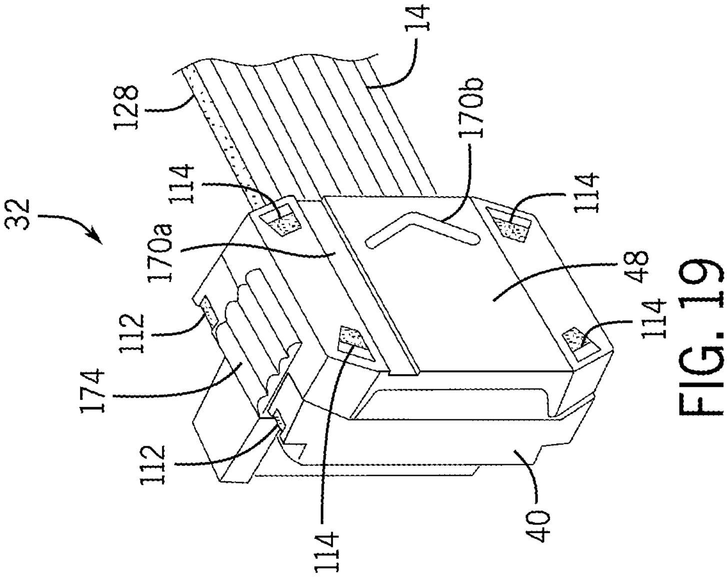
FIG. 19 is a perspective view of a power tap left connector, according to some embodiments, in an assembled state, installed on a ribbon cable.
Figure 18:
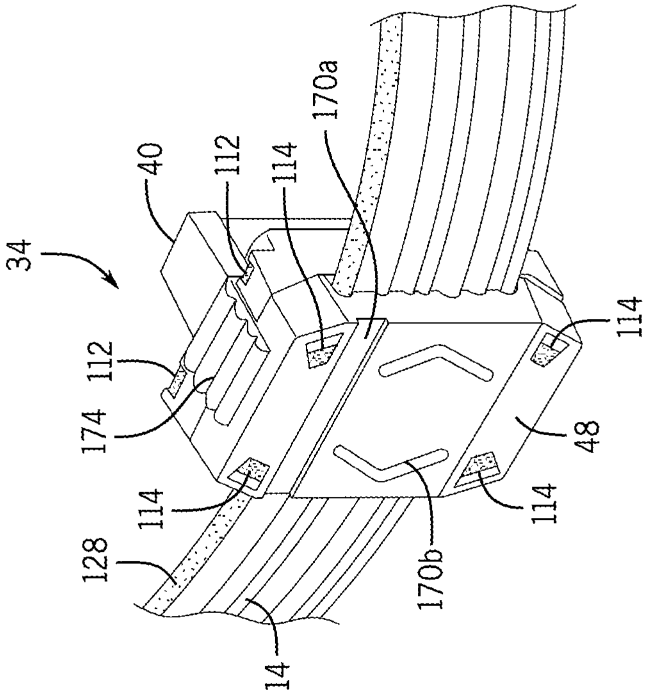
FIG. 18 is a perspective view of the node connector of FIG. 15 in an assembled state, installed on a ribbon cable.

In some embodiments, as shown in FIGS. 14-19, the upper detents 114 and/or the lower detents 112 (or the entire cable organizer 46) can comprise a different color or pattern than the cover 48 and/or the housing 40. As described above, when in the assembled state, the upper detents 114 can extend into the notches 158 of the cover 48, and the lower detents 112 can extend into the lower slots 138 of the housing 40. As a result, when in the assembled state, as shown in FIGS. 18 and 19, the cable organizer 46 is enclosed by the cover 48 and the housing 40, but the upper detents 114 and the lower detents 112 can be visible through the notches 158 and lower slots 138. Furthermore, when an upper detent 114 properly engages a respective shoulder 168 of a notch 158, properly locking together the connector 30 in the assembled state, an upper edge of the upper detent 114 can lie flush with the upper surface 148 of the cover 48. By providing the detents 114, 112 as a different color or pattern than the cover 48 and/or the housing 40, the detents 114, 112 not only serve to couple together the cover 48 and the housing 40, but also can serve as mechanical, visual indicators that signal to a user that the cover 48 and the cable organizer 46 are seated properly and the connector 30 is properly assembled.

These visual indicators further signal to the user that the conductors 22 of the ribbon cable 14 are properly connected. For example, if one detent 114, 112 is not viewable in the respective notch 158 or lower slot 138, or only extends partially into the respective notch 158 or lower slot 138, this can serve as a visual indicator that that portion of the connector 30 is misaligned and/or not fully engaged. As such, locating first, second, third, and fourth detents 114, 112 adjacent corners of the connector 30, as shown in FIGS. 14-19, can provide an indication that the connector 30 is fully and evenly engaged. If one corner is not completely engaged, the ribbon cable 14 may be able to laterally move within the connector 30, potentially causing inadvertent connections to multiple conductors 22.

Additionally, while the colored lower detents 112 are discussed above with respect to the lower slots 138 in the assembled position, the lower detents 112 can also act as visual indicators when extending through the upper slots 136 in the preassembled position, as shown in FIGS. 14-17. This can be helpful to a user because, if the cable organizer 46 is between the assembled position and the preassembled position, the cable organizer 46 can freely move within the housing 40, making it difficult to position and maintain the ribbon cable 14 on the cable organizer 46. Accordingly, by providing openings in the cover 48 and the housing 40 (e.g., the notches 158 and the slots 136, 138) and colored detents 112, 114 extending from the cable organizer 46, the connector 30 can provide simple indications to the user that the connector 30 is properly set in the preassembled state or the assembled state.

Additionally, in some embodiments, as shown in FIGS. 2, 3, and 6, the upper surface 148 of the cover 48 can include one or more features 170 that provide information to a user, for example, when the connector 30 is in the assembled or preassembled state. According to a first example, the cover 48 can include a first feature in the form of a horizontal line 170*a* adjacent the first or second end 144, 146. The line 170*a* may be an indented or protruding line formed in the upper surface 148, or a colored line applied (e.g., painted on, etched on, etc.) to the upper surface 148. The line 170*a* can align with the cable orientation strip 126 along the cable organizer 46 to further assist proper positioning of a ribbon cable 14 in the connector 30 and assist with proper orientation of the connector 30 relative to a power tap. In another example, the cover 48 can include a second feature in the form of a terminated edge indicator 170*b* adjacent the first side 140 and/or the second side 142. The indicator 170*b* can be a square, rectangle, line, arrow, or other shape formed as an indent or protrusion in the upper surface 148 or applied to the upper surface 148. For example, in the power tap left connector 30, a cut end of a ribbon cable 14 is adjacent a first, or left, side thereof, and the ribbon cable 14 extends out of the connector from the second, or right, side thereof. Thus, the terminated edge indicator 170*b* can indicate to a user a position of a cut edge of an installed ribbon cable 14 (e.g., along the first side 140) and/or a direction of ribbon travel (e.g., toward the second side 142). In another example, in the node connector 34, shown in FIGS. 14-17, indicators 170*b* in the form of arrows are adjacent both sides of the connector 34, illustrating that the ribbon cable 14 extends out from both sides. Alternatively, the horizontal line 170*a* can indicate both alignment of the cable orientation strip 126 and direction of ribbon travel. For example, as shown in power tap left connector 30 of FIG. 6, the horizontal line 170*a* extends across the upper surface 148 to the second side 142, but stops short of the first side 140, indicating that ribbon travel does not extend past the first side 140.

In some embodiments, in the preassembled state, as shown in FIGS. 2 and 4, the cover 48 can remain coupled to, and also move relative to, the housing 40 via the latch 160 of the cover 48 engaging with the first latch extension 84 of the housing 40 and/or the second latch extension 116 of the cable organizer 46. For example, in the preassembled state, the latch extensions 84, 116 can be positioned relative to one another to prevent the latch 160 from being disengaged with the latch extensions 84, 116. In this manner, the latch 160 of the cover 48, the first latch extension 84 and notches 86 of the housing 40, and the second latch extension 116 and notches 118 of the cable organizer 46 form a latch assembly of the connector 30 that permits the cover 48 to be moved relative to the housing 40. More specifically, as described above, in the preassembled state, the cable organizer 46 is positioned relative to the housing 40 so that second latch extension 116 aligns with a top edge the first latch extension 84 of the housing 40, and the notches 86 align with the notches 158. Furthermore, the second latch extension 116 can extend through the open slot 166 of the cover latch 160, thus maintaining the bar 164 within the interior 96 of the housing 40.

As a result, the cover 48 can freely translate along the axis 134 in a first, upward direction, with the extensions 162 able to move through the notches 118, until reaching an upward-most position when the bar 164 engages the second latch extension 116 and stops vertical movement. And the cover 48 can freely translate in a second, downward direction until reaching a downward-most position when the second end 146 of the cover 48 engages the second latch extension 116 and stops vertical movement. Thus, the cover 48 can freely translate along the axis 134 a specified vertical distance between the upward-most position and the downward-most position.

Furthermore, while vertical movement is permitted, horizontal movement of the cover 48, along a plane perpendicular to the axis 134, can be generally restricted in a first direction (e.g., toward the first end 144) due to the extensions 162 contacting the cable organizer 46, in a second, opposite direction (e.g., toward the second end 146) due to the extensions 162 and/or the bar 164 contacting the second end 68 of the housing 40, and in third and fourth directions perpendicular to the first direction (e.g., toward the first and second sides 140, 142) due to the extensions 162 contacting the second latch connector 116.

However, because the notches 86 of the housing 40 align with the notches 118 of the cable organizer 46 in the preassembled state, the cover 48 can freely rotate relative to the housing 40. More specifically, the cover 48 can be rotated away from the housing 40 so that the extensions 162 of the latch 160 move from the notches 118 of the cable organizer 46 into the notches 86 of the cover 48, until the first latch extension 84 extends through the slot 166. For example, the latch 160 can rotate within the notches 86, 118 until the bar 164 engages a lower surface of the second latch extension 116. Due to the free vertical movement of the cover 48, as described above, the latch 160 is not rotated about a fixed axis but, rather, can be rotated about a moving axis anywhere along the specific vertical distance. For example, the axis may be defined by the vertical position of the cover and, more specifically, by a position of the second latch extension 116 within the open slot 166.

Accordingly, the cover 48, the housing 40, and the cable organizer 46 form a hinged closure-type configuration. However, the cover 48 can be moved along a non-specific trajectory with a combination of translations and rotations, creating a moving axis and an extended range of motion greater than, for example, a fixed axis hinge joint or a floating hinge with two parallel axes of rotation. In this manner, the cover 48 can be closed in a less constrained manner, regardless of varying cable cross-sections, multiple conductors of equal or mixed sizes, and other obstructive physical barriers and features.

Additionally, when in the assembled position, as shown in FIGS. 5 and 6, the latch 160 engages with the second latch extension 116, which is positioned below the first latch extension 84. For example, the second latch extension 116 can be positioned below the first latch extension 84 so that the notches 118 no longer align with the notches 86 but, rather, align with the solid surface of the second end 68 of the housing. The cover 48, therefore, cannot rotate because the extensions 162 engage the solid second end 68 of the housing 40 rather than the open notches 86. Thus, the cover 48 can be rotated so that the latch 160 engages the first latch extension 84 in the preassembled state to facilitate insertion of a ribbon cable 14, as described below. And to assemble the connector 30 in the assembled state, the latch 160 can be rotated back so that the latch 160 engages the second latch extension 116. In some embodiments, to facilitate proper alignment once rotated back, the cable organizer 46 can include a protrusion 178 (shown in FIG. 4) that can fit into an aperture (e.g., a blind hole, not shown) through the bottom surface 152 of the cover 48 adjacent the first end 144. Once aligned, the cover 48 is translated downward into the housing 40 so that further rotation is hindered.

The latch assembly described above allows re-use of the cover 48 with a multiplicity of connectors (as further described below), thus creating several variant combinations which take advantage of the same, universal cover 48. In some embodiments, the cover 48 may be coupled to the housing 40 at all times, in both the preassembled and assembled states, therefore reducing the chances of losing components. However, in some embodiments, the cover 48 may be configured to be selectively uncoupled from the housing 40.

Additionally, in some embodiments, as shown in FIGS. 14-19, the housing 40 can include one or more cover detents 174 positioned along the second end 68 of the upper section 56 of the housing 40. The cover detents 174 can be configured to receive a bottom, second end edge of the cover 48 as the cover 48 is rotated relative to the housing 40. For example, when coupled to a power tap, the connector 30 is in a substantially vertical position where the second end 146 is above the first end 144. Without the cover detents 174, the cover 48 would naturally remain in a closed position due to gravity. The cover detents 174 can thus help hold the cover 48 open at discrete positions to facilitate installation of the ribbon cable 14 into the connector 30. Accordingly, FIGS. 14 and 15 illustrate the cover 48 being held open relative to the housing 40 by a detent 174 at a first discrete position, and FIGS. 16 and 17 illustrate the cover 48 being held open relative to the housing 40 by a detent 174 at a second discrete position.

Figure 7:
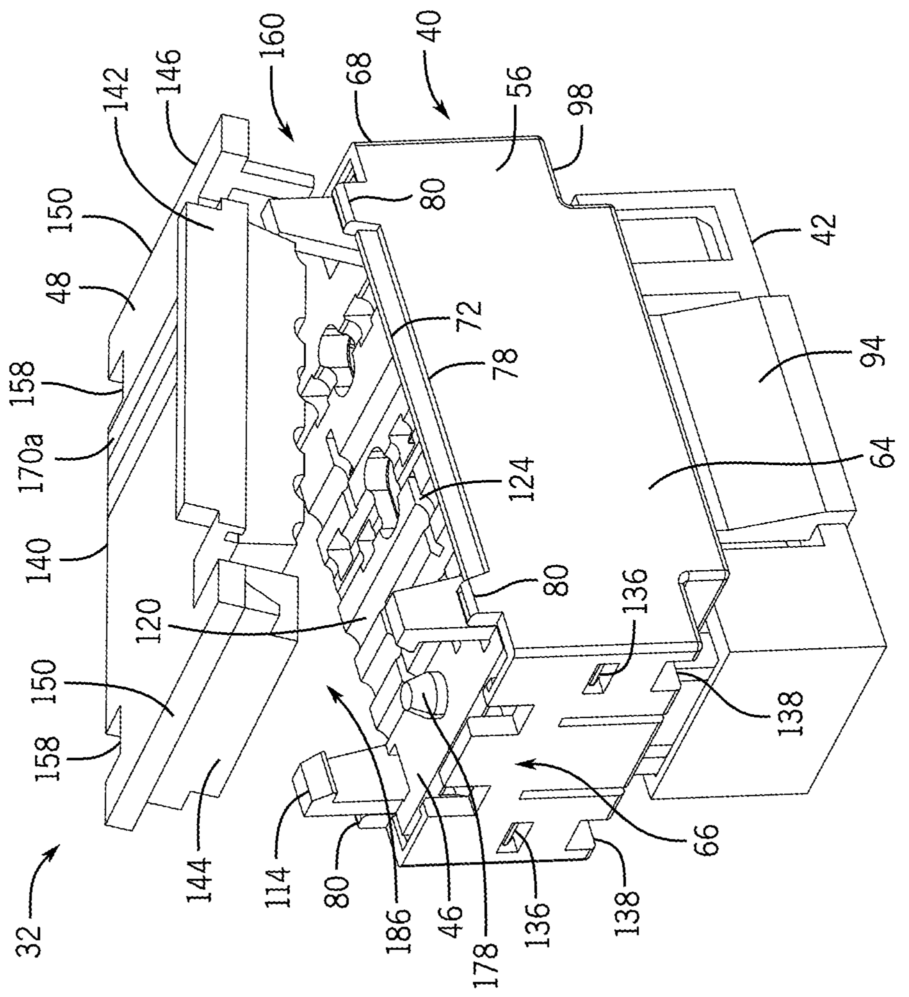
FIG. 7 is a perspective view of a power tap right connector, according to some embodiments, in a preassembled state.
Figure 8:
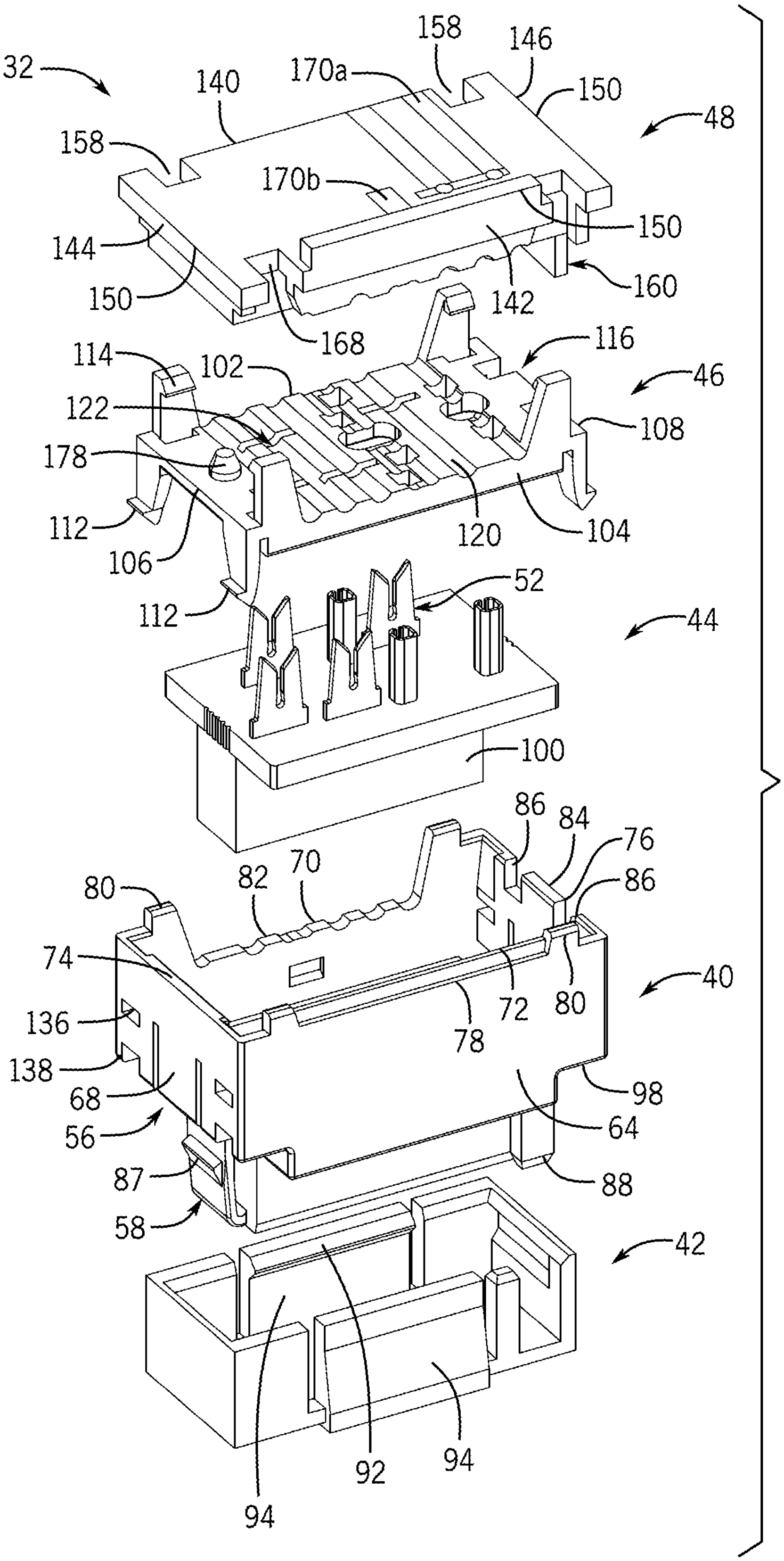
FIG. 8 is a perspective exploded view of the power tap right connector of FIG. 7.
Figure 9:
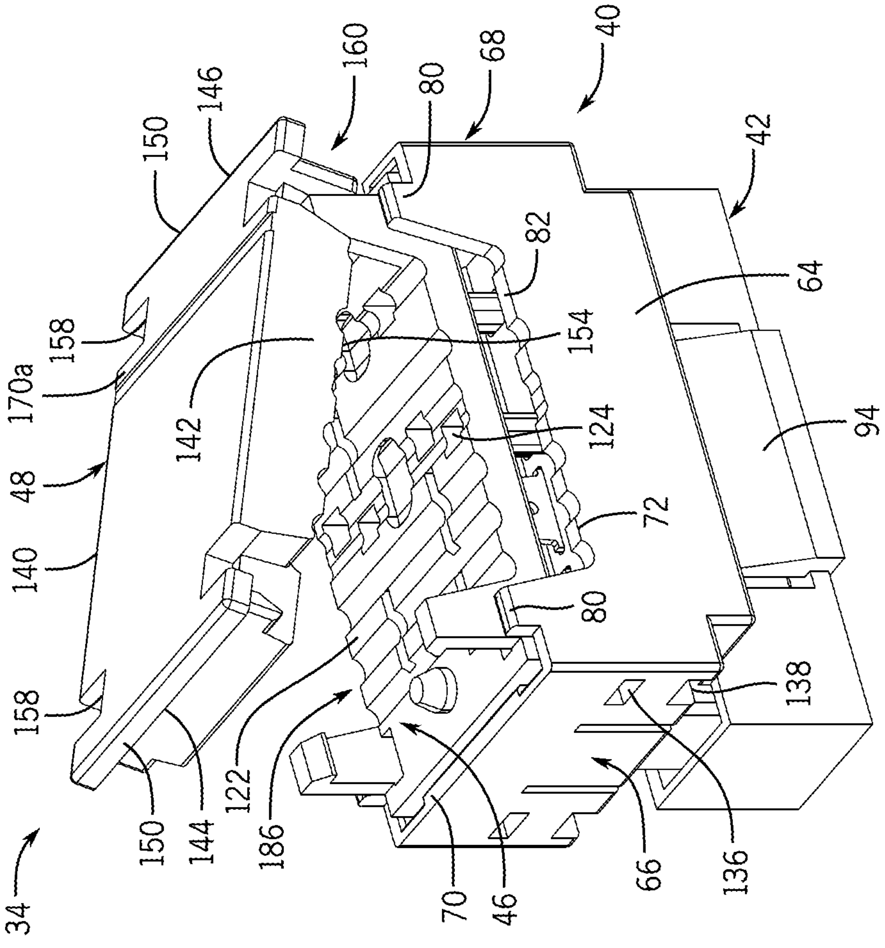
FIG. 9 is a perspective view of a node connector, according to some embodiments, in a preassembled state.

While the connector 30 described above with respect to FIGS. 2-6 is a power tap left connector 30, one or more of the above-described components and features can be incorporated into other connectors in a network, such as the network 10 of FIG. 1. For example, FIGS. 6-8 illustrate a power tap right connector 32; FIGS. 6, 9, and 10 illustrate a node connector 34; FIG. 11 illustrates a terminator 36; and FIG. 12 illustrates a splicer 38. In some embodiments, unless specified otherwise below, any one or more of the above-described components of the power tap left connector 30 can be incorporated into any one of the power tap right connector 32, the node connector 34, the terminator 36, and/or the splicer 38. Thus, in FIGS. 6-11, like numerals illustrate like components as described above with respect to the power tap left connector 30 of FIGS. 2-6. And, while any of the above-described features of the like components of the power tap left connector 30 can be incorporated into any one of the power tap right connector 32, the node connector 34, the terminator 36, and/or the splicer 38 in some embodiments, such features may not be described in detail again below for the sake of brevity.

For example, as shown in FIGS. 6-8, the power tap right connector 32 can include a housing 40, a protection cap 42, a printed circuit board 44, a cable organizer 46, and a cover 48. However, the power tap right connector 32 can generally be a mirror image of the power tap left connector 30. More specifically, in the power tap left connector 30, as described above, a cut end of a ribbon cable 14 is adjacent the first, or left, side thereof, and the ribbon cable 14 extends out of the connector 30 from the second, or right, side thereof. However, in the power tap right connector 32, a cut end of a ribbon cable 14 is adjacent a second, or right, side thereof, and the ribbon cable 14 extends out of the connector 32 from the first, or left, side thereof.

As such, with respect to the housing 40, as shown in FIG. 8, while the first latch extension 84 can remain positioned along the second end 68 of the housing 40, like the power tap left connector 30, features on the first side 62 of the housing 40 of the power tap left connector 30 (such as the raised edge with substantially straight profile) can be incorporated on the second side 64 of the housing 40 of the power tap right connector 32, and features on the second side 64 of the housing 40 of the power tap left connector 30 (such as the inverse ribbon profile 82) can be incorporated on the first side 62 of the housing 40 of the power tap right connector 32. Furthermore, in some embodiments, the printed circuit board 44 can include conductor contacts 52 in the same relative locations, so that the power tap right connector 32 can engage the same conductors 22 as the power tap left connector 30.

Additionally, as shown in FIGS. 7 and 8, the cable organizer 46 of the power tap right connector 32 can be identical to the cable organizer 46 of the power tap left connector 30, and oriented within the housing 40 so that the second latch extension 116 aligns at the same end 68 of the housing 40 as the first latch extension 84. In some embodiments, the cable organizer 46 can include additional apertures 124 so as to accommodate multiple patterns of conductor contacts 52 to be used in any one of the power tap left connector 30, the power tap right connector 32, the node connector 34, the terminator 36, and/or the splicer 38. As such, the cable organizer 46 can be a universal cable organizer 46 for use in any type of connector 30-38. However, in other embodiments, the cable organizer 46 can include apertures 124 specific only to one, two, or more types of connectors 30-38.

Still referring to FIGS. 6-8 and the power tap right connector 32, the cover 48 can be a mirror image of the cover 48 of the power tap left connector 30. For example, while the latch 160 can remain positioned along the second end 146 of the cover 48, like the power tap left connector 30, features on the first side 140 of the cover 48 of the power tap left connector 30 (such as the extended edge 150) can be incorporated on the second side 142 of the cover 48 of the power tap right connector 32, and features on the second side 142 of the housing 40 of the power tap left connector 30 can be incorporated on the first side 140 of the cover 48 of the power tap right connector 32.

Furthermore, the upper surface 148 of the cover 48 can include one or more features 170, such as a terminated edge indicator **170*b* adjacent the second side 142 (e.g., in an opposite position as the terminated edge indicator 170*b* of the power tap left connector 30). For example, as described above, in the power tap right connector 32, a cut end of a ribbon cable 14 is adjacent a second, or right, side thereof, and the ribbon cable 14 extends out of the connector 32 from the first, or left, side thereof. Thus, the terminated edge indicator 170*b* can indicate to a user a position of a cut edge of an installed ribbon cable 14 (e.g., along the second side 142) and/or a direction of ribbon travel (e.g., toward the first side 140). Alternatively, as shown in FIG. 6, the upper surface 148 can include a horizontal line 170*a* that extends across the upper surface 148 to the first side 140, but stops short of the second side 142, indicating that ribbon travel does not extend past the second side 142**.

Accordingly, in some embodiments, the only difference between the covers 48 of the power tap left connector 30 and the power tap right connector 32 may be the extended edge 150 along the first or second side 140, 142, and a placement of the features 170. However, in some embodiments, the cover 48 may be manufactured without such components. For example, the cover 48 may not include the components, or the components can be applied to the cover 48 after manufacture based on its use with a desired connector. As such, in some embodiments, a universal cover 48 can be manufactured, applicable or adaptable to any type of connector within the network.

Referring now to FIGS. 6, 9, and 10, a node connector 34, according to some embodiments, is illustrated. The node connector 34 can include a housing 40, a protection cap 42, a printed circuit board 44, a cable organizer 46, and a cover 48. However, unlike the power tap connectors 30, 32, which include one side 62, 64 accommodating a cut end of a ribbon cable 14, in the node connector 34, the ribbon cable 14 extends out of the connector 34 from both sides 62, 64.

As such, with respect to the housing 40, as shown in FIG. 10, while the first latch extension 84 can remain positioned along the second end 68 of the housing 40, like the power tap connectors 30, 32, both sides 62, 64 of the housing 40 can include an inverse ribbon profile 82. Additionally, in some embodiments, a lower section 58 of the housing 40 of the node connector 34 can be similar in shape, but smaller than the lower section 58 of the power tap connectors 30, 32. More specifically, the lower section 58 of the housing 40 of the node connector 34 can be sized to correspond to a node jack of a device node so that the housing 40 can be plugged into the node jack, thus physically and electrically coupling the ribbon cable 14 to the device node via the node connector 34. As a result, the protection cap 42 of the node connector 34 can also be smaller than the protection cap 42 of the power tap connectors 30, 32 in order to fit to the lower section 58 of the housing 40. However, in some embodiments, the lower section 58 and protection cap 42 can be identical to the lower section 58 and protection cap 42, respectively, of the power tap connectors 30, 32, for example, depending on a size of the node jack. Furthermore, in some embodiments, the protection cap 42 can be in the form of a protection cap jack, containing circuitry and incorporating electrical contact pins which mate to the connector socket receptacle 100 in a fashion similar to how a device (in this example, a node device) would mate with the connector socket receptacle 100. Accordingly, should the connector 34 be removed from a device, for example in the event of device repair or replacement, the protection cap jack could replace the device either temporarily or permanently, thereby maintaining the data transmission and signal integrity along the ribbon cable data conductors 22.

Furthermore, in some embodiments, the printed circuit board 44 can include conductor contacts 52 in different relative locations than those of the power tap connectors 30, 32 so as to engage different conductors 22 of the ribbon cable. However, in other embodiments, the printed circuit board 44 can include conductor contacts 52 in the same relative locations as those of the power tap connectors 30, 32 so as to engage the same conductors 22 of the ribbon cable 14. Furthermore, as shown in FIG. 10, the printed circuit board 44 can further include a connector socket receptacle 100 sized and adapted to plug into a corresponding node jack on a node device to electrically and physically connect the ribbon cable 14 to the node device when the lower section 58 of the housing 40 is plugged into the node jack.

Additionally, as shown in FIGS. 9 and 10, the cable organizer 46 of the node connector 34 can be identical to the cable organizer 46 of the power tap connectors 30, 32 (e.g., a universal cable organizer 46). However, in other embodiments, the cable organizer 46 can include apertures 124 specific only to the node connector 34, that is, specific to the locations of the conductor contacts 52 on the printed circuit board 44.

Still referring to FIGS. 6, 9, and 10 and the node connector 34, the cover 48 can include the latch 160 positioned along the second end 146 thereof, like the power tap connectors 30, 32. However, the cover 48 may not include an extended edge 150 on either side 140, 142. Furthermore, the upper surface 148 of the cover 48 can include one or more features 170, such as a horizontal line 170*a* that extends across the upper surface 148. In some embodiments, the horizontal line 170*a* can extend entirely across the upper surface 148 from the first side 140 to the second side 142, indicating that a ribbon cable 14 can extend out from both sides 140, 142 of the cover 48.

Accordingly, in some embodiments, the only difference between the covers 48 of the power tap connectors 30, 32 and the node connector 34 may be the extended edge 150 along the first or second side 140, 142, and a placement of the features 170. However, as discussed above, in some embodiments, the cover 48 may be a universal cover manufactured without such components. For example, the cover 48 may not include the components, and the features 170 can be applied to the upper surface 148 post-manufacture for use with the node connector 34.

Additionally, as shown in FIG. 10, in some embodiments, the node connector 34 can incorporate a cutter 180. In some embodiments, the cutter 180 can be configured to sever a specific cable conductor 22 (such as a "Select Line" of the ribbon cable 14 of some embodiments) which is dedicated to locate the relative position of a device on the ribbon cable 14, thereby enabling "nodal geography." For example, first and second conductor contacts 52 can be positioned on either side of the severed portion of the ribbon cable 14 to make electrical connection to the conductor 22 (such as the Select Line). The other end of the first conductor contact 52 (opposite the end making the electrical connection to the conductor 22) connects to a certain position of the connector socket receptacle 100, to a mating pin on a device printed circuit board assembly (PCBA), to electronic circuitry within the device PCBA, back to another mating pin on the device PCBA, back to another certain position of the connector socket receptacle 100, and back to the other end of the second conductor contact 52, thereby establishing a connection loop which bypasses the severed portion and locates the position of the device on the ribbon cable 14. Furthermore, in some embodiments, the cutter 180 can be configured to sever other cable conductors 22, such as two cable conductors 22 of a Single Pair Ethernet (SPE) bus (that is, SPE+ and SPE−). Electrical contacts on either side of the severed portions can connect to in-line (e.g., series) inductors on the printed circuit board 44 to offset added capacitance created by the node and maintain signal integrity.

Referring now to FIG. 11, a terminator 36, according to some embodiments, is illustrated. The terminator 36 can include a housing 40, a cable organizer 46, and a cover 48. Like the power tap connectors 30, 32, the terminator 36 can include one side 62, 64 accommodating a cut end of a ribbon cable 14. However, unlike the power tap connectors 30, 32 and the node connector 34, the terminator 36 is not adapted to electrically or physically couple the ribbon cable 14 to a device in the network 10. Thus, the terminator 36 may not require certain features to accomplish this coupling.

For example, in some embodiments, the housing 40 of the terminator 36 can be substantially identical to the upper section 56 of the housing 40 of the power tap right connector 32 (e.g., including a similar width, length, and/or height as the upper section 56). That is, rather than including a lower section 58 defining an open bottom 60, the terminator 36 can include a rectangular housing with a closed bottom (e.g., the bottom seat 98 extends entirely across the bottom of the housing 40). Additionally, in some embodiments, the housing 40 of the terminator 36 can include one or more loopholes 182, for example, on either end 66, 68. For example, the loopholes 182 can be sized to receive cable ties (not shown). As a result, the loopholes 182 and corresponding cable ties can be used to secure the terminator 36 physically to a convenient fixed portion of an electrical control cabinet or a device within the cabinet, for example, instead of the terminator 36 being unsupported and "hanging" in free space.

Additionally, as shown in FIG. 11, the cable organizer 46 of the terminator 36 can be identical to the cable organizer 46 of the power tap connectors 30, 32 and/or the node connector 34 (e.g., a universal cable organizer 46). However, in other embodiments, the cable organizer 46 can be specific only to the terminator 36, for example, without any apertures.

Also, the cover 48 of the terminator 36 can be identical to the cover 48 of the power tap right connector 32. Accordingly, when installed on the terminator 36, a cut end of a ribbon cable 14 is adjacent a second, or right, side thereof, and the ribbon cable 14 extends out of the terminator 36 from the first, or left, side thereof. That is, while no conductors 22 of the ribbon cable 14 are selectively severed by the terminator 36, the cut end of the ribbon cable 14 can be covered by the second side 64 of the housing 40, with the cover 48 providing a visual indication of such termination.

Referring now to FIG. 12, a splicer 38, according to some embodiments, is illustrated. The splicer 38 can include a housing 40, a printed circuit board 44, two cable organizers 46, and two covers 48. Like the power tap connectors 30, 32 and the terminator 36, the splicer 38 can accommodate cut ends of ribbon cables 14. Furthermore, unlike the power tap connectors 30, 32 and the node connector 34, splicer 38 is not adapted to electrically or physically couple the ribbon cable 14 to a device in the network 10. Thus, the splicer 38 may not require certain features to accomplish this coupling.

For example, in some embodiments, the housing 40 of the splicer can be substantially identical to upper sections 56 of the housings 40 of the power tap left connector 30 and the power tap right connector 32, coupled together side-by-side (e.g., equal in width and height as the connectors 30, 32, but at least double the length). Thus, a first side 62 of the housing can include an inverse ribbon profile 82, like the power tap right connector 32, to receive a first ribbon cable 14, a second side 64 of the housing 40 can include an inverse ribbon profile 82, like the power tap left connector 30, to receive a second ribbon cable 14, and a central raised edge 184 can extend through a center of the housing 40, similar in function to the raised edge profile sides of power tap connectors 30, 32, to cover cut ends of the first and second ribbon cables 14. The central raised edge 184 can be a separate component coupled to the housing 40, or can be integral with the housing 40 in some embodiments.

Additionally, rather than the housing 40 including lower sections 58 defining open bottoms 60, the splicer 38 can include a rectangular housing with a closed bottom (e.g., the bottom seat 98 extends entirely across the bottom of the housing 40). Furthermore, in some embodiments, the housing 40 of the splicer 38 can include one or more loopholes 182, for example, on either end 66, 68. For example, the loopholes 182 can be sized to receive cable ties (not shown).

In some embodiments, the central raised edge 184 does not extend through an entire depth of the housing 40, so that the interior space 96 can be defined within the housing 40, extending from the first side 62 to the second side 64 thereof. The splicer 38 can include a printed circuit board 44 that generally extends across the interior space 96, with two sets of conductor contacts 52 configured to contact individual conductors of the first and second ribbon cables 14, respectively. The printed circuit board 44 can further include traces that electrically couple the conductors of the first and second ribbon cables 14 together via the two sets of conductor contacts 52, thus allowing the first and second ribbon cables 14 to be spliced together when the splicer 38 is in the assembled state.

Additionally, as shown in FIG. 12, the splicer 38 can include two side-by-side cable organizers 46, for example, each identical to the cable organizer 46 of the power tap connectors 30, 32, the node connector 34, and/or the terminator 36 (e.g., a universal cable organizer 46). However, in other embodiments, the cable organizers 46 can be specific only to the splicer 38. Furthermore, as no electrical connections need to be made at to an external device, the interior space 96 of the housing 40 can accommodate the cable organizers 46 and a printed circuit board 44 without a socket receptacle.

Also, the splicer 38 can include two covers 48, substantially identical to the covers 48 of the power tap left connector 30 and the power tap right connector 32, positioned side-by-side to engage a respective latch 160 and cable organizer 46 on either side of the housing 40. That is, the housing 40 includes two latch assemblies to accommodate individual movement of two separate covers 48. Accordingly, when installed on the splicer 38, a cut end of a first ribbon cable 14 is adjacent the central raised edge 184 and extends out of the splicer 38 from the first, or left, side thereof, and a cut end of a second ribbon cable 14 is adjacent the central raised edge 184 and extends out of the splicer 38 from the second, or right, side thereof. In light of the above description, while the splicer 38 can include a larger housing 40 than the other connectors 30-36, the splicer 38 can still incorporate the same covers 48 and/or cable organizers 46.

As all connectors 30-38 described above can include similar parts, such as similar covers 48 and/or housings 40, a ribbon cable 14 can be installed on any connector 30-38 using substantially the same method and/or the same tooling. For example, in some embodiments, a ribbon cable 14 can be installed on a desired connector 30-38 using traditional tooling, such as conventional pliers. However, in other embodiments, specialty tooling specific to the connector 30-38 may be used.

Thus, according to some embodiments, the following method can be executed to install a ribbon cable 14 on a connector 30-38 having a hinged closure-type configuration as shown in FIGS. 2-19. First, while the connector 30-38 is in the preassembled state, the cover 48 can be translated and/or rotated away from the housing 40 to create a cable access pathway 186, for example, as shown in FIGS. 2, 7, 9, 11, and 12. In some embodiments, the cover 48 can be rotated away from the housing 40 by engaging the latch 160 with the first latch extension 84 of the housing 40.

The ribbon cable 14 can then be inserted and positioned, via the cable access pathway 186, onto the cable organizer 46 so that the ribbon profile 28 of the ribbon cable 14 conforms to and aligns with the inverse ribbon profile 122 of the cable organizer 46, as shown in FIG. 4. For example, the ribbon cable 14 can be inserted on the cable organizer 46 so that the respective strips 126, 128 on the cable organizer 46 and the ribbon cable 14 can be aligned. In some embodiments, such alignment further includes snapping the ribbon cable 14 into the cable grab hooks 130 to restrict lateral movement or shifting of the ribbon cable 14 within the cable organizer 46. In addition, in some embodiments, with respect to the power tap connectors 30, 32, the terminator 36, and/or the splicer 38, a cut end of the ribbon cable 14 can be aligned adjacent the raised profile of a respective side edge 70, 72 or central raised edge 184.

Once the ribbon cable 14 is aligned, the cover 48 can be rotated back toward the housing 40 so that it is aligned over the open top 50 of the housing 40. In some embodiments, the cover 48 can be rotated back toward the housing 40 by engaging the latch 160 with the second latch extension 116 of the cable organizer 46.

Once the cover 48 is positioned vertically above the cable organizer 46, the cover 48 can be pressed toward the housing 40 to entrap the ribbon cable 14 within the housing 40 between the cover 48 and the cable organizer 46. For example, a tool, such as a pliers, can then engage the upper surface 148 of the cover 48 and a lower surface of the connector 30-38. The lower surface can be, for example, the lower surface of the housing 40 (e.g., the lower section 58 of the housing 40 of the power tap connectors 30, 32 or the node connector 34, or the enclosed bottom seat 98 of the terminator 36 or the splicer 38). In some embodiments, to protect the open bottom 60 of the power tap connectors 30, 32 and the node connector 34, the protection cap 42 can first be placed over the lower section 58 of the housing 40 so that the tool can instead engage the protection cap 42.

Figure 13:
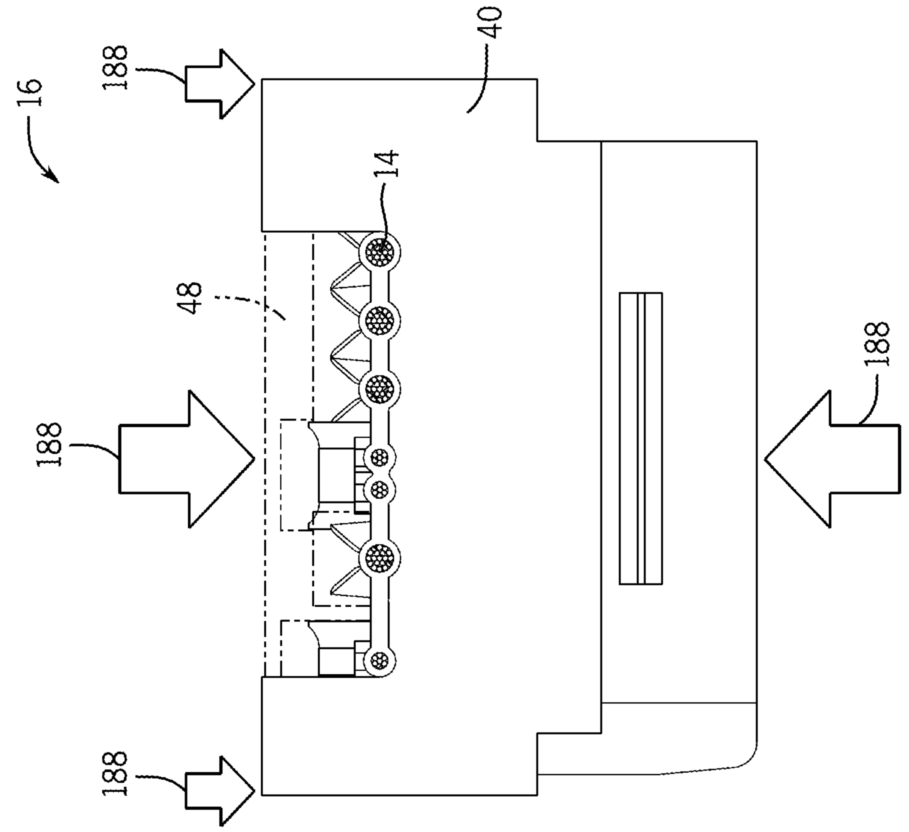
FIG. 13 is a side view of a connector in an assembled state, according to some embodiments.

Once engaged, the tool can be actuated to press the cover 48 toward the housing 40, as shown by arrows 188 in FIG. 13. The tool can press the cover 48 toward the housing 40 with enough force to disengage the lower detents 112 of the cable organizer 46 from the upper slots 136 of the housing 40, moving the cable organizer 46 downward until the lower detents 112 snap into the lower slots 138 of the housing 40 and the upper detents 114 engage the notches 158 of the cover 48 (e.g., by snapping onto the shoulders 168). In some embodiments, at the end of this movement, the compression forces (indicated by the arrows 188 in FIG. 13) can be distributed fully onto the housing 40 (e.g., due to the extended edges 150 of the cover 48 engaging respective edges 70, 72, 74, and/or 76 of the housing 40). This clamping further completes termination of each conductor contact 52 onto the ribbon cable 14, thus electrically coupling the conductors 22 to the socket receptacle 100 in the power tap and node connectors 30, 32, 34, and coupling the conductors 22 of adjacent ribbon cables 14 together in the splicer 38.

While connectors having a hinged closure-type configuration and, more specifically, a floating hinge closure-type configuration, are described above with respect to FIGS. 2-19, in some embodiments, one or more connectors can have a linear closure-type configuration, as shown in FIGS. 20-28B. It should be noted that, unless specified otherwise, any one or more of the above-described components and features of the hinged closure-type connectors can be incorporated into the linear closure-type connectors described below. Thus, like numerals illustrate like components and certain features, though incorporated in certain embodiments, may not be described in full detail again below for the sake of brevity.

Figure 20:
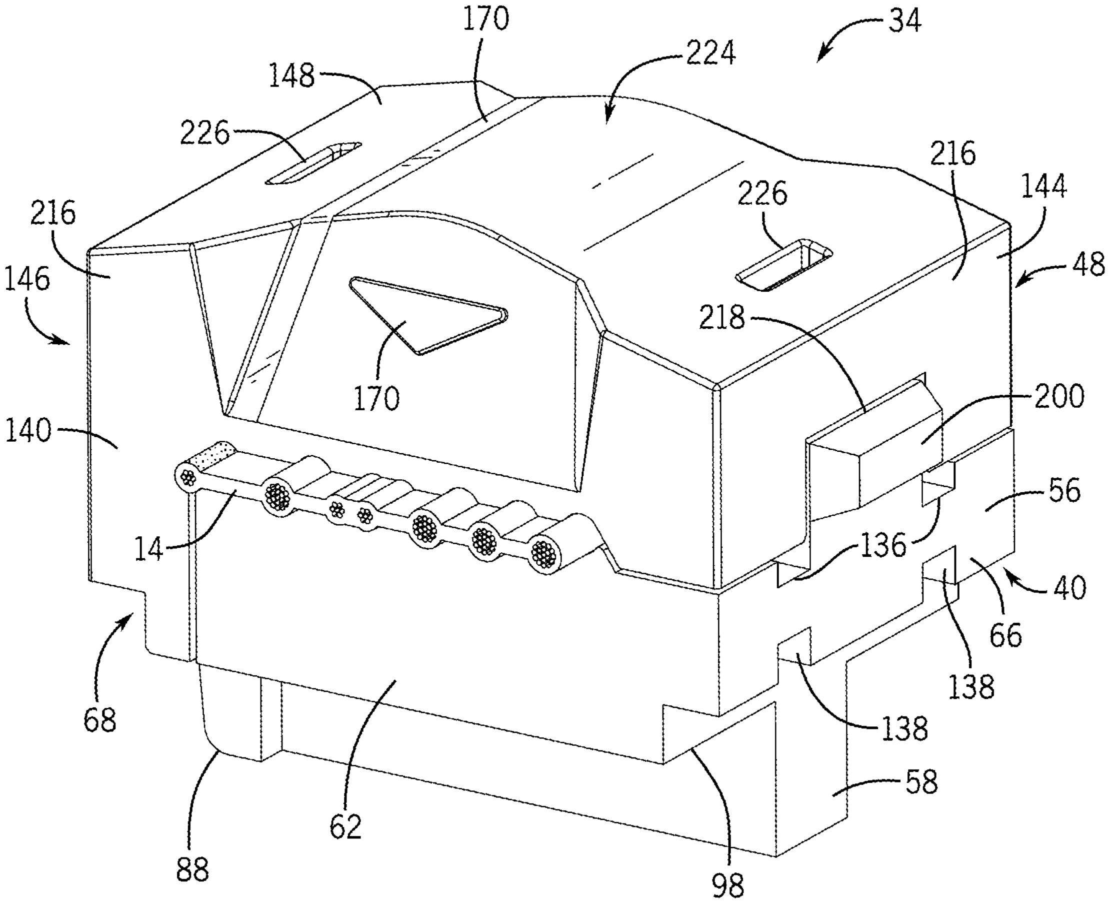
FIG. 20 is a perspective view of a node connector, according to some embodiments, in an assembled state.
Figure 21:
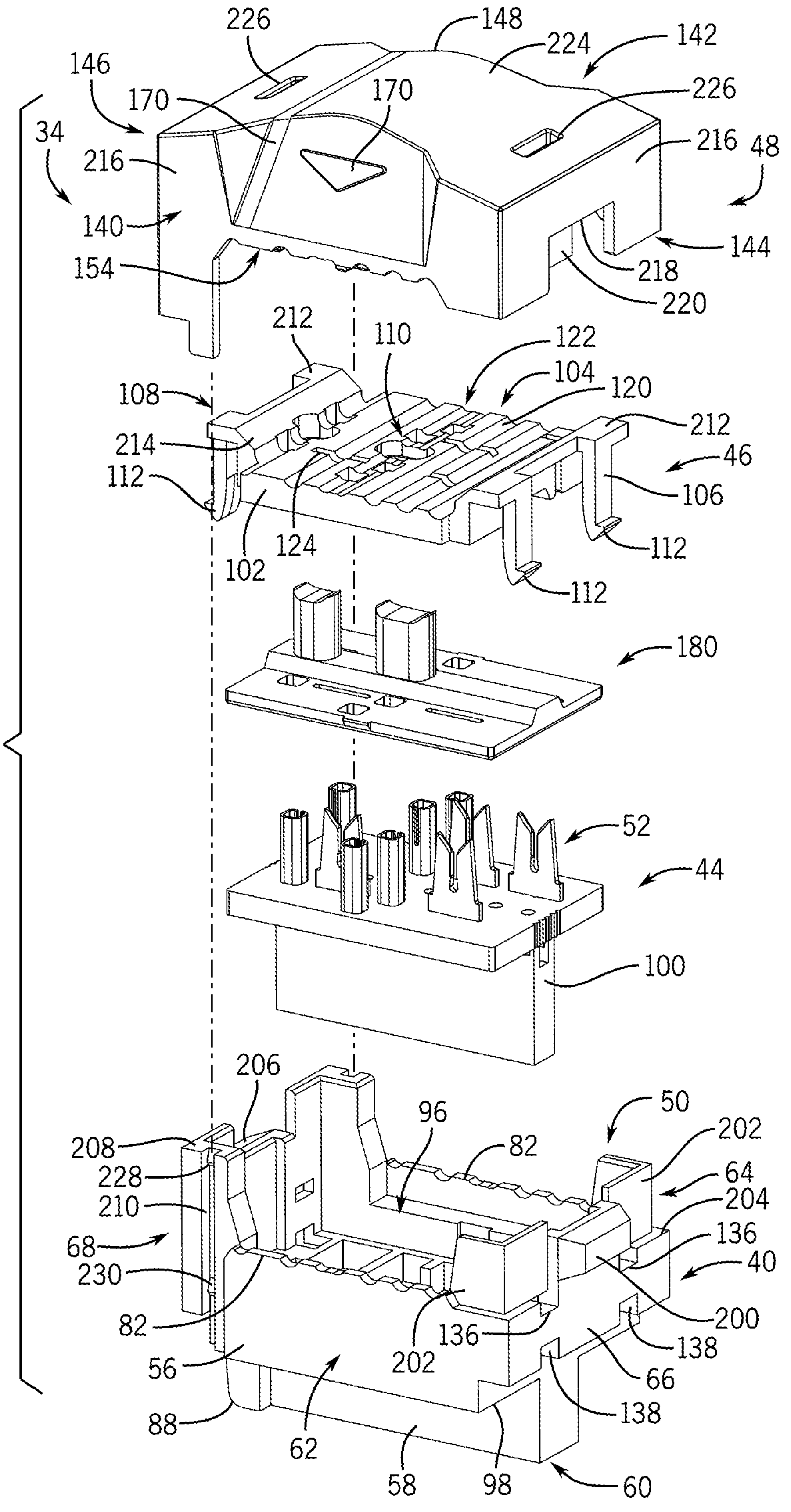
FIG. 21 is a perspective exploded view of the node connector of FIG. 20.
Figure 22:
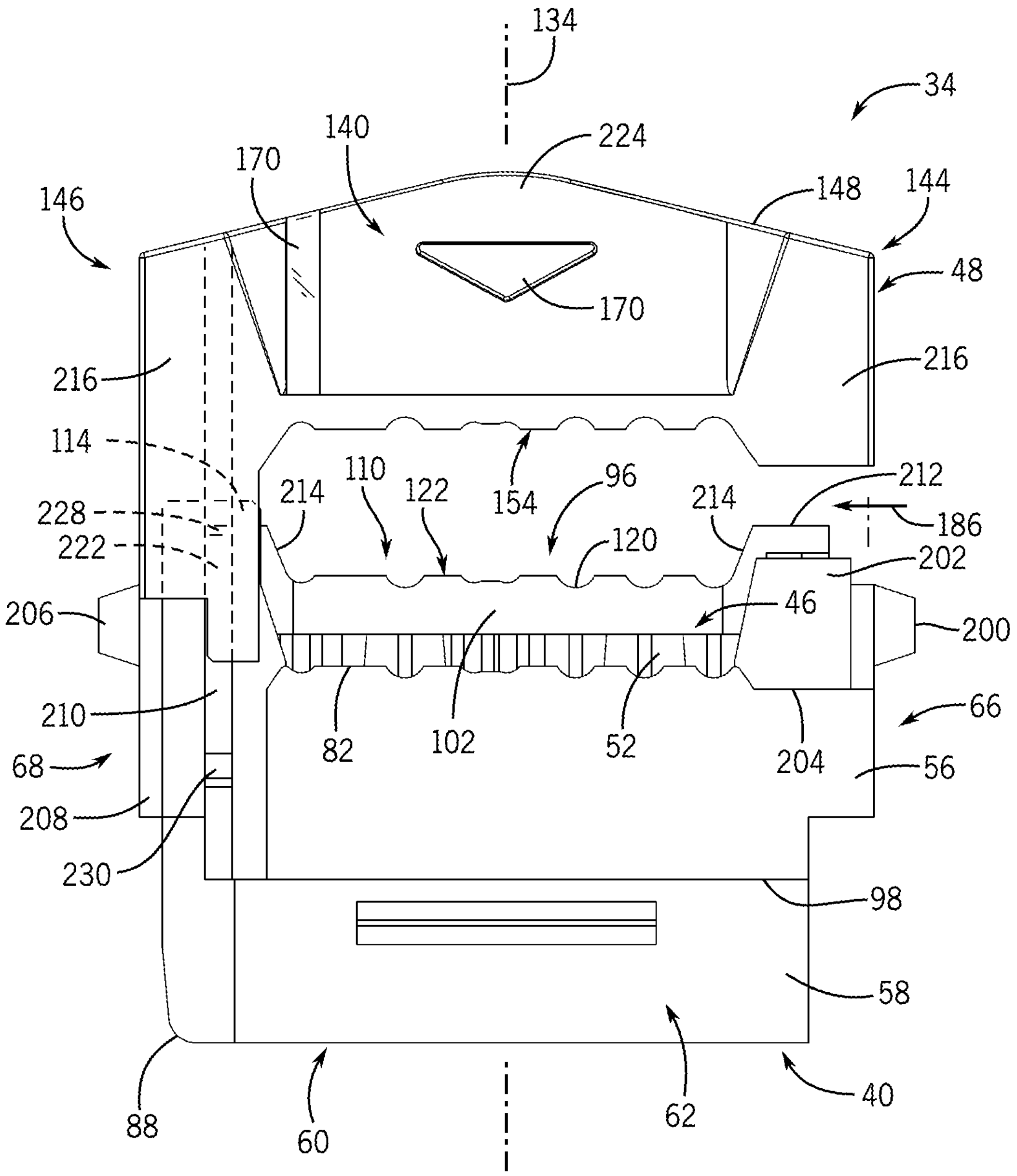
FIG. 22 is a side view of the node connector of FIG. 20 in a preassembled state.
Figure 23:
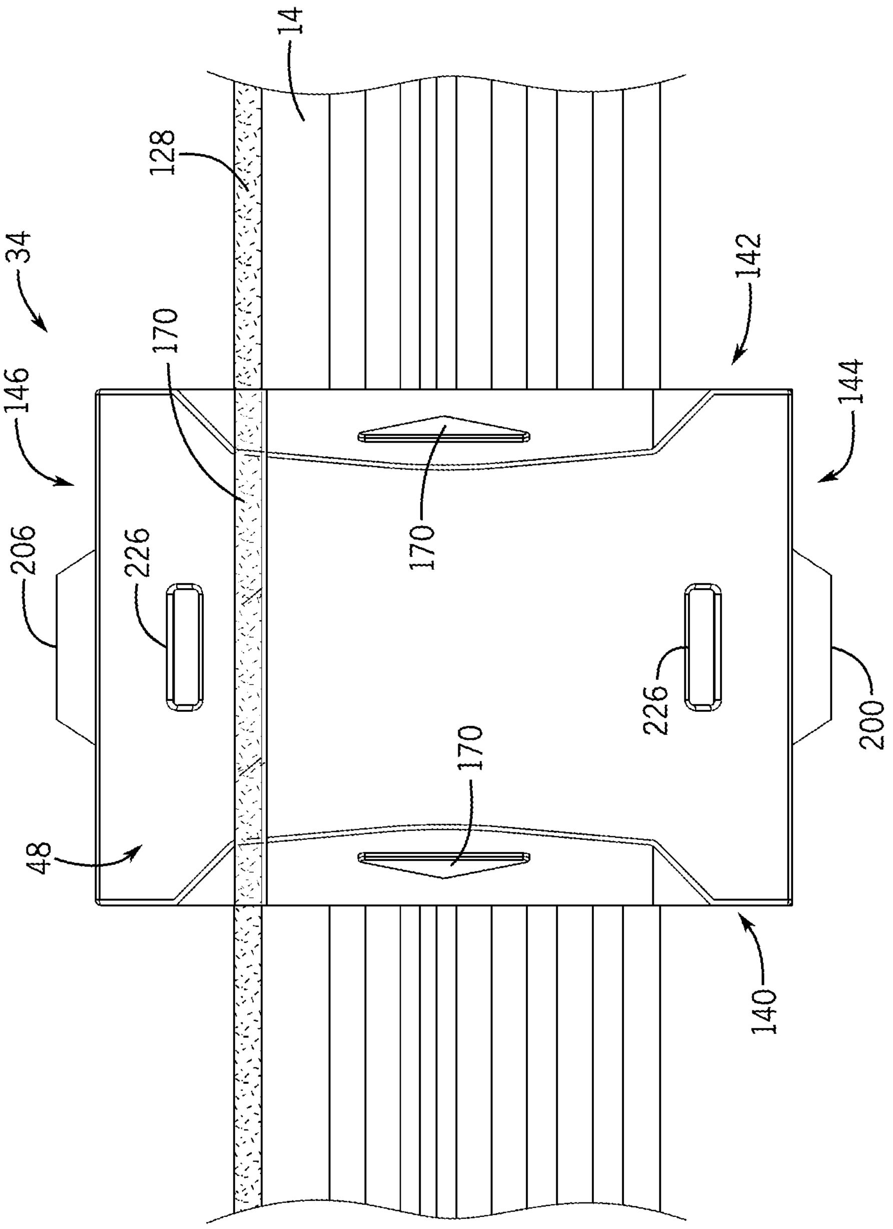
FIG. 23 is a top view of the node connector of FIG. 20 in an assembled state.
Figure 24:
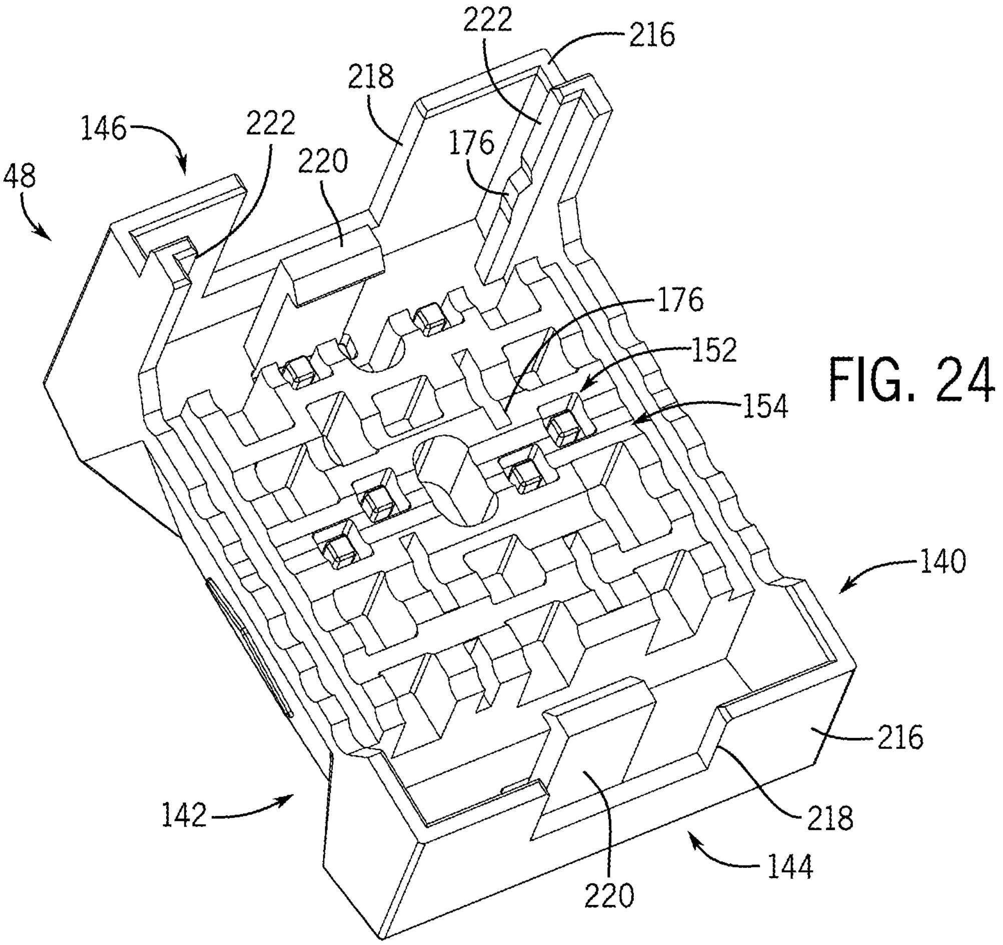
FIG. 24 is a perspective underside view of a cover of the node connector of FIG. 20.
Figure 25:
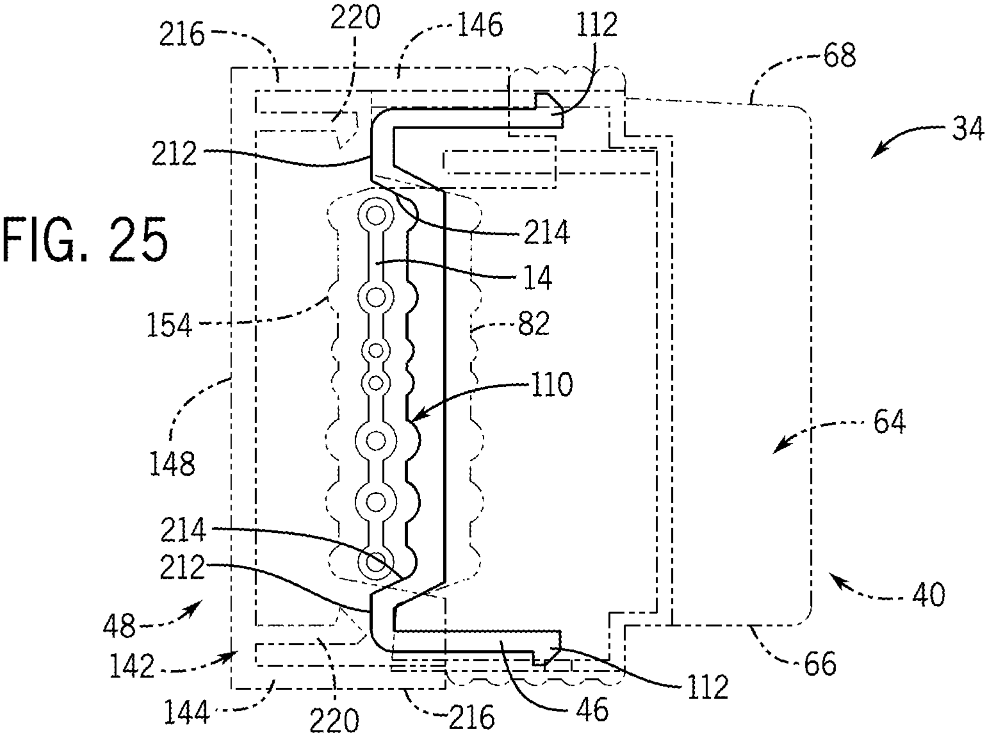
FIG. 25 is a side view of a node connector, according to some embodiments, in a preassembled state.

More specifically, referring to FIGS. 20-25, a node connector 34 with a linear closure-type configuration, according to some embodiments, is illustrated. The node connector 34 can include a housing 40, a removable protection cap (not shown), a printed circuit board 44, a cable organizer 46, and a cover 48. Generally, a ribbon cable 14 can be positioned within (e.g., extend across) an open top 50 of the housing 40 and be supported by the cable organizer 46, as shown in FIG. 25. The ribbon cable 14 can be enclosed within the housing 40 by the cover 48 when the node connector 34 is in an assembled state, as shown in FIGS. 20 and 23. When enclosed within the housing 40, individual conductors 22 of the ribbon cable 14 can engage one or more conductor contacts 52 (such as insulation-displacement contacts (IDCs) and/or insulation-piercing contacts (IPCs)) extending from the printed circuit board 44, as shown in FIGS. 21 and 22. The housing 40 can be further adapted to plug into a corresponding jack on a device node to electrically and physically connect the ribbon cable 14 to the device node.

With respect to the housing 40, in some embodiments, the housing 40 can support and enclose the printed circuit board 44 and the cable organizer 46 therein, and can be coupled to the cover 48 in a manner so that open top 50 of the housing 40 can be selectively covered by the cover 48, as further described below. The housing 40 can be generally rectangular in shape and can include an upper section 56 and a lower section 58, an open top 50 (e.g., at the upper section 56) and an open bottom 60 (e.g., at the lower section 58), a first side 62, a second side 64, a first end 66, and a second end 68. As shown in FIG. 23, when a ribbon cable 14 is positioned in the housing 40, the ribbon cable 14 extends out of the connector 30 from both sides 62, 64.

The upper section 56 of the housing 40 can define the open top 50. In some embodiments, as shown in FIG. 21, the first side 62 and the second side 64 can each include a lowered edge with a profile 82 configured to permit a ribbon cable 14 to extend out from the first side 62 and the second side 64 of the housing 40, respectively, when the ribbon cable 14 is coupled to the node connector 34. That is, the first side 62 and the second side 64 can each include an inverse ribbon profile 82 that substantially corresponds to the ribbon profile 28 of a ribbon cable 14, allowing the ribbon cable 14 to sit within the profile 82. As a result, the housing 40 can facilitate and maintain proper alignment of the ribbon cable 14 within the housing 40 when the ribbon cable 14 is coupled to the node connector 34.

Furthermore, as shown in FIG. 21, along the first end 66, the upper section 56 of the housing 40 can include an outwardly extending knob 200 and inwardly extending guide walls 202. The guide walls 202 can be internally offset from an outer surface of the first end 66, creating a shoulder 204. Also, the guide walls 202 can extend around to the first side 62 and the second side 64 until reaching the profiled edges 82.

Along the second end 68, the upper section 56 of the housing 40 can also include an outwardly extending knob 206 and inwardly extending guide walls 208. In some embodiments, the guide walls 202 can be internally offset from the knob 206 and can extend higher than the guide walls 202 along the first end 66. However, in other embodiments, the guide walls 202 can extend the same height or lower than the guide walls 202 of the first end 66. Also, the guide walls 208 can extend around to the first side 62 and the second side 64 until reaching the profiled edges 82. As shown in FIG. 21, along the first side and the second side 62, 64, each guide wall 208 can include a track 210. As further described below, the guide walls 208 and, more specifically, the tracks 210, can support linear translation of the cover 48 relative to the housing 40. As such, the node connector 34 of FIGS. 20-25 may be considered a linear closure-type connector.

In some embodiments, as shown in FIGS. 20-23, the lower section 58 of the housing 40 can be integral with the upper section 56, though smaller than the upper section 56. The lower section 58 can be dimensioned to define the open bottom 60 and also to plug into a node jack of a device node, i.e., so that the housing 40 can be plugged into the node jack, thus physically and electrically coupling the ribbon cable 14 to the device node via the node connector 34. In some embodiments, to facilitate proper directional (e.g., right-left) alignment of the connector 34 with a node jack, the lower section 58 can be longer on the second end 68 than the first end 66 to define a corner extension 88. Accordingly, the lower section 58 can include a generally rectangular profile with the corner extension 88, which matches a corresponding rectangular opening and corner extension of the node jack (not shown) in order to plug the connector 34 into the node jack.

Furthermore, in some embodiments, the lower section 58 of the housing 40 can be selectively covered by a protection cap in order to cover the open bottom 60, such as the protection cap 42 shown and described with respect to FIGS. 2, 3, and 7-10. As described above, the protection cap can protect an interior of the housing 40 from outside elements when the connector 34 is not connected to a device node and can protect components within the interior of the housing 40 (such as the printed circuit board 44) from tooling when the connector 34 is placed in its assembled state.

As shown in FIG. 24, the upper and lower sections 56, 58 of the housing 40 can define an interior space 96 that houses the printed circuit board 44. More specifically, in some embodiments, the printed circuit board 44, such as a printed circuit board assembly, can sit within the housing 40 and can include, extending from an upper end thereof, one or more individual and distinct conductor contacts 52, each of which are separately soldered or pressed-in to the printed circuit board 44 with a mechanical and electrical connection, sufficient to connect the printed board circuits to the various individual conductors 22 of the ribbon cable 14.

In some embodiments, the printed circuit board 44 and the conductor contacts 52 are positioned within the upper section 56 of the housing 40. For example, the upper section 56 can include a bottom seat 98 defined by an inward-stepped portion that connects that upper section 56 to the lower section 58, and the bottom seat 98 can support the printed circuit board 44 within the upper section 56. In some embodiments, the printed circuit board 44 can extend within the interior space 96 across the upper section 56 to define open areas between respective ends of the printed circuit board 44 and the first and second ends 66, 68 of the housing 40. As further described below, lower detents 112 of the cable organizer and/or portions of the cover 48 can extend into the open areas.

The conductor contacts 52 can be located along the printed circuit board 44 so that they can be configured to electrically contact individual conductors 22 of a ribbon cable 14 when the connector 34 is in its assembled state, as further described below. The printed circuit board 44 further includes, extending from a lower end thereof into the lower section 58 of the housing 40, a connector socket receptacle 100 electrically coupled to the conductor contacts 52 and accessible via the open bottom 60 of the housing 40. For example, the connector socket receptacle 100 can be adapted to plug into a corresponding node jack on a device node to electrically and physically connect the ribbon cable to the device node when the lower section 58 of the housing 40 is plugged into the node jack.

To facilitate proper connections between the conductor contacts 52 and respective conductors 22 of a ribbon cable 14, the cable organizer 46 can be configured to maintain a position of the ribbon cable 14 within the connector 34. More specifically, still referring to FIGS. 20-24, the cable organizer 46 can sit within and be supported by the housing 40, and positioned over top of the printed circuit board 44 so that it accessible via the open top 50 of the housing 40. The cable organizer 46 can include a first side 102, a second side 104, a first end 106, and a second end 108 that generally align with the first side 62, the second side 64, the first end 66, and the second end 68, respectively, of the housing 40. The cable organizer 46 can also include a generally flat surface 110 between two raised end surfaces 212, with one or more lower detents 112 that extend generally downward from the end surfaces 212 (e.g., along corners of the cable organizer 46 or at other positions along the sides 102, 104 or ends 106, 108).

In some embodiments, the cable organizer 46 can include a plurality of longitudinal grooves or guideways 120 in the flat surface 110 extending from the first side 102 to the second side 104 thereof and configured to receive insulated conductors 22 of a ribbon cable 14. For example, the longitudinal guideways 120 of the cable organizer 46 can define an inverse ribbon profile 122 that substantially corresponds to the ribbon profile 28 of the ribbon cable 14 (e.g., matching the inverse ribbon profiles 82 on the first and second sides 62, 64 of the housing 40), thus permitting proper alignment of individual conductors 22 of the ribbon cable 14 within the connector 34 when the ribbon cable 14 is placed on the cable organizer 46. Additionally, in some embodiments, as shown in FIGS. 21, 22, and 25, the cable organizer 46 can include an angled surface 214 between each end surface 212 and the flat surface 110. As further described below, the angled surfaces 214 can help guide a cable 14 into position into the grooves 120 of the flat surface 110 when the cover 48 is closed onto the housing 40. The cable organizer 46 also includes a plurality of apertures 124 extending through one or more of the longitudinal grooves 120 and configured to axially align with the conductor contacts 52, as further described below.

To further facilitate ribbon cable installation, the cable organizer 46 can be moveable in an axial direction within the housing 40, for example, along an axis 134 (as shown in FIG. 22). In some embodiments, the cable organizer 46 can be moved between a first position when the connector 34 is in a preassembled state (as shown in FIGS. 22 and 25) and a second, lower position when the connector 34 is in an assembled state. For example, in some embodiments, as shown in FIG. 21, the housing 40 can include one or more upper slots 136 extending through the first and second ends 66, 68, and one or more lower slots 138 extending through the first and second ends 66, 68 and positioned a distance below the upper slots 136. The lower detents 112 of the cable organizer 46 can be configured to engage or snap into the slots 136, 138 of the housing 40 to lock the cable organizer 46 in the first position (e.g., preassembled state) and the second position (e.g., assembled state), respectively.

More specifically, in the preassembled state, the lower detents 112 can each engage a respective upper slot 136 of the housing 40. In this position, as shown in FIG. 22, the raised end surfaces 212 of the cable organizer 46 can generally align with or extend above upper edges of the guide walls 202 or 208 (thus placing the cable organizer 46 within, or extending across, the open top 50) and the inverse ribbon profile 122 of the cable organizer 46 can be positioned above the inverse ribbon profiles 82 of the housing 40. Additionally, in the preassembled state, the cable organizer 46 is spaced a first distance above the printed circuit board 44 so that the conductor contacts 52 do not extend through the apertures 124 of the cable organizer 46.

In the assembled state, the cable organizer 46 can be pressed axially downward along the axis 134 into the housing 40 so that the lower detents 112 disengage the upper slots 136 and slide down the interior 96 of the housing 40 until they each engage (e.g., snap into) a respective lower slot 138. In this position, the inverse ribbon profile 122 of the cable organizer 46 can align with the inverse ribbon profiles 82 of the housing 40. Additionally, in the assembled state, the cable organizer 46 is spaced a second distance above the printed circuit board 44 so that the conductor contacts 52 extend through the apertures 124 and, as a result, can engage the individual conductors 22 of the ribbon cable 14 received within the longitudinal grooves 120. Additionally, as shown in FIG. 21, in some embodiments, the node connector 34 can incorporate a cutter 180 configured to sever a specific cable conductor 22 when the connector 30 is installed.

Generally, the cable organizer 46 can be enclosed within the housing 40 by the cover 48. In some embodiments, as shown in FIGS. 20-24, the cover 48 can be generally rectangular in shape and include a first side 140, a second side 142, a first end 144, and a second end 146. The cover 48 can also include an upper surface 148 and a bottom surface 152. The bottom surface 152 of the cover 48 can include an inverse cable profile 154 extending from the first side 140 to the second side 142 (e.g., corresponding to the ribbon profile 28 of a ribbon cable 14) and one or more apertures or indentations 156 that can generally align with the apertures 124 of the cable organizer 46, as shown in FIG. 24.

As shown in FIG. 24, the cover 48 can include outer walls 216 at the first and second ends 144, 146, which can extend around to the first and second sides 140, 142. Additionally, along the first and second ends 144, 146, each outer wall 216 can include a notch 218. The cover 48 can further include hooks 220 extending from the bottom surface 152 and positioned adjacent the first and second ends 144, 146, spaced inward from the respective notches 158. Furthermore, as shown in FIG. 24, the cover 48 can include internal ribs 222 on the first and second sides 140, 142 adjacent the second end 146. Each rib 222 can be sized to engage and slide along a respective track 210 of the housing 40, to support linear translation of the cover 48 relative to the housing 40, as further described below.

Regarding the upper surface 148 of the cover 48, in some embodiments, the upper surface 148 may be substantially flat. However, in other embodiments, the upper surface 148 can include a nonplanar surface profile. For example, the upper surface 148 may be beveled, created by angled indentations on the first and second sides 140, 142. In another example, as shown in FIGS. 20-22, the upper surface 148 includes a bump 224 generally extending from the first side 140 to the second side 142. The bump 224 may be a gradual bump, as shown in FIGS. 20-22, or may be a discrete bump and/or may include a rounded, square, triangular, or other profile that generally extends from the first side 140 to the second side 142 and peaks adjacent a center of the cover 48 (e.g., equidistant from the first end 144 and the second end 146). The central peak of the bump 224 can serve as contact point for tooling used to assemble the connector 34, as described below.

Figure 26:
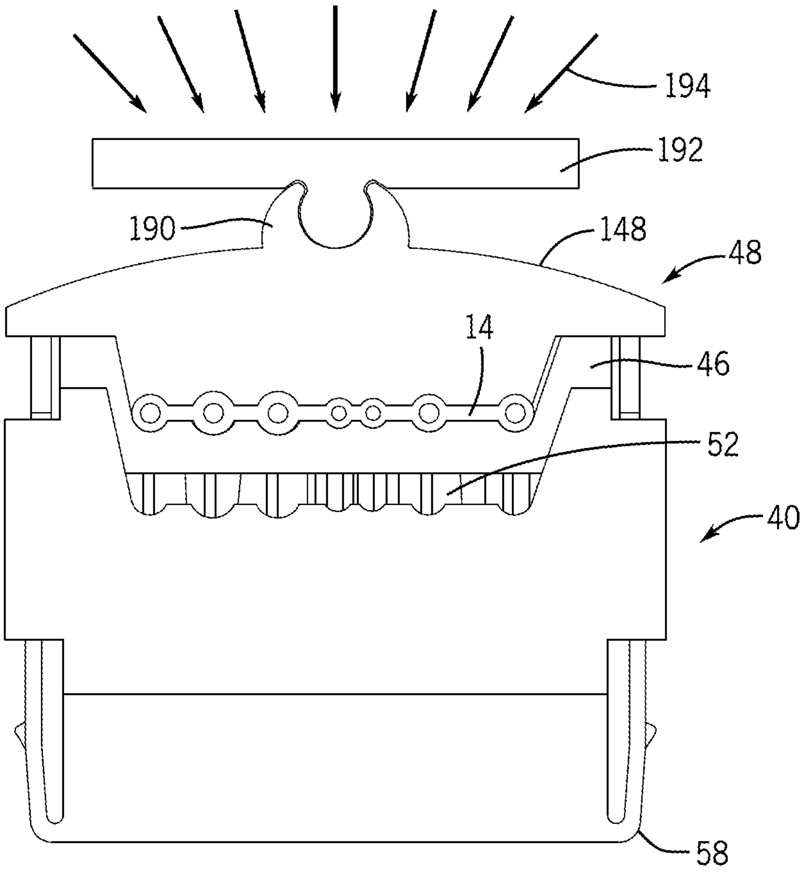
FIG. 26 is a side view of a node connector, according to some embodiments.

In further embodiments, as shown in FIG. 26, the upper surface 148 may include an inverted central bump 190 or other profile configured to receive or engage a separate flat plate 192, which may then serve as the contact surface for associated tooling. More specifically, in some embodiments, a profiled upper surface 148 may be part of an assembly including a separate pivoting plate 192 that engages the upper surface 148. The pivoting plate 192 can interface to a clamping tool (as discussed below) for more efficient load transfer with reduced friction and/or linear slipping during clamping. While the resultant force from clamping tool jaws can generate many different magnitudes and directions (illustrated by arrows 194 in FIG. 26), which deviate from the final desired direction of movement of the cover 48, the assembly can help redirect the force in the desired direction of movement (e.g., in some embodiments, substantially vertical, along the axis 134 of FIG. 22). Additionally, while the upper surface 148 of the cover 48 is described and shown in FIGS. 20-23 and 26 as having a nonplanar surface, in some embodiments, other portions of the connector 34 (or any other connectors 30-38 described herein) can include a nonplanar surface to serve as a contact surface for associated tooling, such as a protection cap 42 or lower section 58 of the housing 40, as further described below.

Furthermore, in some embodiments, as shown in FIGS. 20-23, the upper surface 148 of the cover 48 can include one or more features 170 that provide information to a user, for example, when the connector 34 is in the assembled or preassembled state. In one example, the feature 170 may be a horizontal line **170*a* and/or one or more arrows 170*b*, such as an indented or protruding line and arrows formed in the upper surface 148, or a colored line and arrows applied (e.g., painted on, printed on, etched on, etc.) to the upper surface 148. The line 170*a* can align with a cable orientation strip 128 along the cable 14 (as shown in FIG. 23) and/or a cable orientation strip 126 along the cable organizer 46 (as shown in FIGS. 15 and 17) to further assist proper positioning of a ribbon cable 14 in the connector 34, while the arrows 170*b* can indicate ribbon cable direction out of the connector 34. In the example shown in FIGS. 20-23, the upper surface 148 includes an arrow 170*b* pointing outward toward each side 140, 142, indicating that a ribbon cable 14 can extend out from both sides 140, 142 when in the assembled state. Other features 170 not specifically described herein, such as arrows, tabs, or others, may be included within the scope of this disclosure to provide information to the user. Furthermore, in some embodiments, as shown in FIGS. 20, 21, and 23, the upper surface 148 can include slots 226**, for example, configured to receive a label tag (not shown).

When in the assembled state, the cover 48 can cover the open top 50 of the housing 40 to capture and entrap the ribbon cable 14 within the housing 40 between the cover 48 and the cable organizer 46. That is, the ribbon cable 14 can be held between the lower inverse cable profile 122 of the cable organizer 46 and the inverse cable profile 154 of the bottom surface 152 of the cover 48, thereby preventing vertical and/or horizontal movement of the ribbon cable 14 within the connector 30 to facilitate secured connections between the cable conductors 22 and the conductor contacts 52. For example, as shown in FIGS. 20 and 23, the first side 140, the second side 142, the first end 144, and the second end 146 of the cover 48 can generally align with the first side 62, the second side 64, the first end 66, and the second end 68, respectively, of the housing 40. The outer walls 216 of the cover 48 can also rest upon the shoulders 204 of the housing 40, and the end notches 218 in the cover 48 can align with the knobs 200, 206 of the housing 40, as shown in FIGS. 20 and 21. Furthermore, the internal hooks 220 of the cover 48 can snap onto the first and second ends 106, 108 of the cable organizer 46, thus securing the cover 48 to the cable organizer 46. As the cable organizer 46 is secured to the housing 40 (that is, via the lower detents 112 engaged with the lower slots 138 of the housing 40), the cover 48 may be secured to the housing 40 at least via the cable organizer 46.

Additionally, in some embodiments, as shown in FIG. 22, the cover 48 can be coupled to, and also move relative to, the housing 40 via ribs 222 of the cover 48 engaging the tracks 210 of the housing 40. For example, as shown in FIGS. 21, 22, and 24, each track 210 can include an upper detent 228 and a lower detent 230, and each rib 222 can include a corresponding notch 176 configured to engage an upper detent 228 when in the preassembled state and a lower detent 230 when in the assembled state. Thus, the upper detent 228 and corresponding notch 176 can hold or fix the cover 48 relative to the housing 40 in the preassembled state, allowing a ribbon cable 14 to be inserted into the open top 50 of the housing 40. However, in some embodiments, the notches 176 and the upper detents 228 can be sized so that the cover 48 can be pulled off of the housing 40 with a sufficient amount of force.

Accordingly, the cover 48 can freely translate along the axis 134 in a first, upward direction, until reaching an upward-most position when the notches 176 reach the upper detents 228. And the cover 48 can freely translate in a second, downward direction until reaching a downward-most position when the notches 176 reach the lower detents 230. In other words, the cover 48 can translate linearly along the axis 134 a specified vertical distance between the upward-most position and the downward-most position, thus providing a linear closure-type configuration, and can be held open in the upward-most position to facilitate insertion of the ribbon cable 14 into the open top 50.

The ribs 222 described above allows re-use of the cover 48 with a multiplicity of connectors (as further described below), thus creating several variant combinations which take advantage of the same, universal cover 48 for use with any housing 40 including tracks 210. As discussed above, in some embodiments, the cover 48 may be coupled to the housing 40 at all times, in both the preassembled and assembled states, therefore reducing the chances of losing components. However, in some embodiments, the cover 48 may be configured to be selectively uncoupled from the housing 40.

In some embodiments, the cover 48 and the cable organizer 46 can include additional features that help align the components during installation. For example, as shown in FIG. 27, the bottom surface 152 of the cover 48 and the cable organizer 46 can include mating guide ribs 232, 234 and apertures 236 that engage each other during installation. More specifically, the cover 48 can include pairs of guide ribs 232 adjacent both ends 144, 146. The cable organizer 46, along the first end 106 can include apertures 236 configured to receive the mating guide ribs 232. The cable organizer 46, along the second end 108 can include apertures 236 configured to receive the mating guide ribs 232 as well as further guide ribs 234 that slide adjacent (e.g., "scissor") the mating guide ribs 232 of the cover 48. In some cases, the mating guide ribs 232, 234 and apertures 236 can further help prevent potential misalignment of the connector 34 during installation.

While the connector described above with respect to FIGS. 20-27 is a node connector 34, one or more of the above-described components and features can be incorporated into other connectors in a network, such as the network 10 of FIG. 1. In some embodiments, unless specified otherwise below, any one or more of the above-described components of the linear closure-type node connector 34 can be incorporated into any one of a power tap left connector 30 (illustrated in FIGS. 28A and 28B), a power tap right connector 32, a terminator 36, and/or a splicer 38. Thus, with reference to the power tap left connector 30 of FIGS. 28A and 28B, like numerals illustrate like components as described above with respect to the node connector 34 of FIGS. 20-27. And, as any of the above-described features of the like components of the node connector 34 can be incorporated into any one of the power tap left connector 30, the power tap right connector 32, the terminator 36, and/or the splicer 38 in some embodiments, such features may not be described in detail again below for the sake of brevity.

For example, as shown in FIGS. 28A and 28B, the power tap left connector 30 having a linear closure-type configuration can include a housing 40, a protection cap (not shown), a printed circuit board 44, a cable organizer 46, and a cover 48. As described above, in the power tap left connector 30, a cut end of a ribbon cable 14 can be adjacent the first, or left, side 62 thereof, and the ribbon cable 14 extends out of the connector 30 from the second, or right, side 64 thereof.

As such, with respect to the housing 40, the first side 62 may not include a lowered edge with a profile 82, as described above, but, rather, may include a raised or straight edge extending from the first end 66 to the second end 68 (e.g., similar to the straight side edge 70 illustrated in the power tap left connector 30 of FIGS. 2-6). Additionally, with respect to the cover 48, the inverse cable profile 154 may stop short of the first side 140, in that the outer cover wall 216 defines an extended edge 150 extending entirely across the first side 140. As a result, the straight edges prevent a ribbon cable 14 from extending out from the first side of the connector 30.

Accordingly, in some embodiments, the covers 48 of the node connector 34 and the power tap left connector 30 may be different in that the power tap left connector cover 48 includes the extended edge 150 along the first side 140. In some embodiments, covers 48 may also differ with respect to placement of the features 170. For example, while the feature 170*a* shown in FIGS. 20-23 is depicted as a line extending across the entire cover 48, the feature 170 shown in FIGS. 28A and 28B is depicted as an indent that extends only to the second side 142 (e.g., indicating a power or ribbon cable direction). However, in some embodiments, the cover 48 may be manufactured without such components. For example, the cover 48 may not include the components, or the components can be applied to the cover 48 after manufacture based on its use with a desired connector. As such, in some embodiments, a universal cover 48 can be manufactured, applicable or adaptable to any type of connector within the network 10.

Furthermore, in some embodiments, the cover 48 of the power tap left connector 30 can include a window 238 along the first side 140, serving as an indicator for different stages of the installation process. For example, as shown in FIG. 28A, in the preassembled state, the window 238 can act as a view port to assist with positioning of the ribbon cable 14 within the connector 32. On the other hand, as shown in FIG. 28B, the window 238 can act as an indicator that the connector 32 is in the assembled state when the raised edge of the housing 40 is viewable through the window 238.

Turning now to a power tap right connector having a linear closure-type configuration (not shown), in some embodiments, a power tap right connector can include a housing 40, a protection cap 42, a printed circuit board 44, a cable organizer 46, and a cover 48. However, the power tap right connector can generally be a mirror image of the power tap left connector 30 shown in FIGS. 28A and 28B. More specifically, in the power tap right connector, a cut end of a ribbon cable 14 is adjacent a second, or right, side 64 thereof, and the ribbon cable 14 extends out of the connector from the first, or left, side 62 thereof.

As such, with respect to the housing 40, features on the first side 62 of the housing 40 of the power tap left connector 30 (such as the extended edge with substantially straight profile, e.g., similar to the extended edge 72 shown in FIG. 8) can be incorporated on the second side 64 of the housing 40 of the power tap right connector, and features on the second side 64 of the housing 40 of the power tap left connector 30 (such as the inverse ribbon profile 82) can be incorporated on the first side 62 of the housing 40 of the power tap right connector. Furthermore, in some embodiments, the printed circuit board 44 can include conductor contacts 52 in the same relative locations, so that the power tap right connector can engage the same conductors 22 as the power tap left connector 30.

Furthermore, in some embodiments, another difference between the covers 48 of the power tap left connector 30 and the power tap right connector may be the placement of the features 170, such as being mirror images of each other. However, in some embodiments, the cover 48 may be manufactured without such components. For example, as discussed above, a universal cover 48 may not include the components, or the components can be applied to the cover 48 after manufacture based on its use with a desired connector.

Turning now to a terminator having a linear closure-type configuration (not shown), in some embodiments, a terminator can include a housing 40, a cable organizer 46, and a cover 48. Like the power tap connectors 30, the terminator can include one side 62, 64 accommodating a cut end of a ribbon cable 14. However, unlike the power tap connectors 30 and the node connector 34, the terminator is not adapted to electrically or physically couple the ribbon cable 14 to a device in the network 10.

Thus, the terminator may not require certain features to accomplish such a device coupling. For example, in some embodiments, the housing 40 of the terminator can be substantially identical to the upper section 56 of the housing 40 of the power tap left connector 30 (e.g., including a similar width, length, and/or height as the upper section 56). However, rather than including a lower section 58 defining an open bottom 60, the terminator can include a rectangular housing with a closed bottom (e.g., the bottom seat 98 extends entirely across the bottom of the housing 40, similar to the terminator 36 shown in FIG. 11). Additionally, the cable organizer 46 of the terminator can be identical to the cable organizer 46 of the power tap connectors 30 and/or the node connector 34 (e.g., a universal cable organizer 46). However, in other embodiments, the cable organizer 46 can be specific only to the terminator, for example, without any apertures.

Also, the cover 48 of the terminator can be identical to the cover 48 of the power tap right connector (or the power tap left connector 30). For example, when installed on the terminator, a cut end of a ribbon cable 14 can be adjacent a second, or right, side 64 thereof, and the ribbon cable 14 extends out of the terminator from the first, or left, side 62 thereof. That is, while no conductors 22 of the ribbon cable 14 are selectively severed by the terminator, the cut end of the ribbon cable 14 can be covered by the second side 64 of the housing 40, with the cover 48 providing a visual indication of such termination via a feature 170.

Referring now a splicer having a linear closure-type configuration (not shown), according to some embodiments, the splicer can include a housing 40, a printed circuit board 44, two cable organizers 46, and two covers 48. Like the power tap connectors 30 and the terminator, the splicer can accommodate cut ends of two ribbon cables 14. Furthermore, unlike the power tap connectors 30 and the node connector 34, splicer may not be adapted to electrically or physically couple the ribbon cable 14 to a device in the network 10. Thus, the splicer may not require certain features to accomplish this coupling.

For example, in some embodiments, similar to the splicer 38 illustrated in FIG. 12, the housing 40 of the splicer having a linear closure-type configuration can be substantially identical to upper sections 56 of the housings 40 of the power tap left connector 30 and the power tap right connector, coupled together side-by-side (e.g., equal in width and height as the connectors 32, but at least double the length). Thus, a first side 62 of the housing 40 can include an inverse ribbon profile 82, like the power tap right connector to receive a first ribbon cable 14, a second side 64 of the housing 40 can include an inverse ribbon profile 82, like the power tap left connector 30, to receive a second ribbon cable 14, and a central raised edge (not shown) can extend through a center of the housing 40, similar in function to the extended edges 150 of power tap connectors 32, to cover cut ends of the first and second ribbon cables 14. The central raised edge can be a separate component coupled to the housing 40, or can be integral with the housing in some embodiments.

In some embodiments, the central raised edge does not extend through an entire depth of the housing 40, so that the interior space 96 can be defined within the housing 40, extending from the first side 62 to the second side 64 thereof. The splicer can include a printed circuit board 44 that generally extends across the interior space 96, with two sets of conductor contacts 52 configured to contact individual conductors of the first and second ribbon cables 14, respectively. The printed circuit board 44 can further include traces that electrically couple the conductors of the first and second ribbon cables 14 together via the two sets of conductor contacts 52.

Additionally, the splicer can include two side-by-side cable organizers 46, for example, each identical to the cable organizer 46 of the power tap connectors 30, the node connector 34, and/or the terminator (e.g., a universal cable organizer 46). However, in other embodiments, the cable organizers 46 can be specific only to the splicer. Furthermore, as no electrical connections need to be made at to an external device, the interior space 96 of the housing 40 can accommodate the cable organizers 46 and a printed circuit board 44 without a socket receptacle. For example, rather than the housing 40 including lower sections 58 defining open bottoms 60, the splicer can include a rectangular housing with a closed bottom (e.g., the bottom seat 98 extends entirely across the bottom of the housing 40).

Also, the splicer can include two covers 48, for example, substantially identical to the covers 48 of the power tap left connector 30 and the power tap right connector coupled together to engage tracks 210 on both sides 62, 64 of the housing 40. In some embodiments, the central raised edge may also include a section adjacent the second end 68 with tracks 210 to receive internal ribs 222 of the covers 48. Accordingly, when installed on the splicer, a cut end of a first ribbon cable 14 is adjacent the central raised edge and extends out of the splicer from the first, or left, side 62 thereof, and a cut end of a second ribbon cable 14 is adjacent the central raised edge and extends out of the splicer from the second, or right, side 64 thereof. In light of the above description, while the splicer can include a larger housing 40 than the other connectors, the splicer can still incorporate the same covers 48 and/or cable organizers 46.

As all connectors described above can include similar parts, such as similar covers 48, cable organizers 46, and/or housings 40, a ribbon cable 14 can be installed on any connector using substantially the same method and/or the same tooling. For example, in some embodiments, a ribbon cable 14 can be installed on a desired connector using traditional tooling, such as conventional pliers. However, in other embodiments, specialty tooling specific to the connector may be used.

Thus, according to some embodiments, the following method can be executed to install a ribbon cable 14 on a connector having a linear closure-type configuration. First, while the connector is in the preassembled state, the cover 48 can be linearly translated away from the housing 40 to create a cable access pathway 186, for example, as shown in FIG. 22. For example, in some embodiments, the cover 48 can be pulled away from the housing 40 so that the ribs 222 slide along the tracks 210 until the notches 176 reach the upper detents 228, thus maintaining the cover 48 away from the housing 40 in the preassembled state and creating the cable access pathway 186. While the cable access pathway 186 is shown in FIG. 22 as an opening adjacent the first end 66 of the housing 40, in some embodiments, a cable 14 may instead be inserted via the sides 62, 64 of the housing 40. Additionally, because the cover 48 remains coupled to the housing 40 in the preassembled state, the connector (and, more specifically, the guide walls 208 of the housing 40 and/or the outer walls 216 of the cover 48 along the second end 146) can "hang" on the ribbon cable 14 during installation at a desired location along the ribbon cable 14.

The ribbon cable 14 can then be inserted and positioned, via the cable access pathway 186, onto the cable organizer 46 so that the ribbon profile 28 of the ribbon cable 14 conforms to and aligns with the inverse ribbon profile 122 of the cable organizer 46. For example, the ribbon cable 14 can be inserted on the cable organizer 46 so that the respective strips 126, 128 on the cable organizer 46 and the ribbon cable 14 can be aligned. In some embodiments, such alignment can be assisted by the angled surfaces 214 adjacent the flat surface 110 of the cable organizer 46, as further described below. In addition, in some embodiments, with respect to the power tap connectors 30, the terminator, and/or the splicer, a cut end of the ribbon cable 14 can be aligned adjacent the raised edge or central raised edge of the housing 40 (or the extended edge 150 of the cover 48).

Once the ribbon cable 14 is generally aligned, the cover 48 can be pressed linearly along the axis 134 toward the housing 40. That is, the cover 48 can be pressed toward the housing 40 so that the ribs 222 slide along the tracks 210 until the notches 176 reach the lower detents 230 to entrap the ribbon cable 14 within the housing 40 between the cover 48 and the cable organizer 46. As the cover 48 is being pressed toward the housing 40, the ribbon cable 14 can be more precisely aligned relative to the cable organizer 46 as it slides down the angled surfaces 214 toward the profiled surface 122. Thus, the angled surfaces 214 can act as cable guide ramps to guide the cable onto the profiled surface 122.

In some embodiments, a clamping tool, such as a pliers, can be used to press the cover 48 toward the housing 40 to move the connector from the preassembled state to the assembled state, as described above. That is, the tool can engage the upper surface 148 of the cover 48 (such as the bump 224) and a lower surface of the connector. The lower surface can be, for example, the lower surface of the housing 40 (e.g., the lower section 58 of the housing 40 of the node connector 34, or the power tap connectors 30, 32 or the enclosed bottom seat 98 of the terminator 36 or the splicer 38). In some embodiments, to protect the open bottom 60 of the power tap connectors 30 and the node connector 34, a protection cap 42 can first be placed over the lower section 58 of the housing 40 so that the tool can instead engage the protection cap 42.

Once engaged, the tool can be actuated to press the cover 48 toward the housing 40. In some embodiments, at the end of this movement, the applied compression forces can be distributed fully onto the housing 40. This clamping further completes termination of each conductor contact 52 onto the ribbon cable 14, thus electrically coupling the conductors 22 to the socket receptacle 100 in the power tap and node connectors 30, 32, 34, and coupling the conductors 22 of adjacent ribbon cables 14 together in the splicer 38.

The tool can press the cover 48 toward the housing 40 with enough force to disengage the lower detents 112 of the cable organizer 46 from the upper slots 136 of the housing 40, moving the cable organizer 46 downward until the lower detents 112 snap into the lower slots 138 of the housing 40. Furthermore, the tool can press the cover 48 toward the housing 40 with enough force to disengage the notches 176 from the upper detents 228 until the notches 176 slide down the tracks 210 and engage the lower detents 230. These engagements can provide haptic feedback at the different stages of the cable termination process. Furthermore, the ribs 222 and the tracks 210 can permit a linear range of motion of the cover 48 irrespective of the direction or magnitude of applied forces by the tool against the connector from initial closing of the cover 48 until the cable termination. That is, while the cover 48 can move in a single directional line of motion, the input motion of the tool need not be in the same directional line of motion. As a result, proper connections between the connector and the ribbon cable 14 can be achieved with less precision during the clamping process, and using common tooling. For example, the profiled (e.g., nonplanar) upper surface 148 of the cover 48, as described above, can allow a clamping tool with varying placement positions, jaw opening angles, and force component vectors, to be used to primarily transmit a useful linear magnitude and direction of force to close the cover 48 and fully terminate a ribbon cable 14 in a desired linear manner. It should be noted that, while the profiled upper surface 148 is discussed herein with respect to the linear, sliding connector design, it may also be applicable to hinged, floating hinge, or multi-degree of freedom connector designs of some embodiments.

As described above, FIGS. 1-19 illustrate hinged closure-type connectors and FIGS. 20-28B illustrate linear closure-type connectors. However, in some embodiments, one or more features of any of the above-described connectors illustrated in FIGS. 2-28 may be combined. Furthermore, one or more of the features of any of the above-described connectors illustrated in FIGS. 1-28 may be incorporated into or combined with different connector configurations. For example, FIG. 29 illustrates a set of connectors according to some embodiments, having another hinged closure-type configuration, including a node connector 34, a power tap left connector 30, a power tap right connector 32, a terminator 36, and a splicer 38. It should be noted that, unless specified otherwise, any one or more of the above-described components and features of the connectors of FIGS. 2-28B can be incorporated into the connectors of FIG. 29, as further described below. Thus, like numerals illustrate like components and certain features, though incorporated in certain embodiments, may not be described in full detail again below for the sake of brevity.

Accordingly, referring to FIG. 29, generally, each connector 30-38 can include a housing 40, a printed circuit board 44, a cable organizer 46, and a cover 48. Furthermore, each of the power tap left connector 30, the power tap right connector 32, and the node connector 34 can include a removable protection cap 42. The housing 40, the cover 48, and/or the cable organizer 46 can be adapted to provide a hinged closure-type connector configuration, as further described below.

Figure 31:
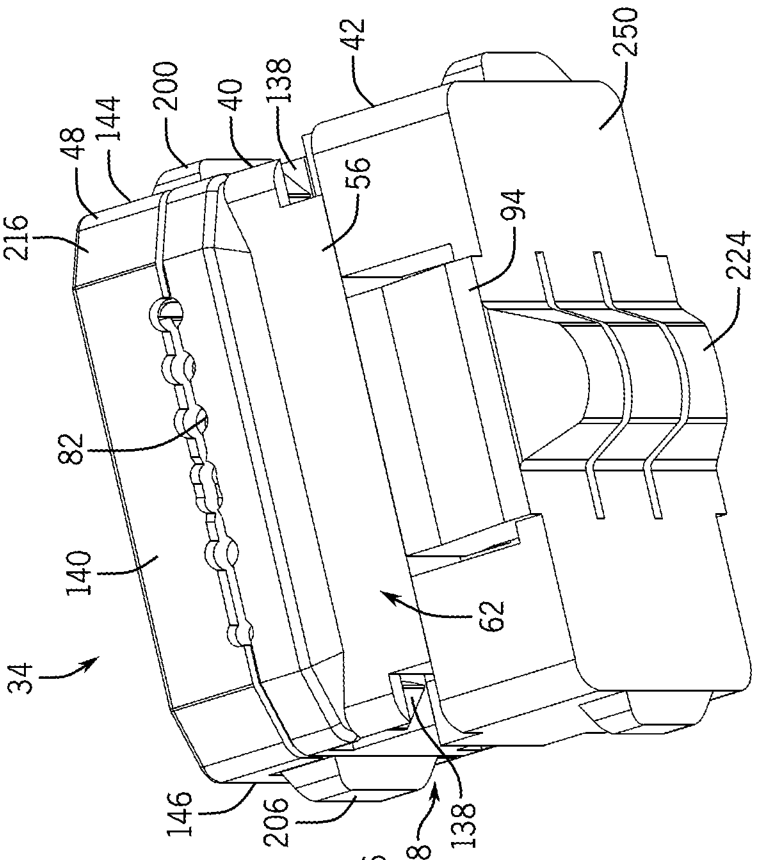
FIG. 31 is a perspective underside view of the node connector of FIG. 30.
Figure 30:
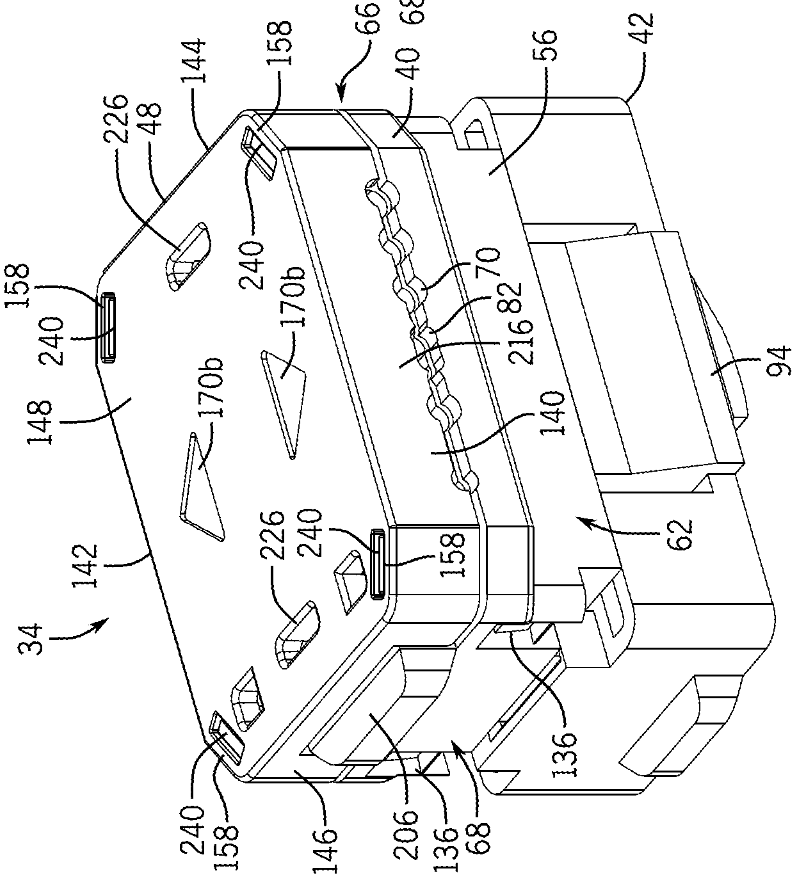
FIG. 30 is a perspective view of a node connector, according to some embodiments.
Figure 32:
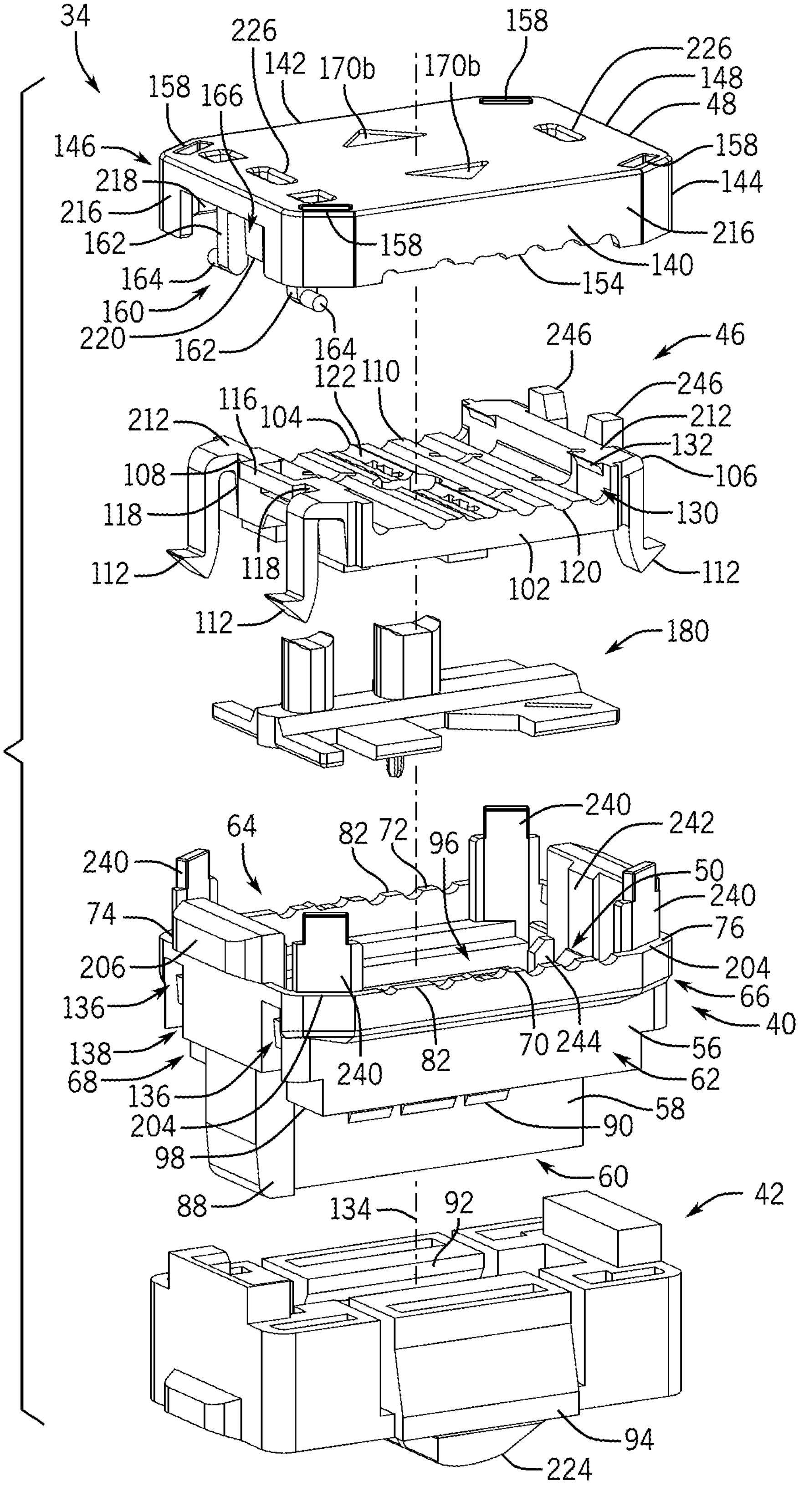
FIG. 32 is a perspective exploded view of the node connector of FIG. 30.

Referring now to FIGS. 30-32, a node connector 34 with a hinged closure-type configuration, according to some embodiments, is illustrated. The node connector 34 can include a housing 40, a removable protection cap 42, a printed circuit board 44 (shown in FIG. 29), a cable organizer 46, and a cover 48. Generally, a ribbon cable 14 can be positioned within (e.g., extend across) an open top 50 of the housing 40 and be supported by the cable organizer 46. The ribbon cable 14 can be enclosed within the housing 40 by the cover 48 when the node connector 34 is in an assembled state, as shown in FIGS. 30 and 31. When enclosed within the housing 40, individual conductors 22 of the ribbon cable 14 can engage one or more conductor contacts 52 (such as insulation-displacement contacts (IDCs) and/or insulation-piercing contacts (IPCs)) extending from the printed circuit board 44, as shown in FIG. 29. The housing 40 can be further adapted to plug into a corresponding jack on a device node to electrically and physically connect the ribbon cable 14 to the device node.

With respect to the housing 40, in some embodiments, the housing 40 can support and enclose the printed circuit board 44 and the cable organizer 46 therein, and can be coupled to the cover 48 in a manner so that open top 50 of the housing 40 can be selectively covered by the cover 48, as further described below. The housing 40 can be generally rectangular in shape and can include an upper section 56 and a lower section 58, an open top 50 (e.g., at the upper section 56) and an open bottom 60 (e.g., at the lower section 58), a first side 62, a second side 64, a first end 66, and a second end 68. When a ribbon cable 14 is positioned in the housing 40, the ribbon cable 14 extends out of the connector 30 from both sides 62, 64 (similar to that shown in FIG. 23).

As shown in FIG. 32, the upper section 56 of the housing 40 can define the open top 50. In some embodiments, the first side 62 and the second side 64 can each include a lowered edge with a profile 82 configured to permit a ribbon cable 14 to extend out from the first side 62 and the second side 64 of the housing 40, respectively, when the ribbon cable 14 is coupled to the node connector 34. That is, the first side 62 and the second side 64 can each include an inverse ribbon profile 82 that substantially corresponds to the ribbon profile 28 of a ribbon cable 14, allowing the ribbon cable 14 to sit within the profile 82. As a result, the housing 40 can facilitate and maintain proper alignment of the ribbon cable 14 within the housing 40 when the ribbon cable 14 is coupled to the node connector 34.

Furthermore, as shown in FIGS. 30-32, along the first end 66 and the second end 68, the upper section 56 of the housing 40 can include an outwardly extending knob 200 and an outwardly extending knob 206, respectively. Additionally, the upper section 56 can include one or more posts 240, such as four posts 240, each situated adjacent a respective corner of the housing 40. As shown in FIG. 32, the posts 240 can each be internally offset from an outer surface of the upper section 56, creating a shoulder 204. In some embodiments, the posts 240 can help linear translation of the cover 48 relative to the housing 40.

In some embodiments, as shown in FIGS. 30-32, the lower section 58 of the housing 40 can be integral with the upper section 56, though smaller than the upper section 56. The lower section 58 can be dimensioned to define the open bottom 60 and also to plug into a node jack of a device node, i.e., so that the housing 40 can be plugged into the node jack, thus physically and electrically coupling the ribbon cable 14 to the device node via the node connector 34. In some embodiments, to facilitate proper directional (e.g., right-left) alignment of the connector 34 with a node jack, the lower section 58 can be longer on the second end 68 than the first end 66 to define a corner extension 88. Accordingly, the lower section 58 can include a generally rectangular profile with the corner extension 88, which matches a corresponding rectangular opening and corner extension of the node jack (not shown) in order to plug the connector 34 into the node jack.

Referring to FIGS. 29 and 32, the upper and lower sections 56, 58 of the housing 40 can define an interior space 96 that houses the printed circuit board 44. More specifically, in some embodiments, the printed circuit board 44, such as a printed circuit board assembly, can sit within the housing 40 and can include, extending from an upper end thereof, one or more individual and distinct conductor contacts 52, each of which are separately soldered or pressed-in to the printed circuit board 44 with a mechanical and electrical connection, sufficient to connect the printed board circuits to the various individual conductors 22 of the ribbon cable 14.

In some embodiments, the printed circuit board 44 and the conductor contacts 52 are positioned within the upper section 56 of the housing 40. For example, the upper section 56 can include a bottom seat 98 defined by an inward-stepped portion that connects that upper section 56 to the lower section 58, and the bottom seat 98 can support the printed circuit board 44 within the upper section 56. In some embodiments, the printed circuit board 44 can extend within the interior space 96 across the upper section 56 to define open areas between respective ends of the printed circuit board 44 and the first and second ends 66, 68 of the housing 40. As further described below, lower detents 112 of the cable organizer and/or portions of the cover 48 can extend into the open areas.

The conductor contacts 52 can be located along the printed circuit board 44 so that they can be configured to electrically contact individual conductors 22 of a ribbon cable 14 when the connector 34 is in its assembled state, as further described below. The printed circuit board 44 further includes, extending from a lower end thereof into the lower section 58 of the housing 40, a connector socket receptacle 100 electrically coupled to the conductor contacts 52 and accessible via the open bottom 60 of the housing 40. For example, the connector socket receptacle 100 can be adapted to plug into a corresponding node jack on a device node to electrically and physically connect the ribbon cable to the device node when the lower section 58 of the housing 40 is plugged into the node jack.

To facilitate proper connections between the conductor contacts 52 and respective conductors 22 of a ribbon cable 14, the cable organizer 46 can be configured to maintain a position of the ribbon cable 14 within the connector 34. More specifically, the cable organizer 46 can sit within and be supported by the housing 40, and positioned over top of the printed circuit board 44 so that it accessible via the open top 50 of the housing 40. As shown in FIG. 32, the cable organizer 46 can include a first side 102, a second side 104, a first end 106, and a second end 108 that generally align with the first side 62, the second side 64, the first end 66, and the second end 68, respectively, of the housing 40. The cable organizer 46 can also include a generally flat surface 110 between two raised end surfaces 212, with one or more lower detents 112 that extend generally downward from the end surfaces 212 (e.g., along corners of the cable organizer 46 or at other positions along the sides 102, 104 or ends 106, 108). Furthermore, referring still to FIG. 32, the cable organizer 46 can include a second latch extension 116 that extends from the second end 108. For example, the second end 108 can include spaced apart notches 118 that define the second latch extension 116, extending horizontally outward, therebetween.

In some embodiments, the cable organizer 46 can include a plurality of longitudinal grooves or guideways 120 in the flat surface 110 extending from the first side 102 to the second side 104 thereof and configured to receive insulated conductors 22 of a ribbon cable 14. For example, the longitudinal guideways 120 of the cable organizer 46 can define an inverse ribbon profile 122 that substantially corresponds to the ribbon profile 28 of the ribbon cable 14 (e.g., matching the inverse ribbon profiles 82 on the first and second sides 62, 64 of the housing 40), thus permitting proper alignment of individual conductors 22 of the ribbon cable 14 within the connector 34 when the ribbon cable 14 is placed on the cable organizer 46. The cable organizer 46 also includes a plurality of apertures 124 extending through one or more of the longitudinal grooves 120 and configured to axially align with the conductor contacts 52, as further described below.

Additionally, in some embodiments, as shown in FIG. 32, the cable organizer 46 can further include cable grab hooks 130 at one or both outermost guideways 120 that can help position and retain the ribbon cable 14 until the connector 30 is placed in the assembled state. That is, the cable organizer 46 can include the flat surface 110, with inner guideways 120 each extending downward a depth to create the inverse ribbon profile 122 matching a lower half of the ribbon cable 14. However, the cable grab hooks 130 can include upward extensions 132 that extend upward from the flat surface 110 (e.g., upward from an outermost guideway 120), above the inner guideways 120, and curve inward toward each other to match and engage at least a portion of an upper half of the ribbon cable 14. Accordingly, the ribbon cable 14 can snap into the cable grab hooks 130, enabling proper alignment of the ribbon cable 14 within the connector 34, improved security of the ribbon cable 14 within the connector 34 in both the preassembled and assembled states, and user feedback for proper installation, as described in more detail above with respect to FIGS. 14-17.

To further facilitate ribbon cable installation, the cable organizer 46 can be moveable in an axial direction within the housing 40, (e.g., along an axis 134, shown in FIG. 32). In some embodiments, the cable organizer 46 can be moved between a first position when the connector 34 is in a preassembled state (like that shown in FIGS. 22 and 25) and a second, lower position when the connector 34 is in an assembled state. For example, in some embodiments, as shown in FIGS. 30-32, the housing 40 can include one or more upper slots 136 extending through the first and second ends 66, 68, and one or more lower slots 138 extending through the first and second ends 66, 68 and positioned a distance below the upper slots 136. The lower detents 112 of the cable organizer 46 can be configured to engage or snap into the slots 136, 138 of the housing 40 to lock the cable organizer 46 in the first position (e.g., preassembled state) and the second position (e.g., assembled state), respectively.

More specifically, in the preassembled state, the lower detents 112 can each engage a respective upper slot 136 of the housing 40. In this position, the raised end surfaces 212 of the cable organizer 46 can generally align with or extend above upper edges of the knobs 200, 206 (thus placing the cable organizer 46 within, or extending across, the open top 50) and the inverse ribbon profile 122 of the cable organizer 46 can be positioned above the inverse ribbon profiles 82 of the housing 40. Additionally, in the preassembled state, the cable organizer 46 is spaced a first distance above the printed circuit board 44 so that the conductor contacts 52 do not extend through the apertures 124 of the cable organizer 46.

In the assembled state, the cable organizer 46 can be pressed axially downward along the axis 134 into the housing 40 so that the lower detents 112 disengage the upper slots 136 and slide down the interior 96 of the housing 40 until they each engage (e.g., snap into) a respective lower slot 138. In this position, the inverse ribbon profile 122 of the cable organizer 46 can align with the inverse ribbon profiles 82 of the housing 40. Additionally, in the assembled state, the cable organizer 46 is spaced a second distance above the printed circuit board 44 so that the conductor contacts 52 extend through the apertures 124 and, as a result, can engage the individual conductors 22 of the ribbon cable 14 received within the longitudinal grooves 120. Additionally, as shown in FIG. 29, in some embodiments, the node connector 34 can incorporate a cutter 180 configured to sever a specific cable conductor 22 when the connector 34 is installed.

Furthermore, in some embodiments, the cable organizer 46 and the housing 40 can include additional features that help align the components during installation. For example, as shown in FIG. 32, the housing 40 can include one or more internal tracks 242 and/or guide ribs 244 at either end 66, 68. The cable organizer 46 can include mating guide ribs 246 along the first end 106, which can slide along either side of the track 242 and engage the guide ribs 244 as the cable organizer 46 is translated downward from its first position to its second position. Furthermore, the cable organizer 46 can include notches 118 along the second end 108 that can slide along an internal track (not shown) within the housing 40 as the cable organizer 46 translated downward from its first position to its second position. Accordingly, in some cases, these features can further help prevent potential misalignment of the connector 34 during installation.

Generally, the cable organizer 46 can be enclosed within the housing 40 by the cover 48. In some embodiments, as shown in FIGS. 30-32, the cover 48 can be generally rectangular in shape and include a first side 140, a second side 142, a first end 144, and a second end 146. The cover 48 can also include an upper surface 148 and a bottom surface 152 (like that shown in FIG. 24). More specifically, like that shown in FIG. 24, the bottom surface 152 of the cover 48 can include an inverse cable profile 154 extending from the first side 140 to the second side 142 (e.g., corresponding to the ribbon profile 28 of a ribbon cable 14) and one or more apertures or indentations 156 that can generally align with the apertures 124 of the cable organizer 46.

As shown in FIG. 32, the cover 48 can include outer walls 216 at the first and second ends 144, 146, which can extend around to the first and second sides 140, 142. Additionally, along the first and second ends 144, 146, each outer wall 216 can include a notch 218. The cover 48 can further include hooks 220 extending from the bottom surface 152 and positioned adjacent the first and second ends 144, 146, spaced inward from the respective notches 218. Furthermore, the cover 48 can include a latch 160 extending downward adjacent the second end 146. For example, the latch 160 can include two extensions 162 extending downward adjacent the second end 146 and spaced apart to define an open slot 166 therebetween. The latch 160 can further include horizontal bars 164 extending from lower ends of the extensions 162 in opposite directions, such that the extensions 162 each form an L-shape. In some embodiments, the open slot 166 can be sized to receive the second latch extension 116 of the cable organizer 46, and the extensions 162 can be sized to permit their free movements within the notches 118, as further described below.

Regarding the upper surface 148 of the cover 48, in some embodiments, the upper surface 148 may be substantially flat. However, in other embodiments, the upper surface 148 can include a nonplanar surface profile, as described above with respect to FIGS. 20-22 and 26. Furthermore, in some embodiments, as shown in FIGS. 29-32, the upper surface 148 of the cover 48 can include one or more features 170 that provide information to a user, for example, when the connector 34 is in the assembled or preassembled state. In one example, the feature 170 may be a one or more arrows 170*b*, such as an indented or protruding line and arrows formed in the upper surface 148, or a colored line and arrows applied (e.g., painted on, printed on, etched on, etc.) to the upper surface 148. The arrows 170*b* can indicate ribbon cable direction out of the connector 34. Other features 170 not specifically described herein, such as arrows, tabs, or others, may be included within the scope of this disclosure to provide information to the user. Furthermore, in some embodiments, as shown in FIGS. 29-32, the upper surface 148 can include slots 226, for example, configured to receive a label tag (not shown).

When in the assembled state, the cover 48 can cover the open top 50 of the housing 40 to capture and entrap the ribbon cable 14 within the housing 40 between the cover 48 and the cable organizer 46. That is, the ribbon cable 14 can be held between the lower inverse cable profile 122 of the cable organizer 46 and the inverse cable profile 154 of the bottom surface 152 of the cover 48, thereby preventing vertical and/or horizontal movement of the ribbon cable 14 within the connector 30 to facilitate secured connections between the cable conductors 22 and the conductor contacts 52. For example, as shown in FIGS. 30 and 31, the first side 140, the second side 142, the first end 144, and the second end 146 of the cover 48 can generally align with the first side 62, the second side 64, the first end 66, and the second end 68, respectively, of the housing 40. The outer walls 216 of the cover 48 can also rest upon the shoulders 204 of the housing 40, and the notches 218 in the cover 48 can align with the knobs 200, 206 of the housing 40, as shown in FIGS. 30 and 31. Furthermore, the internal hooks 220 of the cover 48 can snap onto the first and second ends 106, 108 of the cable organizer 46, thus securing the cover 48 to the cable organizer 46. Thus, as the cable organizer 46 is secured to the housing 40 (that is, via the lower detents 112 engaged with the lower slots 138 of the housing 40), the cover 48 may be secured to the housing 40 at least via the cable organizer 46.

Additionally, in the assembled state, as shown in FIGS. 30 and 31, the notches 158 of the cover 48 can align with and receive the posts 240 of the housing 40 so that the posts 240 are visible to a user. For example, the posts 240 can extend into the notches 158 so that they lie substantially flush with the upper surface 148 of the cover 48. In some embodiments, the posts 240 and/or the lower detents 112 can comprise a different color or pattern than the cover 48 and/or the housing 40. As a result, similar to the upper detents 114 and the lower detents 112 described above with respect to FIGS. 14-19, the posts 240 and the lower detents 112 can serve as mechanical, visual indicators that signal to a user that the cover 48 and the cable organizer 46 are seated properly and the connector 34 is properly assembled, and the conductors 22 of the ribbon cable 14 are properly connected.

As noted above, a user may use tooling to place the node connector 34 into the assembled state. In some embodiments, the protection cap 42 can protect components within the interior of the housing 40 (such as the printed circuit board 44) from such tooling when the connector 34 is placed in its assembled state. More specifically, as shown in FIGS. 30 and 31, the lower section 58 of the housing 40 can be selectively covered by the protection cap 42 in order to cover the open bottom 60. Furthermore, as described above, the protection cap 42 can protect an interior of the housing 40 from outside elements when the connector 34 is not connected to a device node.

In some embodiments, as shown in FIG. 32, the lower section 58 of the housing 40 can include grooves 90 (e.g., along first and second sides 62, 64) configured to engage detents 92 of the protection cap 42 to couple the components together. More specifically, the protection cap 42 can include pivotable latches 94 with the detents 92 adjacent inner, top ends thereof. At rest, the latches 94 can urge inward; however, the latches 94 can be rotated outward when bottom ends of the latches 94 are pressed. As a result, a user can squeeze the bottom ends of the latches 94 to place the protection cap 42 over the lower section 58 of the housing 40 until the top ends of the latches 94 are adjacent the upper section 56, and then release the bottom ends so that the detents 92 urge inward to engage the grooves 90 and fix the protection cap 42 to the lower section 58. To disengage the protection cap 42 from the housing 40, the user can again squeeze or axially pull the latches 94 to release the detents 92 from the grooves 90 and freely slide the protection cap 42 off the lower section 58.

Furthermore, in some embodiments, a lower surface 250 of the protection cap 42 can be a flat surface, like the configurations illustrated in FIGS. 2-11. However, in some embodiments, as shown in FIGS. 31 and 32, the lower surface 250 can include a nonplanar surface to serve as a contact surface for associated tooling. For example, the lower surface 250 can include beveling, a bump 224, or inverted bump, like that described above with respect to the upper surface 148 and bump 224 of the cover 48, shown in FIGS. 20-25 and 26. As described above, a profiled bump 224 can allow a clamping tool with varying placement positions, jaw opening angles, and force component vectors, to be used to primarily transmit a useful linear magnitude and direction of force to close the cover 48 and fully terminate a cable 14 in a desired linear manner. In some embodiments, by moving the nonplanar surface to the lower surface 250 of the protection cap 42 rather than, for example, the upper surface 148 of the cover 48, more compact connectors can be realized (e.g., as the protection cap 42 is removed upon installation, whereas the cover 48 remains after installation).

Referring back to FIG. 29, in some embodiments, the protection cap 42 can be in the form of a protection cap jack or dust cap 248, including a board 252 containing circuitry and incorporating electrical contact pins which mate to a connector socket receptacle 100 in a fashion similar to how a device (in this example, a node device) would mate with the connector socket receptacle 100, as well as a cap 254. Accordingly, should a connector be removed from a device, for example in the event of device repair or replacement, the protection cap jack 248 could replace the device either temporarily or permanently, thereby maintaining data transmission and signal integrity along the ribbon cable data conductors 22 and protecting the connector socket receptacle 100 from dust or other outside elements.

In some embodiments, in the preassembled state (e.g., like that shown in FIGS. 2 and 4), the cover 48 can remain coupled to, and also move relative to, the housing 40 via the latch 160 of the cover 48 engaging with the second latch extension 116 of the cable organizer 46. For example, in the preassembled state, the latch extension 116 can be positioned relative to the housing 40 to prevent the latch 160 from being disengaged with the latch extension 116. In this manner, the latch 160 of the cover 48, the first end edge 74 of the housing 40, and the second latch extension 116 and notches 118 of the cable organizer 46 form a latch assembly of the connector 34 that permits the cover 48 to be moved relative to the housing 40. More specifically, in the preassembled state, the cable organizer 46 is positioned relative to the housing 40 so that second latch extension 116 aligns with the knob 206 of the housing 40. Furthermore, the second latch extension 116 can extend through the open slot 166 of the cover latch 160, and the bars 164 are retained under the raised ends 212 of the cable organizer 46.

As a result, the cover 48 can freely translate along the axis 134 in a first, upward direction, with the extensions 162 able to move through the notches 118, until reaching an upward-most position when the bars 164 engage the raised ends 212 of the cable organizer 46 and stop vertical movement. And the cover 48 can freely translate in a second, downward direction until reaching a downward-most position when the second end 146 of the cover 48 engages the second latch extension 116 and stops vertical movement. Thus, the cover 48 can freely translate along the axis 134 a specified vertical distance between the upward-most position and the downward-most position.

Furthermore, while vertical movement is permitted, horizontal movement of the cover 48, along a plane perpendicular to the axis 134, can be generally restricted in a first direction (e.g., toward the first end 144) due to the extensions 162 contacting the cable organizer 46, in a second, opposite direction (e.g., toward the second end 146) due to the extensions 162 and/or the bars 164 contacting the second end 68 of the housing 40, and in third and fourth directions perpendicular to the first direction (e.g., toward the first and second sides 140, 142) due to the extensions 162 contacting the second latch connector 116.

Figure 33:
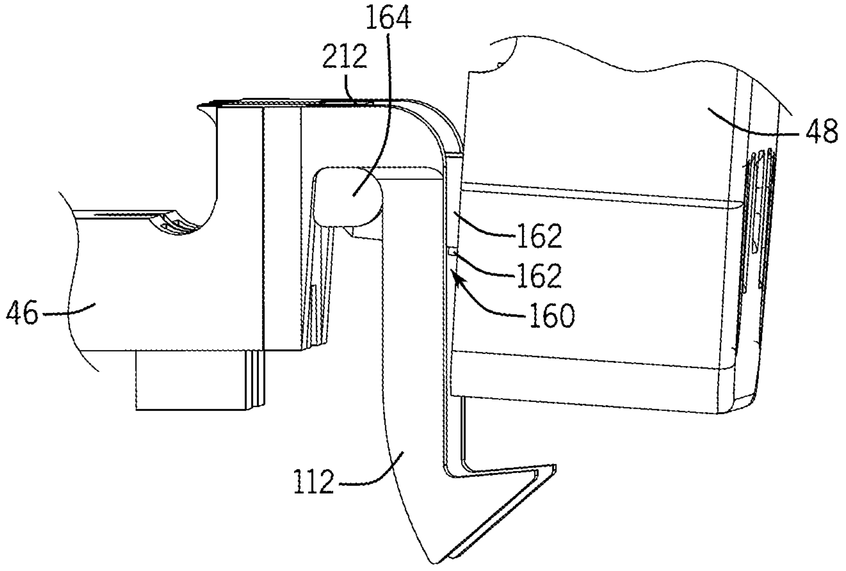
FIG. 33 is a partial side view of a cable organizer and a cover of the node connector of FIG. 30, in a preassembled state.

However, in the preassembled state, the cover 48 can freely rotate relative to the housing 40. More specifically, the cover 48 can be rotated away from the housing 40, generally about a rotation axis defined by the bars 164. Due to the free vertical movement of the cover 48 and, more specifically, the bars 164, the latch 160 is therefore not rotated about a fixed axis but, rather, can be rotated about a moving axis anywhere along the specified vertical distance. Furthermore, the notch 218 in the cover 48 can provide adequate space for the cover 48 to rotate about the knob 206 of the housing 40 when in the preassembled state. Additionally, in some embodiments, as shown in FIG. 33, the bars 164 can act as detents, providing slight resistance to rotation so that the cover 48 can remain open when rotated away from the housing 40. More specifically, in some embodiments, as shown in FIG. 33, the bars 164 can be configured (e.g., sized and shaped) to have profiles that closely match a profile under the raised end surfaces 212 of the cable organizer 46. As a result, these closely matching profiles provide a slight resistance when the cover 48 is rotated into an open position and, thus, can maintain the cover 48 in the open position until a sufficient force is applied to rotate the cover 48 back over the housing 40.

Accordingly, at least the cover 48 and the cable organizer 46 can form a hinged closure-type configuration. However, the cover 48 can be moved along a non-specific trajectory with a combination of translations and rotations, creating a moving axis and an extended range of motion greater than, for example, a fixed axis hinge joint or a floating hinge with two parallel axes of rotation. In this manner, the cover 48 can be closed in a less constrained manner, regardless of varying cable cross-sections, multiple conductors of equal or mixed sizes, and other obstructive physical barriers and features.

Additionally, when in the assembled position, as shown in FIGS. 30 and 31, the cover 48 cannot rotate at least because the hooks 220 (such as the hook 220 adjacent the first end 144) engage the cable organizer 46. Thus, in the preassembled state, the cover 48 can be rotated away from the housing 40 to facilitate insertion of a ribbon cable 14, as described below. And to assemble the connector 34 in the assembled state, the latch 160 can be rotated back so that the cover 48 is positioned above and aligned with the cable organizer 46. Once aligned, the cover 48 is translated downward into the housing 40 so that further rotation is hindered.

The latch assembly described above allows re-use of the cover 48 with a multiplicity of connectors (as further described below), thus creating several variant combinations which take advantage of the same, universal cover 48. In some embodiments, the cover 48 may be coupled to the housing 40 at all times, in both the preassembled and assembled states, therefore reducing the chances of losing components. However, in some embodiments, the cover 48 may be configured to be selectively uncoupled from the housing 40.

While the connector described above with respect to FIGS. 30-33 is a node connector 34, one or more of the above-described components and features can be incorporated into other connectors in a network, such as the network 10 of FIG. 1. In some embodiments, unless specified otherwise below, any one or more of the above-described components of the hinged closure-type node connector 34 can be incorporated into any one of a power tap left connector 30 (illustrated in FIGS. 29, 34, and 35), a power tap right connector 32 (illustrated in FIG. 29), a terminator 36 (illustrated in FIGS. 29 and 36), and/or a splicer 38 (illustrated in FIG. 29). Thus, like numerals illustrate like components as described above with respect to the node connector 34 of FIGS. 30-33. And, as any of the above-described features of the like components of the node connector 34 can be incorporated into any one of the power tap left connector 30, the power tap right connector 32, the terminator 36, and/or the splicer 38 in some embodiments, such features may not be described in detail again below for the sake of brevity.

Figure 34:
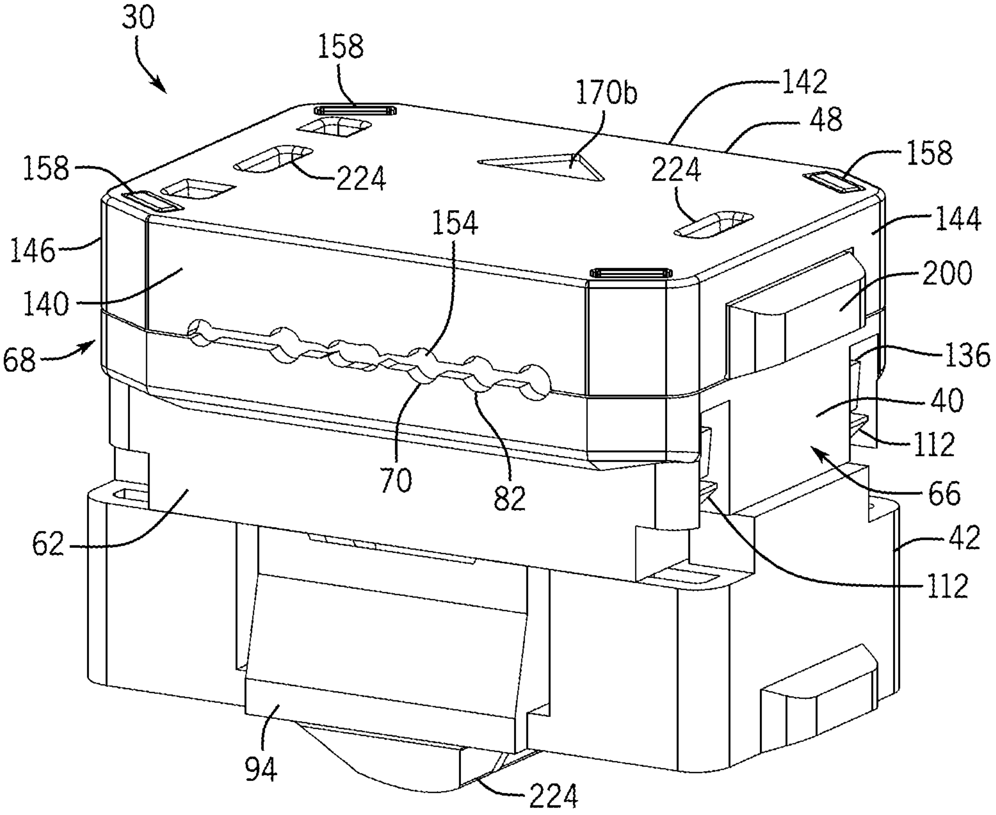
FIG. 34 is a perspective view of a power tap left connector according to some embodiments.
Figure 35:
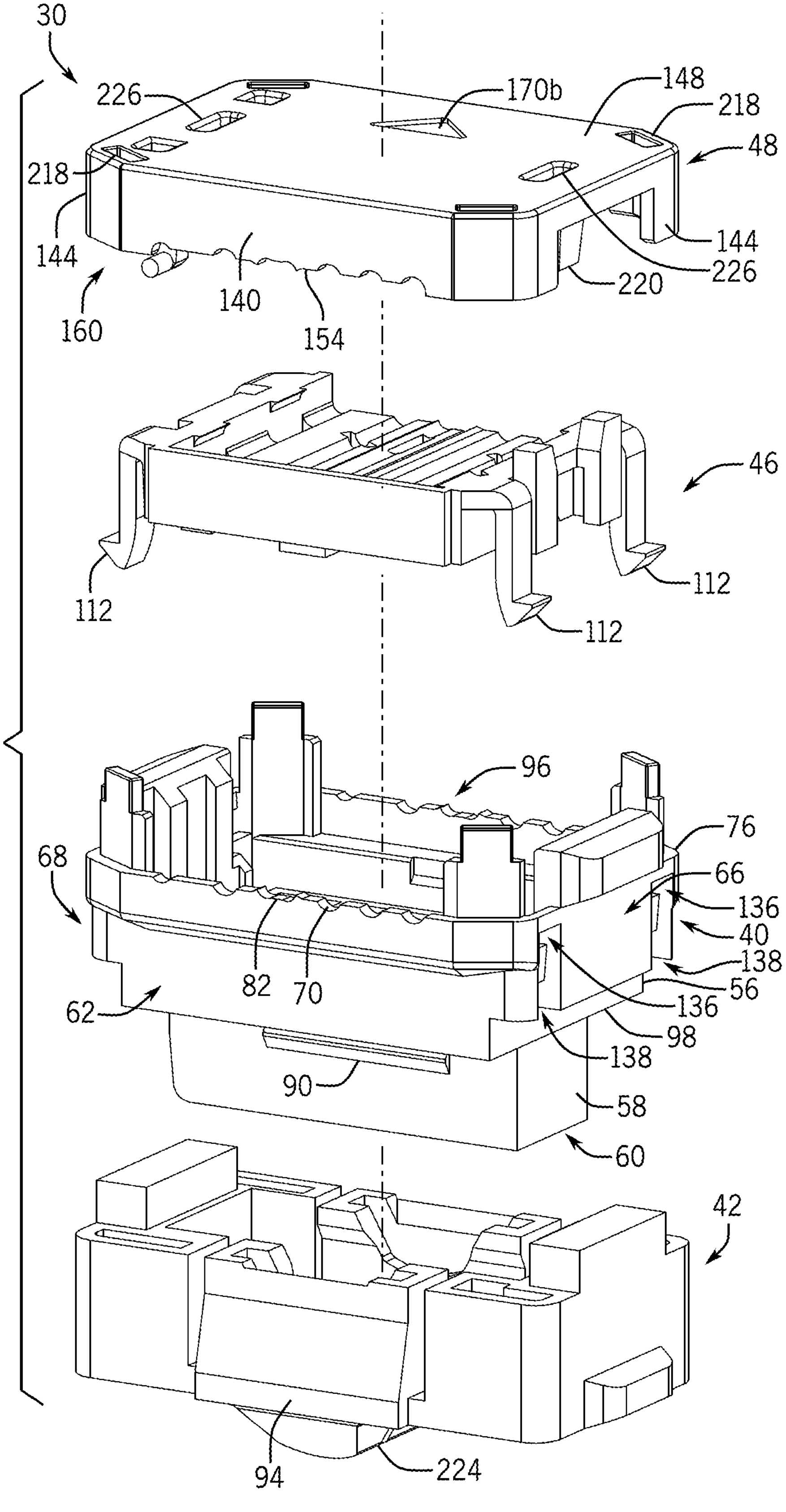
FIG. 35 is a perspective exploded view of the power tap left connector of FIG. 34.
Figure 36:
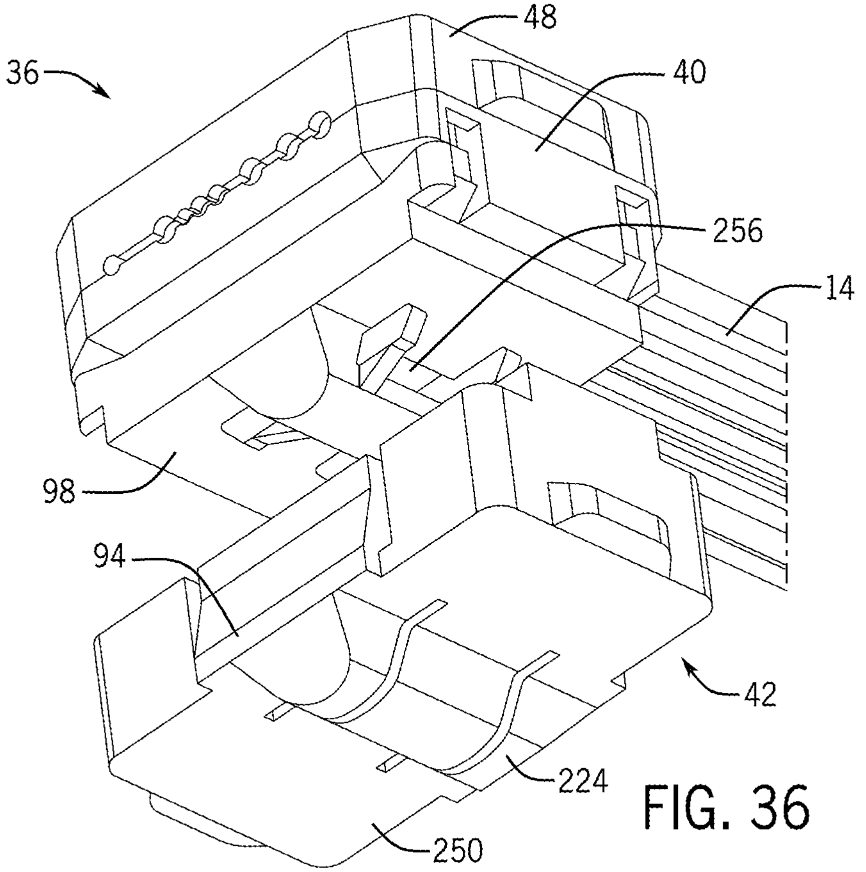
FIG. 36 is a perspective underside view of a terminator according to some embodiments.

For example, as shown in FIGS. 34 and 35, the power tap left connector 30 having a hinged closure-type configuration can include a housing 40, a protection cap 42, a printed circuit board 44 (shown in FIG. 29), a cable organizer 46, and a cover 48. As described above, in the power tap left connector 30, a cut end of a ribbon cable 14 can be adjacent the first, or left, side 62 thereof, and the ribbon cable 14 extends out of the connector 30 from the second, or right, side 64 thereof. As such, with respect to the cable organizer 46, the first side 102 may include a raised or straight edge extending from the first end 106 to the second end 108.

Additionally, in some embodiments, the covers 48 of the node connector 34 and the power tap left connector 30 may differ with respect to placement of the features 170. For example, while the cover 48 of the node connector 34 shows arrows **170*b* pointed outward from both sides 140, 142, the cover 48 of the power tap left connector 30 includes a single arrow 170***b* pointed outward from only the second side 142. In some embodiments, these features can be applied to the cover 48 after manufacture based on its use with a desired connector. As such, in some embodiments, a universal cover 48 can be manufactured, applicable or adaptable to any type of connector within the network.

Furthermore, in some embodiments, as shown in FIG. 29, the protection cap 42 of the power tap left connector 30 may be larger than the protection cap 42 of the node connector 34 in order to accommodate a larger lower section 58 of the housing 40 of the power tap left connector 30.

Turning now to a power tap right connector 32 having a hinged closure-type configuration, in some embodiments, as shown in FIG. 29, a power tap right connector can include a housing 40, a protection cap 42, a printed circuit board 44, a cable organizer 46, and a cover 48. However, the power tap right connector 32 can generally be a mirror image of the power tap left connector 30 shown in FIGS. 34 and 35. More specifically, in the power tap right connector 32, a cut end of a ribbon cable 14 is adjacent a second, or right, side 64 thereof, and the ribbon cable 14 extends out of the connector from the first, or left, side 62 thereof.

As such, with respect to the cable organizer 46, features on the first side 102 of the cable organizer 46 of the power tap left connector 30 (such as the extended edge with substantially straight profile) can be incorporated on the second side 104 of the cable organizer 46 of the power tap right connector 32. Furthermore, in some embodiments, the printed circuit board 44 can include conductor contacts 52 in the same relative locations, so that the power tap right connector 32 can engage the same conductors 22 as the power tap left connector 30.

Furthermore, in some embodiments, another difference between the covers 48 of the power tap left connector 30 and the power tap right connector 32 may be the placement of the features 170, such as being mirror images of each other, as shown in FIG. 29. However, in some embodiments, the cover 48 may be manufactured without such components. For example, as discussed above, a universal cover 48 may not include the components, or the components can be applied to the cover 48 after manufacture based on its use with a desired connector.

Turning now to a terminator 36 having a hinged closure-type configuration, in some embodiments, as shown in FIGS. 29 and 36, a terminator 36 can include a housing 40, a printed circuit board 44, a cable organizer 46, and a cover 48. Like the power tap connectors 30, 32 the terminator 36 can include one side accommodating a cut end of a ribbon cable 14. Like the power tap connectors 30, 32 and the node connector 34, the terminator 36 is adapted to electrically or physically couple into the ribbon cable 14 and the network 10.

Thus, the terminator 36 may not require certain features to accomplish such a device coupling. For example, in some embodiments, the housing 40 of the terminator 36 can be substantially identical to the upper section 56 of the housing 40 of the power tap left connector 30 (e.g., including a similar width, length, and/or height as the upper section 56). However, rather than including a lower section 58 defining an open bottom 60, the terminator 36 can include a rectangular housing 40 with a closed bottom (e.g., the bottom seat 98 extends entirely across the bottom of the housing 40, similar to the terminator 36 shown in FIG. 11). Additionally, the cable organizer 46 of the terminator 36 can be identical to the cable organizer 46 of the power tap connectors 30, 32 and/or the node connector 34 (e.g., a universal cable organizer 46). However, in other embodiments, the cable organizer 46 can be specific only to the terminator 36.

In some embodiments, as shown in FIG. 36, the bottom seat 98 of the terminator 36 can include a nonplanar surface to serve as a contact surface for associated tooling. For example, the bottom seat 98 can include beveling, a bump 224, or inverted bump, like that described above with respect to the lower surface 250 of the protection cap 42 of FIGS. 29-35. As described above, a profiled bump 224 can allow a clamping tool with varying placement positions, jaw opening angles, and force component vectors, to be used to primarily transmit a useful linear magnitude and direction of force to close the cover 48 onto the housing 40 in a desired linear manner. Furthermore, in some embodiments, the bump 224 can include additional features, like cut-outs 256, as shown in FIG. 36. For example, the cut-outs 256 can be sized to receive a tie wrap in order to mount or secure the terminator 36 to a surface. Additionally, in some embodiments as shown in FIG. 36, the terminator 36 can further include a separate protection cap 42 that covers the bottom seat 98 of the housing 40.

Also, in some embodiments, the cover 48 of the terminator 36 can be identical to the cover 48 of the power tap right connector 32 (or the power tap left connector 30). For example, when installed on the terminator 36, a cut end of a ribbon cable 14 can be adjacent a second, or right, side 64 thereof, and the ribbon cable 14 extends out of the terminator 36 from the first, or left, side 62 thereof. That is, the cut end of the ribbon cable 14 can be covered by the second side 64 of the housing 40, with the cover 48 providing a visual indication of such termination via a feature 170*b*.

Referring now a splicer 38 having a hinged closure-type configuration, according to some embodiments, as shown in FIG. 29, the splicer 38 can include a housing 40, a printed circuit board 44, a cable organizer 46, and a cover 48. The splicer 38 can accommodate cut ends of two ribbon cables 14. Furthermore, the splicer 38 can electrically or physically couple two individual segments of the ribbon cable 14 into the network 10. Thus, the splicer 38 may or may not require certain features to accomplish this coupling.

For example, in some embodiments, the cover 48 of the splicer 38 can be similar to the cover 48 of the node connector 34. The housing 40 of the splicer 38 can be similar to the housing 40 of the terminator 36 (e.g., including a nonplanar bottom seat 98 in some embodiments). Additionally, in some embodiments, the interior space 96 of the housing 40 can accommodate a cable organizer 46 and a printed circuit board 44 without a socket receptacle. The cable organizer 46 can include a central raised edge 184 to cover cut ends of the first and second ribbon cables 14. The printed circuit board 44 can generally extend across the interior space 96, with two sets of conductor contacts 52 configured to contact individual conductors of the first and second ribbon cables 14, respectively. The printed circuit board 44 can further include traces that electrically couple the conductors of the first and second ribbon cables 14 together via the two sets of conductor contacts 52.

As all connectors described above can include similar parts, such as similar covers 48 cable organizers 46, and/or housings 40, a ribbon cable 14 can be installed on any connector using substantially the same method and/or the same tooling. For example, in some embodiments, a ribbon cable 14 can be installed on a desired connector using traditional tooling, such as conventional pliers. However, in other embodiments, specialty tooling specific to the connector may be used.

Thus, according to some embodiments, the following method can be executed to install a ribbon cable 14 on a connector 30-38 having a hinged closure-type configuration as shown in FIGS. 29-36. First, while the connector 30-38 is in the preassembled state, the cover 48 can be translated and/or rotated away from the housing 40 to create a cable access pathway (e.g., like the cable access pathway 186 shown in FIGS. 2, 7, 9, 11, and 12). The ribbon cable 14 can then be inserted and positioned, via the cable access pathway, onto the cable organizer 46 so that the ribbon profile 28 of the ribbon cable 14 conforms to and aligns with the inverse ribbon profile 122 of the cable organizer 46. In some embodiments, such alignment further includes snapping the ribbon cable 14 into the cable grab hooks 130 to restrict lateral movement or shifting of the ribbon cable 14 within the cable organizer 46. In addition, in some embodiments, with respect to the power tap connectors 30, 32, the terminator 36, and/or the splicer 38, a cut end of the ribbon cable 14 can be aligned adjacent the raised profile of a respective side edge 102, 104 or central raised edge 184 of the cable organizer 46.

Once the ribbon cable 14 is aligned, the cover 48 can be rotated back toward the housing 40 so that it is aligned over the open top 50 of the housing 40. Once the cover 48 is positioned vertically above the cable organizer 46, the cover 48 can be pressed toward the housing 40 to entrap the ribbon cable 14 within the housing 40 between the cover 48 and the cable organizer 46. For example, the cover 48 can initially be pressed downward by hand until the internal hooks 220 of the cover 48 snap onto the first and second ends 106, 108 of the cable organizer 46, thus securing the cover 48 to the cable organizer 46 and providing haptic feedback to the user. At this point, the connector may still be moveable along a length of the ribbon cable 14 to a desired position.

Figure 37:
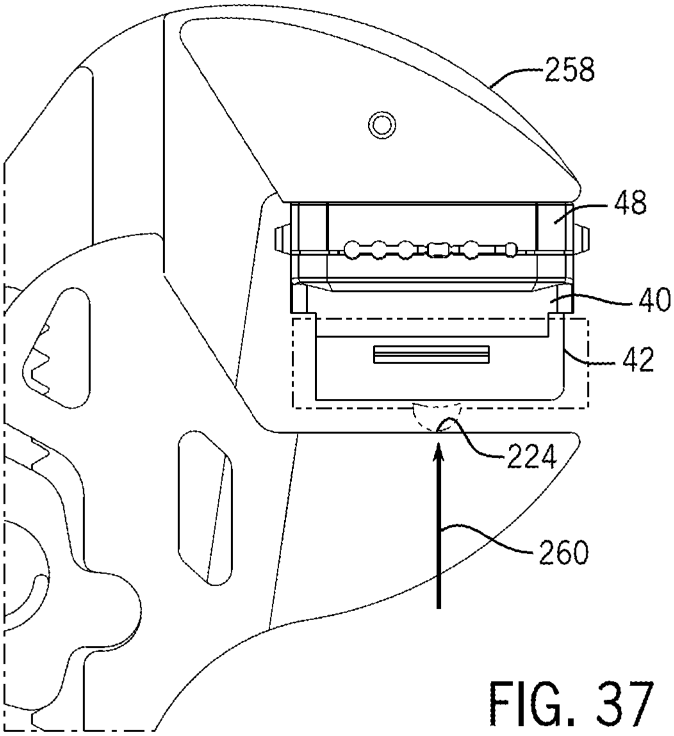
FIG. 37 is a side view of a connector and a tool engaging the connector, according to some embodiments.

After the initial closure and positioning, a tool 258, such as a pliers, as shown in FIG. 37, can then engage the upper surface 148 of the cover 48 and a lower surface of the connector 30-38. The lower surface can be, for example, the lower surface of the housing 40 (e.g., the lower section 58 of the housing 40 of the power tap connectors 30, 32 or the node connector 34, or the enclosed bottom seat 98 of the terminator 36 or the splicer 38), or the lower surface 250 of the protection cap 42. Once engaged, as shown in FIG. 37, the tool 258 can be actuated to press the cover 48 toward the housing 40, as shown by arrow 260. The tool 258 can press the cover 48 toward the housing 40 with enough force to disengage the lower detents 112 of the cable organizer 46 from the upper slots 136 of the housing 40, moving the cable organizer 46 downward until the lower detents 112 snap into the lower slots 138 of the housing 40 and the posts 240 extend into the notches 158 of the cover 48. This engagement can provide haptic feedback to indicate a final stage of the cable termination process. For example, this clamping further completes termination of each conductor contact 52 onto the ribbon cable 14, thus electrically coupling the conductors 22 to the socket receptacle 100 in the power tap and node connectors 30, 32, 34, and coupling the conductors 22 of adjacent ribbon cables 14 together in the splicer 38. In some embodiments, at the end of this movement, the compression forces can be distributed fully onto the housing 40.

Additionally, the profiled (e.g., nonplanar) bottom surface 250 of the protection cap 42 or the profiled bottom seat 98 of the housing 40, as described above, can allow a clamping tool with varying placement positions, jaw opening angles, and force component vectors, to be used to primarily transmit a useful linear magnitude and direction of force to close the cover 48 and fully terminate a ribbon cable 14 in a desired linear manner. As a result, proper connections between the connector and the ribbon cable 14 can be achieved with less precision during the clamping process, and using common tooling such as, for example, non-parallel jaw pliers. Furthermore, in some embodiments, distinct protection caps 42 can be configured to create a "least common multiple" clamping dimension size for specific plier jaw openings. In some embodiments, this standardized setting of the profiled surface may be advantageous for a common pliers, dedicated crimper, automated press, or other specialized tool, as any press adjustment can be minimized.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. For example, various features described above with respect to different configurations may be combined in a single configuration some embodiments. The specification and drawings are accordingly to be regarded in an illustrative rather than restrictive sense.

What is claimed is:

1. A connector for receiving a ribbon cable, to be assembled via a clamping tool, the connector comprising:
- a housing including an open top and a bottom;
- a cover configured to selectively cover the open top of the housing to enclose the ribbon cable within an interior of the housing; and
- a protection cap configured to cover the bottom of the housing, the protection cap including a nonplanar surface with a bump, wherein the clamping tool contacts the cover and the bump to force the cover toward the housing when the connector is assembled.

2. The connector of claim 1, wherein the bump is an inverted bump, and further comprising a plate configured to engage the inverted bump, wherein the clamping tool contacts the inverted bump via the plate to force the cover toward the housing when the connector is assembled.

3. The connector of claim 1, wherein the bottom is an open bottom, and the housing includes an upper section including the open top and a lower section including the open bottom.

4. The connector of claim 1, wherein the housing includes a post and the cover includes a notch, wherein the post is configured to extend into the notch and lie substantially flush with an upper surface of the cover when the connector is assembled.

5. The connector of claim 1, wherein the bottom of the housing is a closed bottom.

6. The connector of claim 5, wherein the closed bottom includes a nonplanar surface.

7. The connector of claim 1 and further comprising a cable organizer configured to be positioned within an interior of the housing and the open top and to receive the ribbon cable.

8. The connector of claim 7, wherein the cover includes a latch configured to engage the cable organizer and move in both a vertical direction relative to the housing and rotate relative to the housing.

9. A connector for receiving a ribbon cable, to be assembled via a clamping tool, the connector comprising:
- a housing including an open top and a post extending upward;
- a cable organizer configured to be positioned within an interior of the housing and the open top and to receive the ribbon cable; and a cover configured to selectively cover the open top of the housing to enclose the cable organizer within the interior of the housing, the cover including a notch extending therethrough, sized to receive the post so that the post extends through the notch and remains viewable when the cover encloses the cable organizer within the interior of the housing.

10. The connector of claim 9, wherein the post lies substantially flush with an upper surface of the cover when the cover encloses the cable organizer within the interior of the housing.

11. The connector of claim 9, wherein the cover includes a latch configured to engage the cable organizer and move in both a vertical direction relative to the housing and rotate relative to the housing.

12. The connector of claim 9, wherein the housing includes a closed bottom with a nonplanar surface.

13. The connector of claim 9 and further comprising a protection cap configured to cover a bottom of the housing, the protection cap including a nonplanar surface with a bump, wherein the clamping tool contacts the cover and the bump to force the cover toward the housing when the connector is assembled.

14. The connector of claim 9, wherein the post includes four posts.

15. The connector of claim 14, wherein the housing is substantially rectangular shaped and each of the four posts is positioned adjacent a corner of the housing.

16. A connector for receiving a ribbon cable, to be assembled via a clamping tool, the connector comprising:

a housing including an open top;

a cable organizer configured to be positioned within an interior of the housing and configured to receive the ribbon cable upon an upper surface thereof; and a cover configured to selectively cover the open top of the housing to enclose the cable organizer within the interior of the housing, the cover coupled to the housing and including a latch with two L-shaped extensions configured to engage the cable organizer and move in a both vertical direction relative to the housing and rotate relative to the housing.

17. The connector of claim 16, wherein the cover is configured to rotate relative to the housing about a moving axis dependent on a vertical position of the cover relative to the housing.

18. The connector of claim 16, wherein each of the L-shaped extensions includes a detent that engages the cable organizer, wherein the detent is configured to hold the cover in an open position when the cover is rotated relative to the housing.

19. The connector of claim 16 and further comprising a protection cap configured to cover a bottom of the housing, the protection cap including a nonplanar surface with a bump, wherein the clamping tool contacts the cover and the bump to force the cover toward the housing when the connector is assembled.

20. The connector of claim 16, wherein the housing includes a post and the cover includes a notch, wherein the post is configured to extend into the notch and lie substantially flush with an upper surface of the cover when the connector is assembled.

* * * * *